(12) United States Patent
Jia et al.

(10) Patent No.: US 12,513,492 B2
(45) Date of Patent: Dec. 30, 2025

(54) COMMUNICATION METHOD, APPARATUS, AND SYSTEM

(71) Applicant: HUAWEI TECHNOLOGIES CO., LTD., Guangdong (CN)

(72) Inventors: Jianxin Jia, Shanghai (CN); Wenfu Wu, Shanghai (CN); Zaifeng Zong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 386 days.

(21) Appl. No.: 18/163,697

(22) Filed: Feb. 2, 2023

(65) Prior Publication Data

US 2023/0188949 A1 Jun. 15, 2023

Related U.S. Application Data

(63) Continuation of application No. PCT/CN2021/110399, filed on Aug. 3, 2021.

(30) Foreign Application Priority Data

Aug. 3, 2020 (CN) .......................... 202010769176.9
Jul. 28, 2021 (CN) .......................... 202110858677.9

(51) Int. Cl.
*H04W 4/06* (2009.01)
*H04W 68/00* (2009.01)
*H04W 76/27* (2018.01)

(52) U.S. Cl.
CPC ........... *H04W 4/06* (2013.01); *H04W 68/005* (2013.01); *H04W 76/27* (2018.02)

(58) Field of Classification Search
CPC ..... H04W 4/06; H04W 68/005; H04W 76/27; H04W 68/00; H04W 88/14; H04W 76/32;
(Continued)

(56) References Cited

U.S. PATENT DOCUMENTS 12,015,967 B2 * 6/2024 Navratil .................. H04W 4/08
2016/0249266 A1 * 8/2016 Kim ........................ H04W 4/06
(Continued)

FOREIGN PATENT DOCUMENTS

CN 1956413 A 5/2007
CN 101232701 A 7/2008
(Continued)

OTHER PUBLICATIONS

Oliveira, Lidiano AN, et al. "On the performance of location management in 5G network using RRC inactive state." IEEE Access 10 (2022): 65520-65532. (Year: 2022).*
(Continued)

*Primary Examiner* — Sharad Rampuria
(74) *Attorney, Agent, or Firm* — Fish & Richardson P.C.

(57) ABSTRACT

Embodiments of this application disclose a communication method, apparatus, and system. An example communication method includes: receiving, by an access network device from an access and mobility management function network element, information indicating to activate a multicast session corresponding to a multicast service; and sending, by the access network device based on the information, a paging message to a terminal in a radio resource control_inactive (RRC_inactive) state in the multicast session corresponding to the multicast service.

17 Claims, 30 Drawing Sheets

(58) Field of Classification Search
CPC . H04W 36/0007; H04W 76/12; H04W 76/40; H04L 12/1881; H04L 12/189
See application file for complete search history.

(56) References Cited

U.S. PATENT DOCUMENTS

| | | | |
|---|---|---|---|
| 2018/0270894 A1* | 9/2018 | Park | H04W 76/14 |
| 2018/0376444 A1 | 12/2018 | Kim et al. | |
| 2019/0158985 A1 | 5/2019 | Dao et al. | |
| 2019/0182632 A1* | 6/2019 | Fujishiro | H04W 48/16 |
| 2019/0223250 A1 | 7/2019 | Dao et al. | |
| 2020/0092923 A1 | 3/2020 | Abraham et al. | |
| 2020/0351980 A1* | 11/2020 | Talebi Fard | H04W 76/40 |
| 2023/0239661 A1* | 7/2023 | Pham | H04W 68/02 370/329 |

FOREIGN PATENT DOCUMENTS

| | | | |
|---|---|---|---|
| CN | 101296399 | A | 10/2008 |
| CN | 102378113 | A | 3/2012 |
| CN | 102387471 | A | 3/2012 |
| CN | 109673060 | A | 4/2019 |
| CN | 109673061 | A | 4/2019 |
| CN | 110167190 | A | 8/2019 |
| CN | 110169140 | A | 8/2019 |
| CN | 110431913 | A | 11/2019 |
| CN | 110557265 | A | 12/2019 |
| CN | 111065056 | A | 4/2020 |
| CN | 111373774 | A | 7/2020 |
| EP | 3496453 | A1 | 6/2019 |
| WO | 2017075792 | A1 | 5/2017 |
| WO | 2019080690 | A1 | 5/2019 |

OTHER PUBLICATIONS

Lee, Kwonjong, et al. "Latency of cellular-based V2X: Perspectives on TTI-proportional latency and TTI-independent latency." Ieee Access 5 (2017): 15800-15809. (Year: 2017).*
Nokia et al., "PDU session enhanced for multicast to provide the basic multicast connectivity service," SA WG2 Meeting #S2-136, S2-1911366, Reno, Nevada, USA, Nov. 18-22, 2019, 6 pages.
Office Action in Chinese Appln. No. 202110858677.9, dated Jan. 29, 2023, 4 pages.
Office Action in Chinese Appln. No. 202110858677.9, dated Jun. 30, 2022, 27 pages (with English translation).
International Search Report and Written Opinion in International Appln. No. PCT/CN2021/110399, mailed on Oct. 22, 2021, 15 pages (with English translation).
Extended European Search Report in European Appln No. 21854126.6, dated Dec. 1, 2023, 9 pages.

* cited by examiner

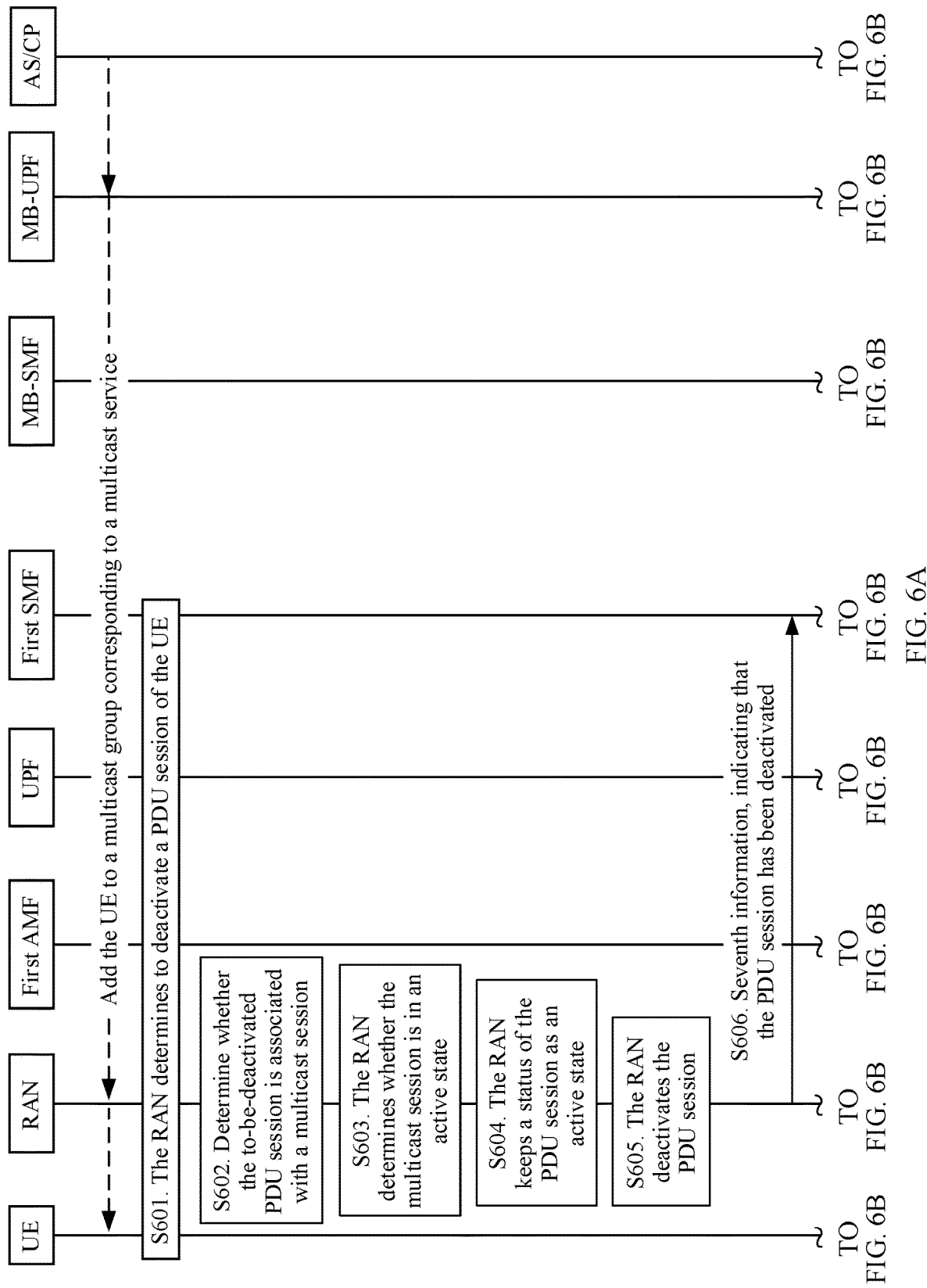

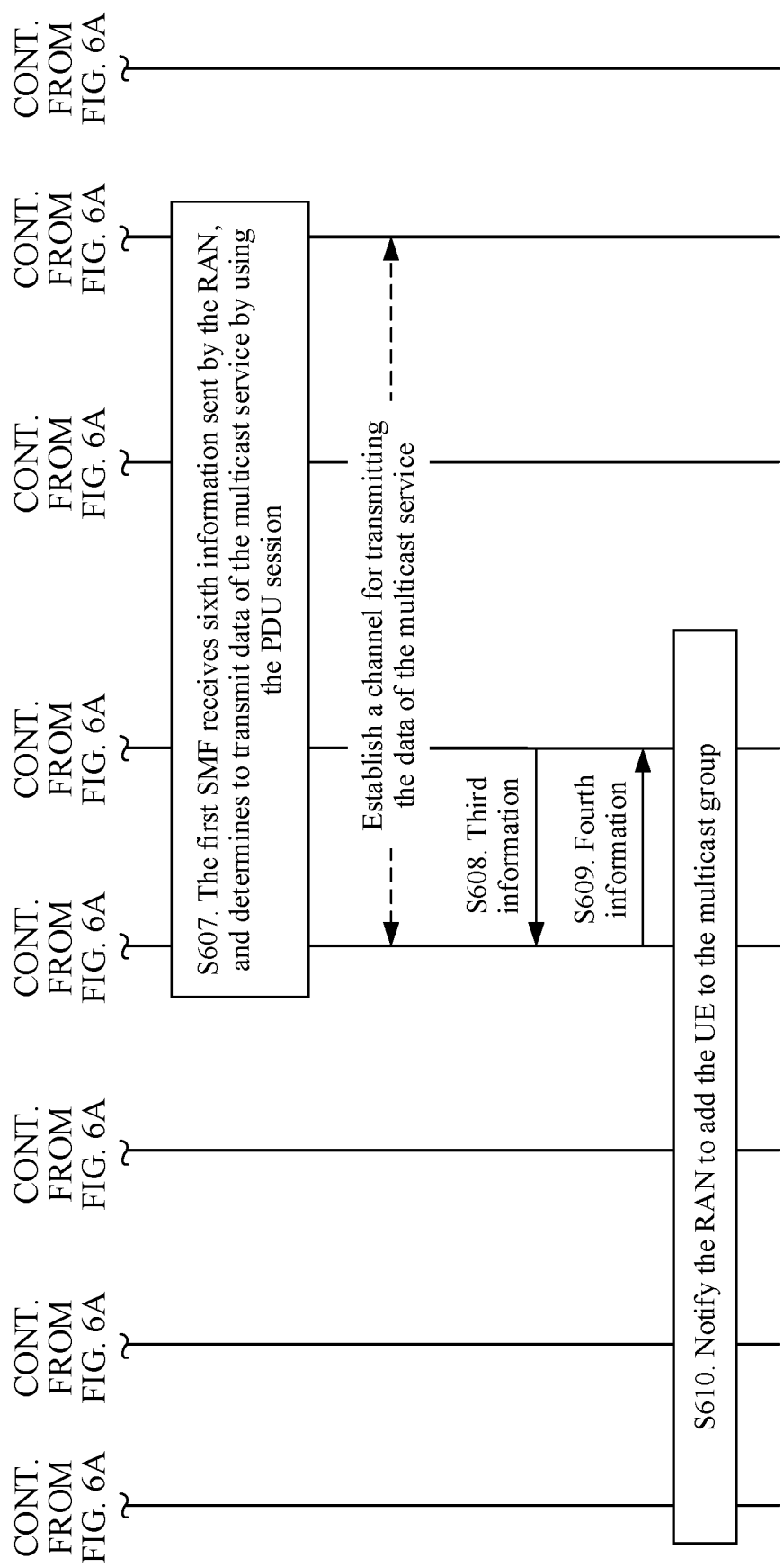

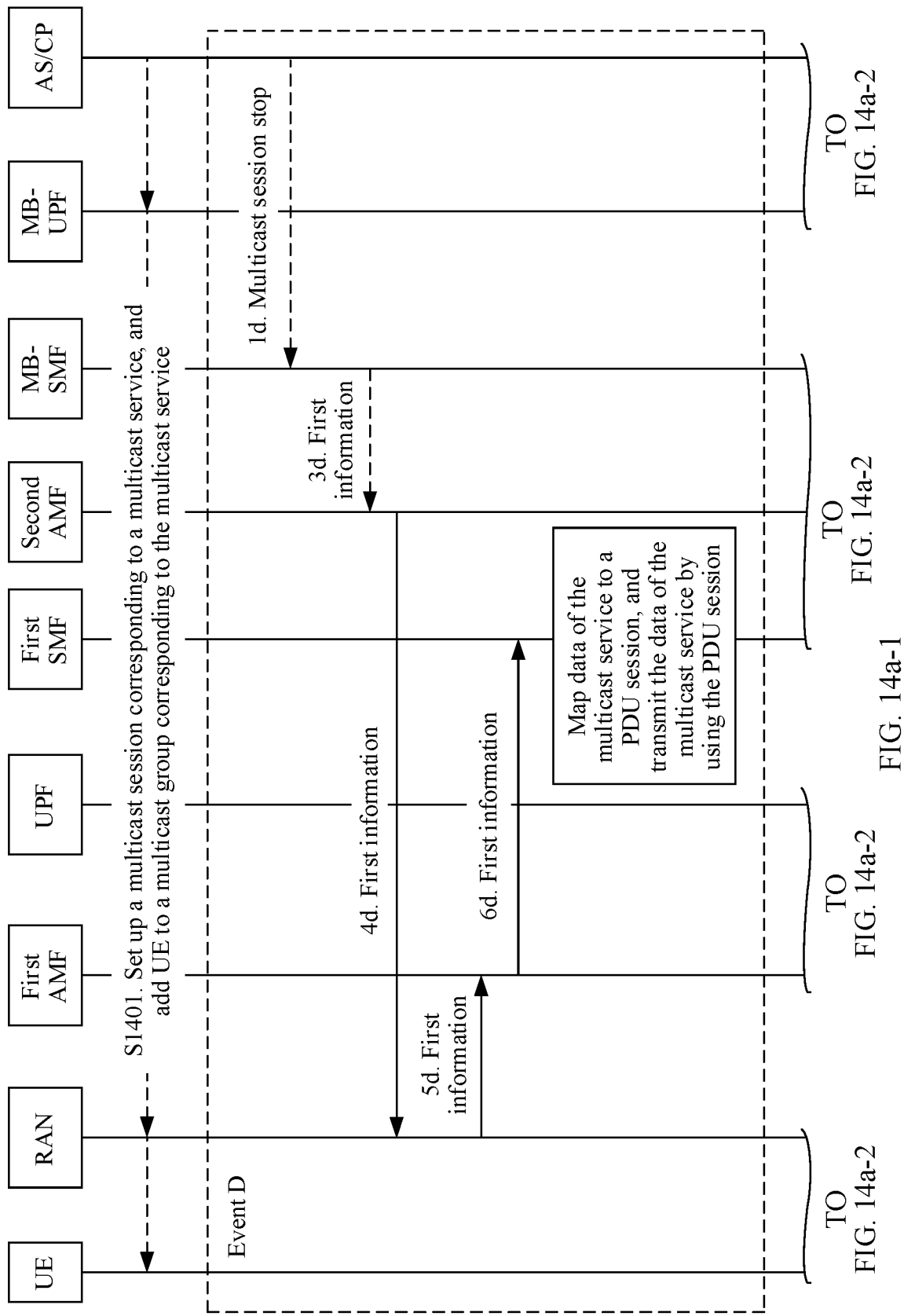

COMMUNICATION METHOD, APPARATUS, AND SYSTEM

CROSS-REFERENCE TO RELATED APPLICATIONS

This application is a continuation of International Application No. PCT/CN2021/110399, filed on Aug. 3, 2021, which claims priority to Chinese Patent Application No. 202010769176.9, filed on Aug. 3, 2020, and Chinese Patent Application No. 202110858677.9, filed on Jul. 28, 2021. All of the aforementioned patent applications are hereby incorporated by reference in their entireties.

TECHNICAL FIELD

Embodiments of this application relate to the field of communication technologies, and in particular, to a communication method, apparatus, and system.

BACKGROUND

With development of the mobile Internet, mobile high-definition video services are experiencing a surge. Users are gradually changing from watching popular programs on fixed TVs to watching popular programs on mobile phones and the mobile Internet. Video services have an increasingly strong impact on mobile networks. At present, transmission of a video service may be optimized in a multicast/broadcast manner to greatly reduce impact of video traffic on a mobile network. For example, data of a video service is sent to a large quantity of users in a multicast/broadcast manner.

In many mobile communication network architectures, a 5th generation (5G) mobile communication network architecture may support a multicast/broadcast function. Data of a multicast/broadcast service is sent to a large quantity of users in a multicast/broadcast manner. In research on a 5G multicast/broadcast function, how to maintain normal transmission of data of a multicast service to implement continuity of the multicast service when a multicast/broadcast session is activated and deactivated is an urgent problem to be resolved.

SUMMARY

Embodiments of this application provide a communication method, apparatus, and system, to resolve a problem of how to maintain normal transmission of data of a multicast service to implement continuity of the multicast service when a multicast/broadcast session is activated and deactivated.

To achieve the foregoing objectives, the following technical solutions are used in embodiments of this application.

According to a first aspect of embodiments of this application, a communication method is provided. The method may be performed by a first session management function network element or an access network device. The method includes: determining whether a to-be-deactivated PDU session is associated with a multicast session corresponding to a multicast service; determining whether the multicast session is in an active state; and if the PDU session is associated with the multicast session, and the multicast session is in the active state, keeping a status of the PDU session as an active state; or if the PDU session is associated with the multicast session, and the multicast session is in a deactivated state, deactivating the PDU session.

Based on the method according to the first aspect, when the PDU session is deactivated, an activation status of the multicast session associated with the PDU session is checked. If the multicast session associated with the PDU session is in the active state, the PDU session is not deactivated, and the PDU session is kept in the active state, so that data of the multicast service is subsequently mapped/injected to the PDU session in an application scenario (for example, a handover scenario), to ensure normal transmission of the data of the multicast service, or to avoid a problem that the terminal cannot receive the data of the multicast service on an air interface resource when the PDU session is the last PDU of a terminal and the terminal enters an idle state after the PDU session is deactivated. If the multicast session associated with the PDU session is in the deactivated state, the PDU session is deactivated, to save transmission resources and improve resource utilization.

In a possible design, if the method is performed by a first session management function network element, the first session management function network element corresponds to a first terminal, and the first terminal belongs to a multicast group corresponding to the multicast service, the determining whether the multicast session is in an active state includes: receiving, by the first session management function network element, first information from a second session management function network element, where the first information indicates that the multicast session is to be deactivated, for example, the first information may be any one of the following information: multicast/broadcast service session stop (MBS session stop), multicast/broadcast service session deactivation (MB S session deactivation), or multicast session deactivation, and the second session management function network element corresponds to the multicast group; and determining, by the first session management function network element based on the first information, that the multicast session is in the deactivated state.

Based on the possible design, when the multicast session stops or another multicast session is deactivated, the second session management function network element that manages the multicast session may notify in a timely manner the first session management function network element to deactivate the multicast session, so that the first session management function network element determines, based on the multicast session, to release the PDU session associated with the multicast session, so that the status of the PDU session is consistent with a status of the multicast session associated with the PDU session. This ensures that there is an available session to enable normal transmission of the data of the multicast service.

In a possible design, the method further includes: receiving, by the first session management function network element, second information from the second session management function network element, where the second information may be any one of the following information: multicast/broadcast service session start (MBS session start), multicast/broadcast service session activation (MBS session activation), or multicast session activation; and notifying, by the first session management function network element, an access network device to add the first terminal to the multicast group. For example, the first session management function network element may notify, by using N2 session management information (N2 SM information), the access network device to add the first terminal to the multicast group. The N2 SM information may be PDU session resource setup request transfer, a PDU session resource setup request, PDU session resource modify request transfer, or a PDU session resource modify request. The N2 SM information includes identification information (for example, identification information of a multicast/broadcast service session (MBS session)) of the multicast service. Optionally, the N2 SM information may further include an indication for adding the terminal to the multicast session. Optionally, the N2 SM information may further include unicast QoS profile information mapped to/corresponding to QoS profile information of the multicast service corresponding to the multicast session.

Based on the possible design, the first session management function network element may restart the multicast session under an indication of the second session management function network element, to trigger the access network device to add the first terminal to the multicast group corresponding to the multicast session, to transmit data in a multicast manner, thereby improving resource utilization.

In a possible design, before the notifying, by the first session management function network element, an access network device to add the first terminal to the multicast group, if the PDU session associated with the multicast session is in a deactivated state, the method further includes: activating, by the first session management function network element, the PDU session associated with the multicast session, and where the multicast group may also be referred to as the multicast session.

In another possible design, after the notifying, by the first session management function network element, an access network device to add the first terminal to the multicast group, if the PDU session associated with the multicast session is in a deactivated state, the method further includes: activating, by the first session management function network element, the PDU session associated with the multicast session.

Based on the possible design, when the multicast session is in the active state, the PDU session associated with the multicast session may be activated, so that the status of the PDU session is consistent with a status of the multicast session associated with the PDU session. This ensures that there is an available session to enable normal transmission of the data of the multicast service.

In a possible design, the method further includes: determining, by the first session management function network element, to transmit data of the multicast service by using the PDU session. Based on the possible design, when the multicast session is in the deactivated state, the multicast service may be mapped to the PDU session, and the data of the multicast service is transmitted by using the PDU session, to ensure data transmission continuity of the multicast service.

In a possible design, the method further includes: sending, by the first session management function network element, third information to a first user plane function network element, where the third information indicates to detect the data of the multicast service sent by a second user plane function network element; receiving, by the first session management function network element, fourth information from the first user plane function network element, where the fourth information indicates that the data of the multicast service is detected; and notifying, by the first session management function network element, an access network device to add the first terminal to the multicast group.

Based on the possible design, when the multicast service is mapped to the PDU session, the first user plane function network element may be notified to detect, at all times, whether there is the data of the multicast service sent from the second user plane function network element. If there is the data of the multicast service sent from the second user plane function network element, the first session management function network element is notified, to trigger the first session management function network element to activate the multicast session, and transmit the data by using the multicast session. This improves resource utilization and a data transmission rate.

In a possible design, if the method is performed by an access network device, before the access network device initiates access network release AN release, the access network device determines whether the PDU session is associated with the multicast session.

Based on the possible design, before initiating the AN release procedure, the access network device may determine whether the PDU session, especially the last PDU session of the terminal, is associated with the multicast session. This prevents the terminal from being in a CM idle state when the AN release procedure is initiated without considering the multicast session, which affects data transmission of the multicast service.

In a possible design, if the method is performed by the access network device, before the determining whether the PDU session is associated with the multicast session, the method further includes: receiving, by the access network device, fifth information from a first session management function network element, where the fifth information indicates to deactivate the PDU session; and if the status of the PDU session is kept in the active state, the method further includes: sending, by the access network device, sixth information to the first session management function network element, where the sixth information indicates that deactivation of the PDU session is rejected; or if the PDU session is deactivated, the method further includes: sending, by the access network device, seventh information to the first session management function network element, where the seventh information indicates that the PDU session has been deactivated. Based on the possible design, after determining the status of the PDU session, the access network device may send the sixth information or the seventh information to the first session management function network element, so that the first session management function network element synchronizes a current status of the PDU session.

According to a second aspect, an embodiment of this application provides a communication method. The method may be performed by a first session management function network element or an access network device. The method includes: determining whether a to-be-deactivated PDU session is associated with a multicast session corresponding to a multicast service; determining whether the multicast session is in an active state; determining whether an access network device corresponding to the to-be-deactivated PDU session supports a multicast function; and if the PDU session is associated with the multicast session, the multicast session is in the active state, and the access network device does not support the multicast function, keeping a status of the PDU session as an active state; or if the PDU session is associated with the multicast session, and the multicast session is in a deactivated state, deactivating the PDU session.

Based on the method according to the second aspect, when the PDU session is deactivated, an activation status of the multicast session associated with the PDU session and whether the access network device corresponding to the PDU session supports the multicast function may be checked. If the multicast session associated with the PDU session is in the active state and the access network device does not support the multicast function, the PDU session is not deactivated, and the PDU session is kept in the active state, so that data of the multicast service is subsequently mapped/injected to the PDU session in an application scenario (for example, a handover scenario), to ensure normal transmission of the data of the multicast service, or to avoid a problem that the terminal cannot receive the data of the multicast service on an air interface resource when the PDU session is the last PDU of a terminal and the terminal enters an idle state after the PDU session is deactivated. If the multicast session associated with the PDU session is in the deactivated state, the PDU session is deactivated, to save transmission resources and improve resource utilization.

In a possible design, if the method is performed by a first session management function network element, the first session management function network element corresponds to a first terminal, and the first terminal belongs to a multicast group corresponding to the multicast service, the determining whether the multicast session is in an active state includes: The first session management function network element receives first information from a second session management function network element, and determines, based on the first information, that the multicast session is in the deactivated state. The first information indicates that the multicast session is to be deactivated, and the second session management function network element corresponds to the multicast group.

Based on the possible design, when the multicast session stops or another multicast session is deactivated, the second session management function network element that manages the multicast session notifies in a timely manner the first session management function network element to deactivate the multicast session, so that the first session management function network element determines, based on the multicast session, to release the PDU session associated with the multicast session, so that the status of the PDU session is consistent with a status of the multicast session associated with the PDU session. This ensures that there is an available session to enable normal transmission of the data of the multicast service.

In a possible design, the method further includes: receiving, by the first session management function network element, second information from the second session management function network element, where the second information indicates that the multicast session is to be activated; and notifying, by the first session management function network element, the access network device to add the first terminal to the multicast group.

Based on the possible design, the first session management function network element may learn, under an indication of the second session management function network element, that the multicast session is activated, to trigger the access network device to add the first terminal to the multicast group corresponding to the multicast session, to transmit data in a multicast manner, thereby improving resource utilization.

According to a third aspect, this application provides a communication apparatus. The communication apparatus may be a first session management function network element, or a chip or a system-on-a-chip in the first session management function network element. Alternatively, the communication apparatus may be an access network device, or a chip or a system-on-a-chip in the access network device. The communication apparatus may implement functions performed by a communication apparatus in the first aspect or the possible designs of the first aspect, or functions performed by a communication apparatus in the second aspect or the possible designs of the second aspect. The functions may be implemented by hardware, or may be implemented by hardware executing corresponding software. The hardware or the software includes one or more modules corresponding to the functions.

In a possible design, for example, the communication apparatus may include a processing unit.

The processing unit is configured to: determine whether a to-be-deactivated PDU session is associated with a multicast session corresponding to a multicast service; determine whether the multicast session is in an active state; and if the PDU session is associated with the multicast session, and the multicast session is in the active state, keep a status of the PDU session as an active state; or if the PDU session is associated with the multicast session, and the multicast session is in a deactivated state, deactivate the PDU session.

For a specific implementation of each unit in the communication apparatus, refer to the first session management function network element or functions in the communication method provided in any one of the first aspect or the possible designs of the first aspect. Details are not described herein again. The provided communication apparatus can achieve same beneficial effects as any one of the first aspect or the possible designs of the first aspect.

In another possible design, the communication apparatus includes a processor and a memory, where the memory is configured to store computer-executable instructions; and when the communication apparatus runs, the processor executes the computer-executable instructions stored in the memory, so that the communication apparatus performs the communication method according to any one of the first aspect or the possible designs of the first aspect.

According to a fourth aspect, a computer-readable storage medium is provided, where the computer-readable storage medium stores instructions; and when the instructions are run on a computer, the computer is enabled to perform the communication method according to any one of the first aspect or the possible designs of the first aspect.

According to a fifth aspect, a computer program product is provided, including instructions; and when the instructions are run on a computer, the computer is enabled to perform the communication method according to any one of the first aspect or the possible designs of the first aspect.

According to a sixth aspect, a communication apparatus is provided. The communication apparatus may be a chip system. The chip system may include a processor and a communication interface, configured to support the communication apparatus in implementing the functions in the first aspect or the possible designs of the first aspect. For example, the processor determines whether a to-be-deactivated PDU session is associated with a multicast session corresponding to a multicast service; determines whether the multicast session is in an active state; and if the PDU session is associated with the multicast session, and the multicast session is in the active state, keeps a status of the PDU session as an active state; or if the PDU session is associated with the multicast session, and the multicast session is in a deactivated state, deactivates the PDU session. In a possible design, the chip system further includes a memory. The memory is configured to store program instructions and data that are necessary for the communication apparatus. The chip system may include a chip, or may include a chip and another discrete component.

For technical effects achieved by any one of the designs of the third aspect to the sixth aspect, refer to the technical effects achieved by any one of the first aspect or the possible designs of the first aspect. Details are not described again.

According to a seventh aspect, an embodiment of this application provides another communication method. The method may include: receiving, by a first session management function network element, second information from a second session management function network element, where the second information indicates that a multicast session is to be activated; and notifying an access network device to add a first terminal to a multicast group corresponding to the multicast session, where the first session management function network element corresponds to the first terminal, and the second session management function network element corresponds to the multicast group.

Based on the method according to the seventh aspect, when the multicast session is in a deactivated state, after receiving the second information for activating the multicast session, the first session management function network element notifies the access network device to add the first terminal to the multicast group corresponding to the multicast session, transmit data of a multicast service by using the multicast session to activate the multicast session, and send the data of the multicast service to a terminal by using the multicast session. This improves resource utilization.

In a possible design, the method further includes: activating a PDU session associated with the multicast session.

Based on the possible design, when the multicast session is activated, an activation status of the PDU session associated with the multicast session may be checked. If the PDU session is in a deactivated state, the PDU session is activated, so that the data of the multicast service is subsequently mapped/injected to the PDU session in an application scenario (for example, a handover scenario), to ensure normal transmission of the data of the multicast service.

In a possible design, the method further includes: activating, by the first session management function network element, the PDU session if the access network device corresponding to the PDU session associated with the multicast session does not support a multicast function.

Based on the possible design, when the multicast session is in the active state, the PDU session associated with the multicast session may be activated based on a capability, so that the status of the PDU session is consistent with a status of the multicast session associated with the PDU session. This ensures that there is an available session to enable normal transmission of the data of the multicast service.

It should be noted that, in this embodiment of this application, after receiving the second information for activating the multicast session, the first session management function network element may perform one or both of the following two processes: (1) notifying the access network device to add the first terminal to the multicast group corresponding to the multicast session; and (2) activating, based on the second information, the PDU session associated with the multicast session; or activating, by the first session management function network element, the PDU session based on the second information when the access network device corresponding to the PDU session associated with the multicast session does not support the multicast function. It should be noted that, when the two processes are performed, a sequence of performing the two processes is not limited. The process (1) may be first performed based on the second information, and then the process (2) is further optionally performed; or the process (2) is first performed based on the second information, and then the process (1) is further optionally performed.

In a possible design, the activating the PDU session associated with the multicast session may include: After the first session management function network element receives the second information for activating the multicast session, the first session management function network element sends, to the access network device, an Namf_Communication_N1N2MessageTransfer message including an N2 session management information (N2 SM information) or a PDU session context update response (Nsmf_PDUSession_UpdateSMContext Response) including N2 SM information, to trigger the access network device to activate, based on the N2 SM information, the PDU session associated with the multicast session, for example, establishing an air interface resource and a transmission tunnel (which may be referred to as a tunnel for short in this application) corresponding to the PDU session. Further, after activating the PDU session associated with the multicast session, the access network device may further send a response message for the N2 SM information to the first session management function network element.

The N2 SM information may be PDU session resource setup request transfer, and the response message for the N2 SM information may be PDU session resource setup response transfer. Alternatively, the N2 SM information may be a PDU session resource setup request, and the response message for the N2 SM information may be a PDU session resource setup response. Alternatively, the N2 SM information may be PDU session resource modify request transfer, and the response message for the N2 SM information may be PDU session resource modify response transfer. Alternatively, the N2 SM information may be a PDU session resource modify request, and the response message for the N2 SM information may be a PDU session resource modify response. This is not limited.

The N2 SM information may include identification information (for example, identification information of a multicast/broadcast service session (MBS session)) of the multicast service. Optionally, the N2 SM information may further include an indication for adding the terminal to the multicast session. Optionally, the N2 SM information may further include unicast QoS profile information mapped to/corresponding to QoS profile information of the multicast service corresponding to the multicast session.

If the N2 SM information includes the unicast QoS profile information mapped to/corresponding to the QoS profile information of the multicast service corresponding to the multicast session, the access network device may configure, based on the unicast QoS profile information, an air interface resource (or referred to as a radio bearer) for transmitting the data of the multicast service. After the air interface resource is created, if a transmission tunnel between the access network device and a UPF has not been established, the access network device includes downlink tunnel information (for example, NG-U transport layer information or an NG-RAN node endpoint) to the response message that is sent to the first session management function network element and that is for the N2 SM information. The downlink tunnel information is a mandatory information element of the response message for the N2 SM information. The downlink tunnel information may be for establishing a transmission tunnel for transmitting the data of the multicast service between the access network device and the UPF, to ensure that the PDU session associated with the multicast session is activated.

In a possible design, the method further includes: sending, by the first session management function network element, identification information of the multicast group to a first access and mobility management function network element, where the identification information of the multicast group is used by the first access and mobility management function network element to initiate group paging in a registration area of the first terminal when finding that the first terminal is in an idle state.

Further, the first access and mobility management function network element receives the identification information of the multicast group sent by the first session management function network element. If there is a terminal in a CM-IDLE state in the multicast group, the first access and mobility management function network element sends, to the access network device in a registration area of the terminal in the CM-IDLE state, a paging message (which may be referred to as a group paging message) carrying the identification information of the multicast group, to trigger the access network device to page a plurality of terminals in the CM-IDLE state in the multicast group.

The terminal in the CM-IDLE state in the multicast group may include the first terminal, and may further include another terminal, such as a second terminal or a third terminal.

It should be noted that when there are a plurality of terminals in the CM-IDLE state in the multicast group, and registration areas of the plurality of terminals have areas overlapping with each other (which may be referred to as overlapping areas in this specification), to reduce signaling overheads, the first access and mobility management function network element may initiate group paging once in an overlapping area of a terminal, and does not need to repeatedly initiate group paging in an overlapping area of registration areas of all terminals. For example, there is a second terminal in the CM-IDLE state in the multicast group, and the identification information of the multicast group is further used by the first access and mobility management function network element to initiate group paging in another area different from an overlapping area in a registration area of the second terminal when the first access and mobility management function network element finds that the second terminal is in an idle state. The overlapping area may be an area in which the registration area of the first terminal overlaps the registration area of the second terminal.

Based on the possible design, the first session management function network element may send the identification information of the multicast group to the first access and mobility management function network element. The first access and mobility management function network element receives the identification information of the multicast group, and finds that the first terminal is in the CM-IDLE state. In this case, the first access and mobility management function network element initiates group paging to an access network device in the registration area of the first terminal, for example, sends a piece of information that carries the identification information of the multicast group and that is for paging the plurality of terminals in the CM-IDLE state in the multicast group. It should be noted that the first access and mobility management function network element does not repeatedly initiate group paging in an overlapping area of registration areas of all of the plurality of terminals in the CM-IDLE state in the multicast group, to reduce signaling overheads.

Alternatively, the identification information of the multicast group may be referred to as identification information of the multicast session, may be referred to as identification information of a multicast broadcast session (MB session), or may be referred to as identification information of a multicast broadcast service session (MBS session). The identification information of the multicast group may include one or more of a TMGI, an identifier of the multicast service, a multicast address, an IP multicast address, an identifier of the multicast group, an identifier of the multicast session, context information of the multicast session, address information of the multicast service, identification information of the PDU session associated with the multicast session, a multicast/broadcast service session ID (multicast broadcast service session ID, MBS session ID), a multicast session ID, a multicast service session ID (multicast service session ID), or identification information of a service data flow (SDF) of the multicast service. The identification information of the multicast group may be the same as the identification information of the multicast service. This is not limited.

In another possible design, the method further includes: sending, by the first session management function network element, a third message to the first access and mobility management function network element, where the third message may be an N11 message, the third message may include identification information of the first terminal, and the third message may be for triggering, when the first terminal is in the idle state, the first access and mobility management function network element to initiate paging in the registration area of the first terminal.

For example, when the first terminal is in the idle state (or referred to as an idle mode or a CM-IDLE state), the first access and mobility management function network element sends a paging message for the first terminal to the access network device in the registration area of the first terminal in the CM-IDLE state, to trigger the access network device to page the first terminal in the CM-IDLE state.

The identification information of the first terminal may be for identifying the first terminal, and the identification information of the first terminal may be a subscription permanent identifier (SUPI) of the first terminal, a generic public subscription identifier (GPSI) of the first terminal, a subscription concealed identifier (SUCI), or the like. The first access and mobility management function network element may be an access and mobility management function network element serving NAS signaling of the first terminal, or may be an access and mobility management function network element serving the multicast group. This is not limited.

In a possible design, the method further includes: receiving, by the first session management function network element from the second session management function network element, first information indicating that the multicast session is to be deactivated. For example, the first information may be multicast/broadcast service session stop (MBS session stop), multicast/broadcast service session deactivation, or multicast session deactivation; and marking, by the first session management function network element based on the first information, the multicast session as deactivated.

Based on the possible design, when the multicast session stops or another multicast session is deactivated, the second session management function network element that manages the multicast session may notify in a timely manner the first session management function network element to deactivate the multicast session, so that the first session management function network element marks the status of the multicast session. Subsequently, the first session management function network element may determine, based on the marked status of the multicast session, whether to deactivate the associated PDU session.

In a possible design, the method further includes: determining, by the first session management function network element, to transmit the data of the multicast service by using the PDU session associated with the multicast session.

Based on the possible design, when the multicast session is in the deactivated state, the multicast service is mapped to the PDU session, and the data of the multicast service is transmitted by using the PDU session, to ensure data transmission continuity of the multicast service.

In a possible design, the method further includes: sending, by the first session management function network element, third information to a first user plane function network element, where the third information indicates to detect the data of the multicast service sent by a second user plane function network element; receiving, by the first session management function network element, fourth information from the first user plane function network element, where the fourth information indicates that the data of the multicast service is detected; and notifying, by the first session management function network element, an access network device to add the first terminal to the multicast group.

Based on the possible design, when the multicast service is mapped to the PDU session, the first user plane function network element may be notified to detect, at all times, whether there is the data of the multicast service sent from the second user plane function network element. If there is the data of the multicast service sent from the second user plane function network element, the first session management function network element is notified, to trigger the first session management function network element to activate the multicast session, and transmit the data of the multicast service by using the multicast session. This improves resource utilization.

In a possible design, the method further includes: after the first terminal is added to the multicast group corresponding to the multicast session, releasing, by the first session management function network element, a resource for transmitting the data of the multicast service by using the PDU session. This reduces resource occupation and improves resource utilization.

According to an eighth aspect, a communication apparatus is provided. The communication apparatus may be a first session management function network element, or a chip or a system-on-a-chip in the first session management function network element. The communication apparatus may implement functions performed by the first session management function network element according to any one of the seventh aspect or the possible designs of the seventh aspect. The functions may be implemented by hardware, or may be implemented by hardware executing corresponding software. The hardware or the software includes one or more modules corresponding to the functions. For example, the communication apparatus may include a receiving unit and a processing unit.

The receiving unit is configured to receive, from a second session management function network element, second information indicating that a multicast session is to be activated.

The processing unit is configured to notify an access network device to add a first terminal to a multicast group corresponding to the multicast session, where the first session management function network element corresponds to the first terminal, and the second session management function network element corresponds to the multicast group.

For a specific implementation of the communication apparatus, refer to a behavior function of the first session management function network element in the communication method according to any one of the seventh aspect or the possible designs of the seventh aspect. Any one of the seventh aspect or the possible designs of the seventh aspect may be correspondingly implemented by the receiving unit and the sending unit that are included in the communication apparatus.

According to a ninth aspect, a communication apparatus is provided, including a processor and a memory, where the memory is configured to store computer-executable instructions; and when the communication apparatus runs, the processor executes the computer-executable instructions stored in the memory, so that the communication apparatus performs the communication method according to any one of the seventh aspect or the possible designs of the seventh aspect.

According to a tenth aspect, a computer-readable storage medium is provided, where the computer-readable storage medium stores instructions; and when the instructions are run on a computer, the computer is enabled to perform the communication method according to any one of the seventh aspect or the possible designs of the seventh aspect.

According to an eleventh aspect, a computer program product is provided, including instructions; and when the instructions are run on a computer, the computer is enabled to perform the communication method according to any one of the seventh aspect or the possible designs of the seventh aspect.

According to a twelfth aspect, a chip system is provided. The chip system includes a processor and a communication interface, configured to support a communication apparatus in implementing functions in the foregoing aspects. For example, the processor receives, through the communication interface, second information from a second session management function network element, where the second information indicates that a multicast session is to be activated; and notifies an access network device to add a first terminal to a multicast group corresponding to the multicast session, where the first session management function network element corresponds to the first terminal, and the second session management function network element corresponds to the multicast group. In a possible design, the chip system further includes a memory. The memory is configured to store program instructions and data that are necessary for the communication apparatus. The chip system may include a chip, or may include a chip and another discrete component.

For technical effects achieved by any one of the designs of the ninth aspect to the twelfth aspect, refer to the technical effects achieved by any one of the seventh aspect or the possible designs of the seventh aspect. Details are not described again.

According to a thirteenth aspect, a communication method is provided. The method includes: determining, by an access network device, to deactivate a multicast session corresponding to a multicast service; and sending eighth information to a first access and mobility management function network element or a second access and mobility management function network element, where the eighth information indicates to deactivate the multicast session, the first access and mobility management function network element corresponds to a terminal in a multicast group corresponding to the multicast service, and the second access and mobility management function network element corresponds to the multicast group corresponding to the multicast service.

Based on the method according to the thirteenth aspect, after the access network device determines to deactivate the multicast session, the access network device may send the information for deactivating the multicast session to a core network side device, so that the core network side device deactivates the multicast session based on the information sent by the access network device. This reduces resource overheads.

In a possible design, the determining, by an access network device, to deactivate a multicast session of a multicast service includes: if duration in which the access network device does not receive data of the multicast service on the multicast session is greater than preset duration, determining, by the access network device, to deactivate the multicast session of the multicast service; or if there is no terminal that receives the data of the multicast service in terminals served by the access network device, determining, by the access network device, to deactivate the multicast session of the multicast service. Based on the possible design, the multicast session is deactivated when the data of the multicast service is not transmitted or no terminal receives the data of the multicast service, to avoid affecting receiving of the data of the multicast service by another terminal.

In a possible design, the eighth information is further for notifying to release a transmission tunnel of the multicast session, to reduce transmission tunnel occupation and improve resource utilization.

In a possible design, the eighth information includes identification information of the multicast session. The identification information of the multicast session includes one or more of identification information of the multicast service, context information of the multicast session, address information of the multicast service, identification information of a PDU session associated with the multicast session, and identification information of a service data flow SDF of the multicast service. Based on the possible design, the multicast session may be indicated based on a plurality of types of information, which is flexible and diversified and has a wide application scope.

In a possible design, an air interface resource for the multicast session is released to reduce resource occupation and improve resource utilization.

According to a fourteenth aspect, this application provides a communication apparatus. The communication apparatus may be an access network device, or a chip or a system-on-a-chip in the access network device. The communication apparatus may implement functions performed by the access network device according to any one of the thirteenth aspect or the possible designs of the thirteenth aspect. The functions may be implemented by hardware, or may be implemented by hardware executing corresponding software. The hardware or the software includes one or more modules corresponding to the functions. For example, the communication apparatus may include a processing unit and a sending unit.

The processing unit is configured to determine to deactivate a multicast session corresponding to a multicast service.

The sending unit is configured to send eighth information to a first access and mobility management function network element or a second access and mobility management function network element, where the eighth information indicates to deactivate the multicast session, the first access and mobility management function network element corresponds to a terminal in a multicast group corresponding to the multicast service, and the second access and mobility management function network element corresponds to the multicast group corresponding to the multicast service.

For a specific implementation of the communication apparatus, refer to behavior functions in the communication method according to any one of the thirteenth aspect or the possible designs of the thirteenth aspect. Any one of the thirteenth aspect or the possible designs of the thirteenth aspect may be correspondingly implemented by the processing unit and the sending unit that are included in the communication apparatus.

According to a fifteenth aspect, a communication apparatus is provided, including a processor and a memory, where the memory is configured to store computer executable instructions; and when the communication apparatus runs, the processor executes the computer executable instructions stored in the memory, so that the communication apparatus performs the communication method according to any one of the thirteenth aspect or the possible designs of the thirteenth aspect.

According to a sixteenth aspect, a computer-readable storage medium is provided, where the computer-readable storage medium stores instructions; and when the instructions are run on a computer, the computer is enabled to perform the communication method according to any one of the thirteenth aspect or the possible designs of the thirteenth aspect.

According to a seventeenth aspect, a computer program product is provided, including instructions; and when the instructions are run on a computer, the computer is enabled to perform the communication method according to any one of the thirteenth aspect or the possible designs of the thirteenth aspect.

According to an eighteenth aspect, a chip system is provided. The chip system includes a processor and a communication interface, configured to support a communication apparatus in implementing functions in the foregoing aspects. For example, the processor determines to deactivate a multicast session corresponding to a multicast service, and sends eighth information to a first access and mobility management function network element or a second access and mobility management function network element, where the eighth information indicates to deactivate the multicast session, the first access and mobility management function network element corresponds to a terminal in a multicast group corresponding to the multicast service, and the second access and mobility management function network element corresponds to the multicast group corresponding to the multicast service. In a possible design, the chip system further includes a memory. The memory is configured to store program instructions and data that are necessary for the communication apparatus. The chip system may include a chip, or may include a chip and another discrete component.

For technical effects achieved by any one of the fifteenth aspect to the eighteenth aspect, refer to the technical effects achieved by any one of the thirteenth aspect or the possible designs of the thirteenth aspect. Details are not described again.

According to a nineteenth aspect, a communication method is provided. The method includes: receiving, by a first terminal, a paging message; determining, by the first terminal, that a PDU session associated with a multicast session is in a deactivated state; and sending, by the first terminal, a first message (for example, a service request) to an access network device, where the first message is for activating the PDU session associated with the multicast session.

Based on the method according to the nineteenth aspect, when receiving the paging message, if determining that the PDU session associated with the multicast session is in the deactivated state, the first terminal sends, to the access network device, the first message for activating the PDU session associated with the multicast session, to activate the PDU session associated with the multicast session. In this way, data of a multicast service is subsequently mapped/injected to the PDU session in an application scenario (for example, a handover scenario), to ensure normal transmission of the data of the multicast service.

In a possible design, the paging message includes identification information of the first terminal or identification information of a multicast group. In other words, paging may be initiated to a single terminal, or group paging may be initiated. Paging manners are flexible and diversified, and an application scope is wide.

According to a twentieth aspect, this application provides a communication apparatus. The communication apparatus may be a first terminal, or a chip or a system-on-a-chip in the first terminal. The communication apparatus may implement functions performed by the first terminal according to any one of the nineteenth aspect or the possible designs of the nineteenth aspect. The functions may be implemented by hardware, or may be implemented by hardware executing corresponding software. The hardware or the software includes one or more modules corresponding to the functions. For example, the communication apparatus may include a receiving unit, a processing unit, and a sending unit.

The receiving unit is configured to receive a paging message.

The processing unit is configured to determine that a PDU session associated with a multicast session is in a deactivated state.

The sending unit is configured to send a first message (for example, a service request) to an access network device, where the first message is for activating the PDU session associated with the multicast session.

For a specific implementation of the communication apparatus, refer to behavior functions of the first terminal in the communication method according to any one of the nineteenth aspect or the possible designs of the nineteenth aspect. Any one of the nineteenth aspect or the possible designs of the nineteenth aspect may be correspondingly implemented by the receiving unit, the processing unit, and the sending unit that are included in the communication apparatus.

According to a twenty-first aspect, a communication apparatus is provided, including a processor and a memory. The memory is configured to store computer executable instructions; and when the communication apparatus runs, the processor executes the computer executable instructions stored in the memory, so that the communication apparatus performs the communication method according to any one of the nineteenth aspect or the possible designs of the nineteenth aspect.

According to a twenty-second aspect, a computer-readable storage medium is provided. The computer-readable storage medium stores instructions. When the instructions are run on a computer, the computer is enabled to perform the communication method according to any one of the nineteenth aspect or the possible designs of the nineteenth aspect.

According to a twenty-third aspect, a computer program product including instructions is provided. When the computer program product runs on a computer, the computer is enabled to perform the communication method according to any one of the nineteenth aspect or the possible designs of the nineteenth aspect.

According to a twenty-fourth aspect, a chip system is provided. The chip system includes a processor and a communication interface, configured to support a communication apparatus in implementing functions in the foregoing aspects. For example, the processor receives a paging message through the communication interface, determines that a PDU session associated with a multicast session is in a deactivated state, and sends a first message (for example, a service request) to an access network device, where the first message is for activating the PDU session associated with the multicast session. In a possible design, the chip system further includes a memory. The memory is configured to store program instructions and data that are necessary for the communication apparatus. The chip system may include a chip, or may include a chip and another discrete component.

For technical effects achieved by any one of the designs of the twenty-first aspect to the twenty-fourth aspect, refer to technical effects achieved by any one of the nineteenth aspect or the possible designs of the nineteenth aspect. Details are not described again.

According to a twenty-fifth aspect, a communication system is provided. The communication system may include the communication apparatus or the chip system according to any one of the eighth aspect to the twelfth aspect, and the second session management function network element referred by any one of the eighth aspect to the twelfth aspect. Alternatively, the communication system includes the communication apparatus or the chip system according to any one of the fourteenth aspect to the eighteenth aspect, and the first access and mobility management function network element referred by any one of the fourteenth aspect to the eighteenth aspect. Alternatively, the communication system includes the communication apparatus or the chip system according to any one of the fourteenth aspect to the eighteenth aspect, and the second access and mobility management function network element referred by any one of the fourteenth aspect to the eighteenth aspect.

According to a twenty-sixth aspect, an embodiment of this application further provides a communication method. The method includes: receiving, by an access network device, data of a multicast service; determining, by the access network device, the multicast service corresponding to the received data; and sending, by the access network device, a paging message to a terminal in an RRC_inactive state in a multicast group corresponding to the multicast service.

Based on the method according to the twenty-sixth aspect, when the access network device determines that data received from a user plane is the data of the multicast service, the access network device is triggered to page the terminal in the RRC_inactive state in the multicast group corresponding to the multicast service, to ensure that the terminal in the multicast group normally receives the data of the multicast service.

In a possible design, the determining, by the access network device based on the data, to activate the multicast service includes: determining, by the access network device, that the data corresponds to the multicast service; determining that the multicast service is in a deactivated state; and determining to activate the multicast service.

In a possible design, the determining, by the access network device, that the data corresponds to the multicast service includes: determining, by the access network device based on information about a tunnel for transmitting the data and/or a correspondence between the information about the tunnel and identification information of the multicast service, that the data corresponds to the multicast service. Based on the possible design, the tunnel for transmitting the data of the multicast service may be corresponding to the multicast service, to determine, based on the correspondence, that data received from the tunnel is the data of the multicast service. This simplifies a system design.

In a possible design, the sending, by the access network device, a paging message to a terminal in an RRC_inactive state in a multicast group corresponding to the multicast service includes: determining, by the access network device, the terminal in the RRC_inactive state from a terminal in the multicast group; and sending the paging message to the terminal in the RRC_inactive state.

It is assumed that the terminal in the RRC_inactive state includes a first terminal and a second terminal. The sending, by the access network device, a paging message to a terminal in an RRC_inactive state in a multicast group corresponding to the multicast service includes: sending, by the access network device, a first paging message in an RNA of the first terminal, where the first paging message includes identification information of the first terminal; and sending a second paging message in an RNA of the second terminal, where the second paging message includes identification information of the second terminal; or sending, by the access network device, a paging message in an RNA of the first terminal and an RNA of the second terminal, where the paging message includes the identification information of the multicast service.

The sending, by the access network device, a paging message in an RNA of the first terminal and an RNA of the second terminal includes: sending, by the access network device, a paging message in an overlapping area between the RNA of the first terminal and the RNA of the second terminal once in one paging cycle.

Based on the possible design, the paging message may be sent at a granularity of per UE, or the paging message may be sent at a granularity of a plurality of UEs, so that a plurality of manners of paging the terminal in the multicast group are provided, and the terminal in the RRC_inactive state is flexibly and effectively paged. In addition, when the paging message is sent at a granularity of a plurality of UEs, the paging message is sent only once in an overlapping area, to reduce signaling overheads.

According to a twenty-seventh aspect, an embodiment of this application further provides a communication method. The method includes: receiving, by an access network device from an access and mobility management function network element, information indicating to activate a multicast session corresponding to a multicast service; and sending, by the access network device based on the information, a paging message to a terminal in an RRC_inactive state in a multicast group corresponding to the multicast service.

Based on the method according to the twenty-seventh aspect, the access network device may learn, from a core network, of deactivating the multicast session, to trigger the access network device to page the terminal in the RRC_inactive state in the multicast group corresponding to the multicast service, to ensure that the terminal in the multicast group normally receives data of the multicast service.

In a possible design, the sending, by the access network device, a paging message to a terminal in a radio resource control_inactive RRC_inactive state in a multicast group corresponding to the multicast service includes: determining, by the access network device, the terminal in the RRC_inactive state from a terminal in the multicast group; and sending the paging message to the terminal in the RRC_inactive state.

It is assumed that the terminal in the RRC_inactive state includes a first terminal and a second terminal. The sending, by the access network device, a paging message to a terminal in an RRC_inactive state in a multicast group corresponding to the multicast service includes: sending, by the access network device, a first paging message in an RNA of the first terminal, where the first paging message includes identification information of the first terminal; and sending a second paging message in an RNA of the second terminal, where the second paging message includes identification information of the second terminal; or sending, by the access network device, a paging message in an RNA of the first terminal and an RNA of the second terminal, where the paging message includes the identification information of the multicast service.

The sending, by the access network device, a paging message in an RNA of the first terminal and an RNA of the second terminal includes: sending, by the access network device, a paging message in an overlapping area between the RNA of the first terminal and the RNA of the second terminal once in one paging cycle.

Based on the possible design, the paging message may be sent at a granularity of per UE, or the paging message may be sent at a granularity of a plurality of UEs, so that a plurality of manners of paging the terminal in the multicast group are provided, and the terminal in the RRC_inactive state is flexibly and effectively paged. In addition, when the paging message is sent at a granularity of a plurality of UEs, the paging message is sent only once in an overlapping area, to reduce signaling overheads.

According to a twenty-eighth aspect, an embodiment of this application further provides a communication system. The communication system may include: a session management function network element, configured to determine to deactivate a multicast session corresponding to a multicast service, and send, to an access and mobility management function network element, information indicating to deactivate the multicast session; the access and mobility management function network element, configured to receive the information and send the information to an access network device; and the access network device, configured to: receive the information, and send, based on the information, a paging message to a terminal in a radio resource control_inactive_RRC inactive state in a multicast group corresponding to the multicast service.

BRIEF DESCRIPTION OF DRAWINGS

FIG. 6A and FIG. 6B are a flowchart of a communication method according to an embodiment of this application;

FIG. 14a-1 to FIG. 14a-3 are a flowchart of another communication method according to an embodiment of this application;

DESCRIPTION OF EMBODIMENTS

Prior to description of embodiments of this application, related technical terms in embodiments of this application are explained and described. It should be noted that, the explanations and descriptions are intended to facilitate understanding of embodiments of this application, but should not be construed as limiting the protection scope required by embodiments of this application.

A protocol data unit (PDU) session is a transmission path (or referred to as a transmission tunnel) for transmitting service data (for example, data of a multicast service or data of a unicast service) to a terminal in a unicast manner. The PDU session may include a transmission path from a data network to a core network device (for example, a user plane function network element), and an air interface resource allocated by an access network device for sending service data to a specific terminal. After receiving service data transmitted in a PDU session, the access network device may send, on an air interface, the service data to a terminal corresponding to the PDU session in a point-to-point (point to point, PTP) unicast manner. One PDU session is oriented to one terminal, the PDU session is at a user equipment (UE) level, and one terminal corresponds to one or more PDU sessions.

Figure 1A:
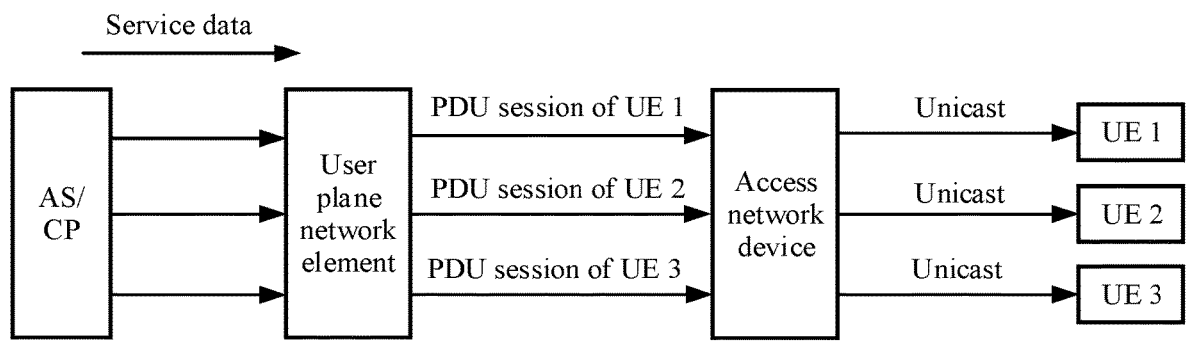
FIG. 1a is a schematic diagram of a PDU session.

For example, as shown in FIG. 1a, each of three terminals (for example, a terminal 1, a terminal 2, and a terminal 3) corresponds to one PDU session. Three different pieces of service data sent by a content provider (for example, an application server/content provider (AS/CP)) may be sent to the terminals by using PDU sessions corresponding to the terminals, for example, from the AS/CP to the terminals through a user plane function network element and an access network device. The three PDU sessions in FIG. 1a respectively correspond to the three terminals. After receiving the service data transmitted in the three PDU sessions, the access network device may respectively send the service data to the terminal 1, the terminal 2, and the terminal 3 in a unicast manner, that is, a PTP manner. In FIG. 1a, the service data of the terminals may be different (for example, destination addresses are internet protocol (IP) addresses of the terminals), and the service data of each terminal may be sent to the corresponding terminal by using the PDU session corresponding to each terminal.

A multicast session may provide a transmission service for a multicast service. The multicast session may be a transmission path for transmitting data of a multicast service to a plurality of terminals in a multicast group in a multicast manner. The plurality of terminals joining the multicast group may share the multicast session. The multicast session may include a transmission path from a data network to a core network device (for example, a user plane function network element), a multicast session tunnel from the user plane function network element to the access network device and for transmitting the data of the multicast service, and an air interface resource allocated by an access network device for sending the data of the multicast service. After receiving the service data transmitted in the multicast session, on an air interface, the access network device may send, in a point-to-multipoint (point to multi-point, PTM) multicast manner, one piece of service data to a plurality of terminals that join a multicast group corresponding to the multicast session, transmit the service data on an air interface resource allocated by the access network device to the plurality of terminals, and send the service data to the plurality of terminals. One multicast session is oriented to a plurality of terminals in one multicast group, one multicast group corresponds to one or more multicast sessions, the multicast session is of a service level, and one type of multicast services may correspond to one or more multicast sessions.

Figure 1B:
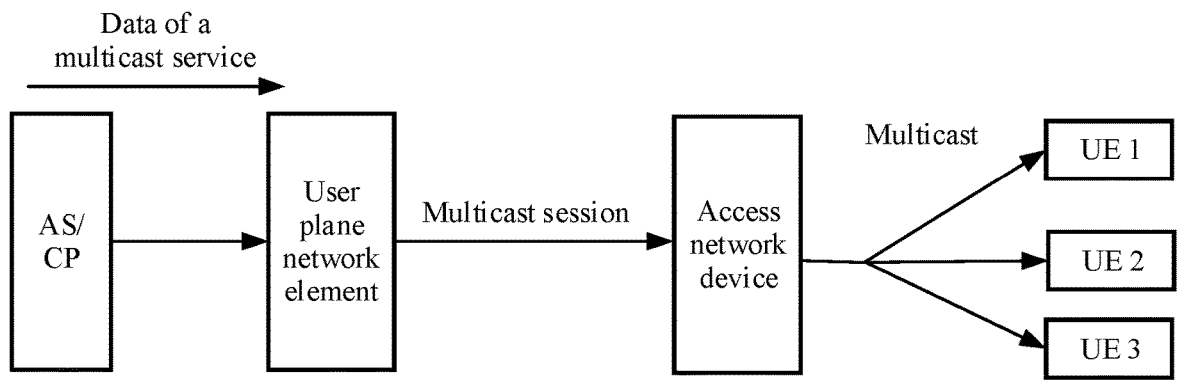
FIG. 1B is a schematic diagram of a multicast session.

For example, as shown in FIG. 1b, data of a multicast service may be sent from an AS/CP to a terminal 1, a terminal 2, and a terminal 3 by using a multicast session. A transmission path from the AS/CP to an access network device may include a transmission path between the AS/CP and a user plane function network element and a transmission path (for example, the multicast session) between the user plane function network element and the access network device. The multicast session is shared by the terminal 1, the terminal 2, and the terminal 3. On an air interface, the access network device sends the data of the multicast service to the terminal 1, the terminal 2, and the terminal 3. In other words, only one piece of data of the multicast service needs to be sent, and all the three terminals can receive the data.

It should be noted that, "multicast" in this application is a concept in a broad sense, and may include multicast or broadcast. That is, embodiments of this application may be applied to both multicast service transmission and broadcast service transmission. "Multicast" mentioned in this application may be replaced with "multicast or broadcast". In addition, the multicast session in this application may be replaced with a multicast service session or a multicast broadcast service session (MBS session). This is not limited.

In a possible implementation, a terminal may join, by using any one of one or more PDU sessions established by the terminal, a multicast group corresponding to a multicast session. For example, the terminal joins the multicast group by using a control plane message (for example, a PDU session establishment/modification request) of the PDU session. The control plane message carries identification information of a multicast service, indication information for joining the multicast group, and the like. For another example, the terminal joins the multicast group by using a user plane notification message (for example, internet group management protocol/multicast listener discovery join (IGMP/MLD join)) of the PDU session. The user plane notification message carries, for example, identification information of a multicast service and indication information for joining the multicast group.

It should be understood that joining a multicast group in this application may be alternatively described as joining a multicast session, joining a multicast service, joining a multicast broadcast service (MBS), joining a multicast session corresponding to a multicast service, joining a multicast broadcast service session (MBS session) corresponding to a multicast service, or the like. This is not limited.

In embodiments of this application, if a PDU session is used by a terminal to join a multicast group corresponding to a multicast session, the PDU session may be referred to as a PDU session associated with the multicast session. Further, after the terminal joins the multicast group corresponding to the multicast session by using the PDU session, an association relationship between the PDU session and the multicast session may be recorded in the terminal, an access network device, and a core network device (such as an access and mobility management function network element, a session management function network element, or a network repository function network element (such as a unified data repository (UDR))). For example, the association relationship between the PDU session and the multicast session may be recorded in one or more of the following manners: (1) A session management context (SM context) of the PDU session stores related information of a multicast service (for example, identification information of the multicast service). (2) An ID of the SM context of the PDU session points to the multicast service. For example, the ID of the SM context of the PDU session is stored in correspondence with the identification information of the multicast service. (3) A context (for example, a multicast/broadcast service session context (MBS session context), a multicast/broadcast group context (MBS group context), a multicast/broadcast service context (MBS context), or a multicast/broadcast context (MB context)) corresponding to the multicast service stores terminal information (for example, identification information of the terminal) and/or information (for example, identification information of the PDU session) about the PDU session associated with the multicast session.

In embodiments of this application, the identification information of the terminal may be for identifying the terminal, and the identification information of the terminal may include but is not limited to a subscription concealed identifier (SUCI) of the terminal, a subscription permanent identifier (SUPI) of the terminal, a generic public subscription identifier (GPSI) of the terminal, or the like.

In embodiments of this application, the identification information of the PDU session may be for identifying the PDU session. The identification information of the PDU session may include but is not limited to an ID of the PDU session, a session management context identifier (SM context ID) of the PDU session, or the like.

It should be noted that, in embodiments of this application, joining a multicast session by using a PDU session may be alternatively described as joining a multicast/broadcast service (MBS) by using a PDU session, and associating a PDU session with a multicast session may be alternatively described as associating a PDU session with a multicast/broadcast service. This is not limited.

Figure 1C:
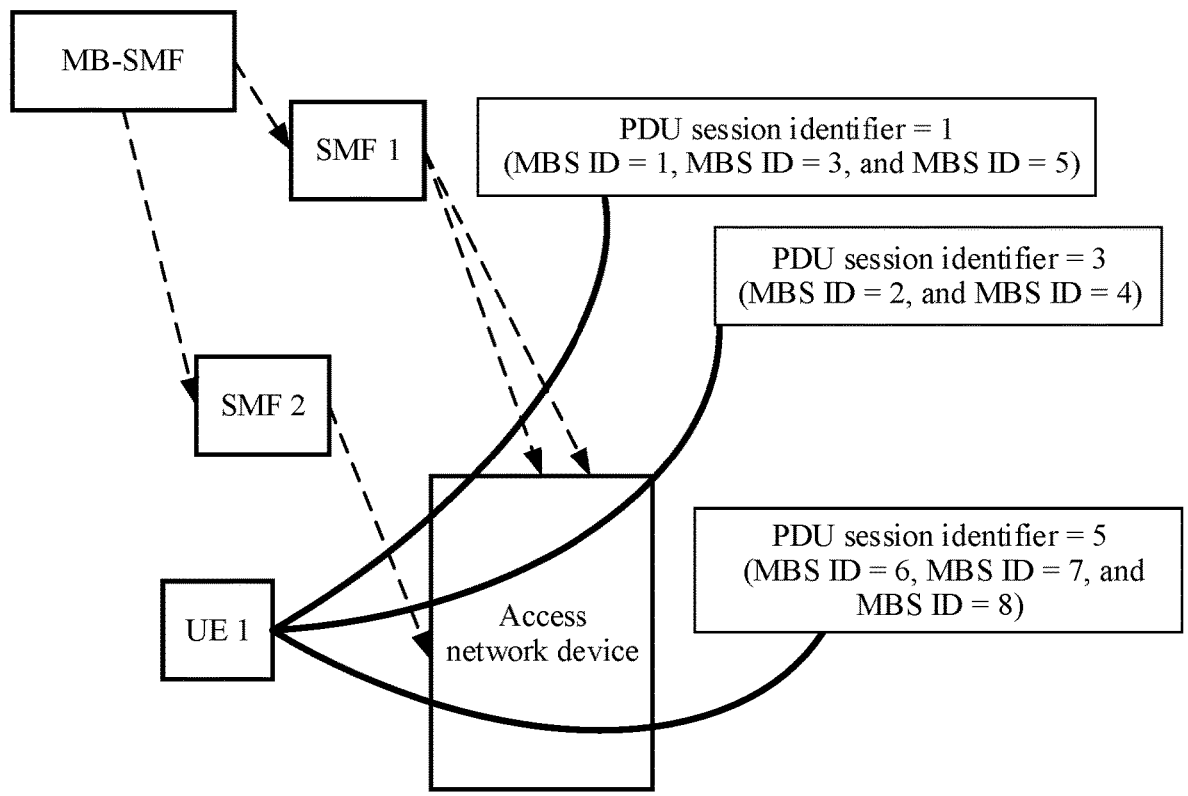
FIG. 1c is a schematic diagram of association between a PDU session and a multicast session.

For example, FIG. 1c is a schematic diagram of association between a PDU session and a multicast session of user equipment (UE). UE 1 has three PDU sessions, and identifiers (PDU session IDs) of the three PDU sessions are 1, 3, and 5. It is assumed that a PDU session whose ID is 1 and a PDU session whose ID is 3 are served by a session management function (SMF) 1, and a PDU session whose ID is 5 is served by an SMF 2. The UE 1 joins three multicast services (or referred to as multicast sessions) by using the PDU session whose ID is 1, and MBS IDs are 1, 3, and 5 respectively. In other words, the PDU session whose PDU session ID is 1 is associated with three MBSs whose MBS IDs are 1, 3, and 5 respectively. Similarly, the PDU session whose ID is 3 is associated with two MBSs whose MBS IDs are 2 and 4 respectively. The PDU session whose ID is 5 is associated with three MBSs whose MBS IDs are 6, 7, and 8 respectively. An MB-SMF in FIG. 1c is a multicast/broadcast session management function (MBS-session management function) network element, and is responsible for establishing and managing a multicast session, and the like. The relationship shown in FIG. 1c may be stored in an SM context of a PDU session, a multicast service-related context, or a UDR. This is not limited herein.

It can be learned from the foregoing descriptions that there is an association relationship between a PDU session used by a terminal to join a multicast session and the multicast session that the terminal joins. In a communication process, if the PDU session is deactivated without considering the association relationship between the PDU session and the multicast session, data of a multicast service fails to be switched from the multicast session to the PDU session associated with the multicast session, and transmission continuity of the data of the multicast service is affected. For another example, continuity of a multicast service cannot be ensured if the associated PDU session is not activated during handover of the terminal device. Specifically, during the handover, data of the multicast service transmitted in the multicast session may be injected to the PDU session associated with the multicast session, and then the handover is performed. In this way, continuity of the multicast service can be ensured. If the associated PDU session is still in a deactivated state when the handover is performed, the data of the multicast service cannot be mapped/injected to the PDU session, to ensure normal transmission of the data of the multicast service during the handover.

To resolve the problem, an embodiment of this application provides a communication method. The method may include: When a PDU session of a first terminal is deactivated, whether the to-be-deactivated PDU session is associated with a multicast session corresponding to a multicast service is determined, and whether the multicast session is in an active state is determined, that is, whether the multicast session associated with the to-be-deactivated PDU session is in the active state is determined. If the PDU session is associated with the multicast session and the multicast session is in an active state, the PDU session is kept in an active state. If the multicast session is in a deactivated state, the PDU session may be deactivated. Further, optionally, when receiving second information (for example, multicast/broadcast service session start (MBS session start), multicast/broadcast service session activation (MBS session activation), or multicast session activation) for activating the multicast session, a first session management function network element corresponding to the first terminal may determine whether the PDU session associated with the multicast session is in an active state. If the PDU session associated with the multicast session is in a deactivated state, the first session management function network element needs to activate the PDU session associated with the multicast session. This ensures normal transmission of data of the multicast service when the multicast service is switched from the multicast session to the PDU session. Specifically, for the implementation, refer to descriptions in embodiments corresponding to FIG. 5 to FIG. 7.

Alternatively, an embodiment of this application provides another communication method. The method may include: When a first session management function network element corresponding to a first terminal receives second information (for example, multicast/broadcast service session start (MBS session start), multicast/broadcast service session activation (MBS session activation), or multicast session activation (Multicast session activation)) indicating to activate a multicast session, the first session management function network element notifies an access network device to add the first terminal to a multicast group corresponding to the multicast session. Further, optionally, if a PDU session associated with the multicast session is in a deactivated state, the PDU session associated with the multicast session is activated, to ensure normal transmission of data of a multicast service when the multicast service is switched from the multicast session to the PDU session, or ensure continuity of the multicast service during handover of the first terminal. Specifically, for the implementation, refer to descriptions in embodiments corresponding to FIG. 8 to FIG. 14a-3.

It should be noted that, in embodiments of this application, the multicast session associated with the PDU session may include one or more multicast sessions. In embodiments of this application, that the multicast session is in the deactivated state means that at least one of the multicast sessions associated with the PDU session is in the deactivated state.

The following describes the technical solutions in embodiments of this application with reference to the accompanying drawings in embodiments of this application.

Figure 2:
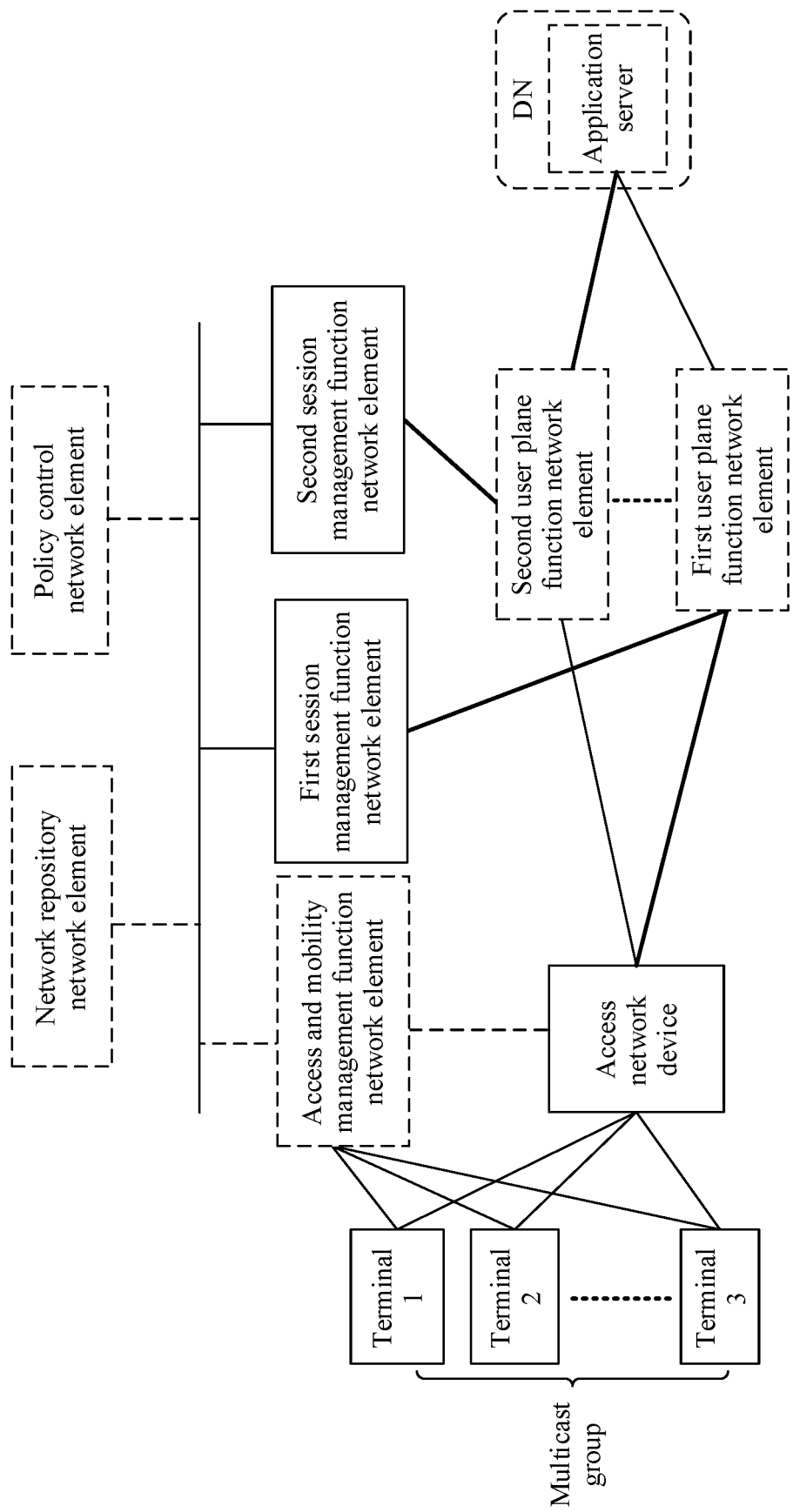
FIG. 2 is a schematic diagram of an architecture of a communication system.

The communication method provided in embodiments of this application may be applied to a communication system shown in FIG. 2. As shown in FIG. 2, the communication system may include a plurality of terminals (for example, a first terminal), an access network device, and a first session management function network element. Further, the communication system shown in FIG. 2 may further include an access and mobility management function network element, a first user plane function network element, a second session management function network element, a second user plane function network element, a policy control network element, a network repository network element, and a data network (DN). The DN may include an application server (AS) and the like. The access and mobility management function network element, the first user plane function network element, the second session management function network element, the second user plane function network element, and the DN are optional network elements in this application.

The plurality of terminals may form a multicast group, and the plurality of terminals may simultaneously receive same data, namely, multicast service data. The first user plane function network element may be configured to transmit unicast data, or may be configured to transmit multicast service data. The second user plane function network element may be configured to transmit multicast service data. The unicast data may be data sent to a specific terminal or user, and the multicast service data may be data sent to a multicast group. The first session management function network element may be a session management function network element that manages a PDU, and the second session management function network element may be a session management function network element that manages a multicast service. The following describes network elements or devices in the architecture shown in FIG. 2.

The terminal may be referred to as a terminal device (terminal equipment), user equipment (UE), a mobile station (MS), a mobile terminal (MT), or the like. Specifically, the terminal in FIG. 2 may be a mobile phone, a tablet computer, or a computer having a wireless transceiver function, or may be a virtual reality (VR) terminal, an augmented reality (AR) terminal, a wireless terminal in industrial control, a wireless terminal in self-driving, a wireless terminal in telemedicine, a wireless terminal in a smart grid, a wireless terminal in a smart city, a smart home, a vehicle-mounted terminal, or the like.

The access network device is mainly configured to implement functions such as a physical layer function, resource scheduling and management, and access control and mobility management of the terminal. The access network device may be a device supporting wired access, or may be a device supporting wireless access. For example, the access network device may be an access network (AN)/a radio access network (RAN), where the AN/RAN includes a plurality of 5G-AN/5G-RAN nodes. A 5G-AN/5G-RAN node may be an access point (AP), a NodeB (NB), an enhanced NodeB (eNB), a next-generation NodeB (NR NodeB, gNB), a transmission reception point (TRP), a transmission point (TP), another access node, or the like.

The access and mobility management function network element is mainly responsible for access authentication and mobility management of the terminal, signaling exchange between functional network elements, and the like, such as management of a registration status of a user, a connection status of a user, user registration and network access, tracking area update, user authentication during cell handover, and key security.

The session management function network element is mainly configured to implement a user plane transmission logical channel, for example, a session management function such as establishment, release, and change of a packet data unit (PDU) session or a multicast session.

The user plane function network element may be used as an anchor on the user plane transmission logical channel, and is configured to complete functions such as routing and forwarding of user plane data. For example, the user plane function network element establishes a channel (namely, the user plane transmission logical channel) between the user plane function network element and the terminal, forwards a data packet between the terminal and the DN on the channel, and is responsible for data packet filtering, data forwarding, rate control, and generation of charging information for the terminal.

The policy control network element may be configured to provide a policy, for example, a quality of service policy or a slice selection policy, for the access and mobility management function network element and the session management function network element.

The network repository network element may be configured to store user data such as subscription information and authentication or authorization data of a user. Specifically, the network repository network element may be a unified data management (UDM) network element, a network repository function (NRF), a unified data repository (UDR), or the like.

The DN may be an operator network that provides a data transmission service for a user, for example, may be an operator network that provides an IP multimedia service (IMS) for the user. An application server may be deployed in the DN, and the application server may provide a data transmission service for the user.

It should be noted that FIG. 2 is merely an example diagram of the architecture. In addition to the functional units shown in FIG. 2, the system may further include another functional network element, for example, an operation and management (O&M) network element. This is not limited in this embodiment of this application. In addition, names of the devices in FIG. 2 are not limited. In addition to the names shown in FIG. 2, the devices may also have other names. For example, the names may be replaced with names of network elements having same or similar functions. This is not limited.

The system shown in FIG. 2 may be a 3rd Generation Partnership Project (3GPP) communication system, for example, a 4th generation (4G) communication system, a long term evolution (LTE) system, a 5th generation (5G) communication system, a new radio (NR) system, a next generation communication system, or a non-3GPP communication system. This is not limited.

Figure 3A:
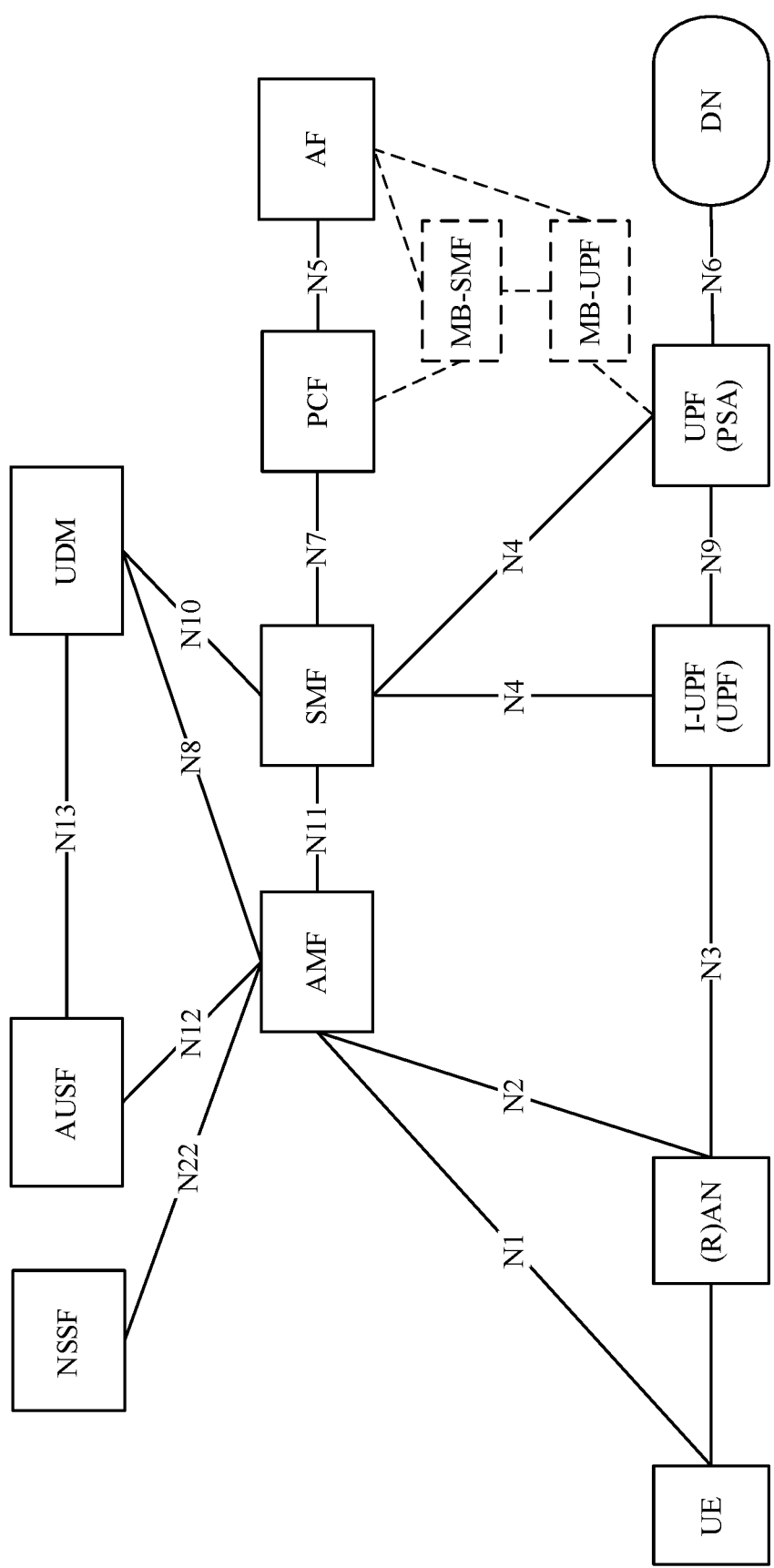
FIG. 3a is a schematic diagram of an architecture of a 5G communication system.

For example, the communication system shown in FIG. 2 is a 5G communication system shown in FIG. 3a. As shown in FIG. 3a, a network element or an entity corresponding to the second session management function network element may be a multicast/broadcast session management function (multicast broadcast session management function, MB-SMF) in the 5G communication system, and a network element or an entity corresponding to the second user plane function network element may be a user plane function (multicast broadcast user plane function, MB-UPF) in the 5G communication system. A network element or an entity corresponding to the access network device may be a radio access network (RAN) in the 5G communication system. A network element or an entity corresponding to the access and mobility management function network element may be an access and mobility management function (AMF) in the 5G communication system. A policy control function may be a policy control function (PCF) in the 5G communication system.

It should be noted that, in this application, an SMF and the MB-SMF may be co-deployed, or may be separately deployed. This is not limited. In this application, a UPF and the MB-UPF may be co-deployed, or may be separately deployed. This is not limited.

Figure 3B:
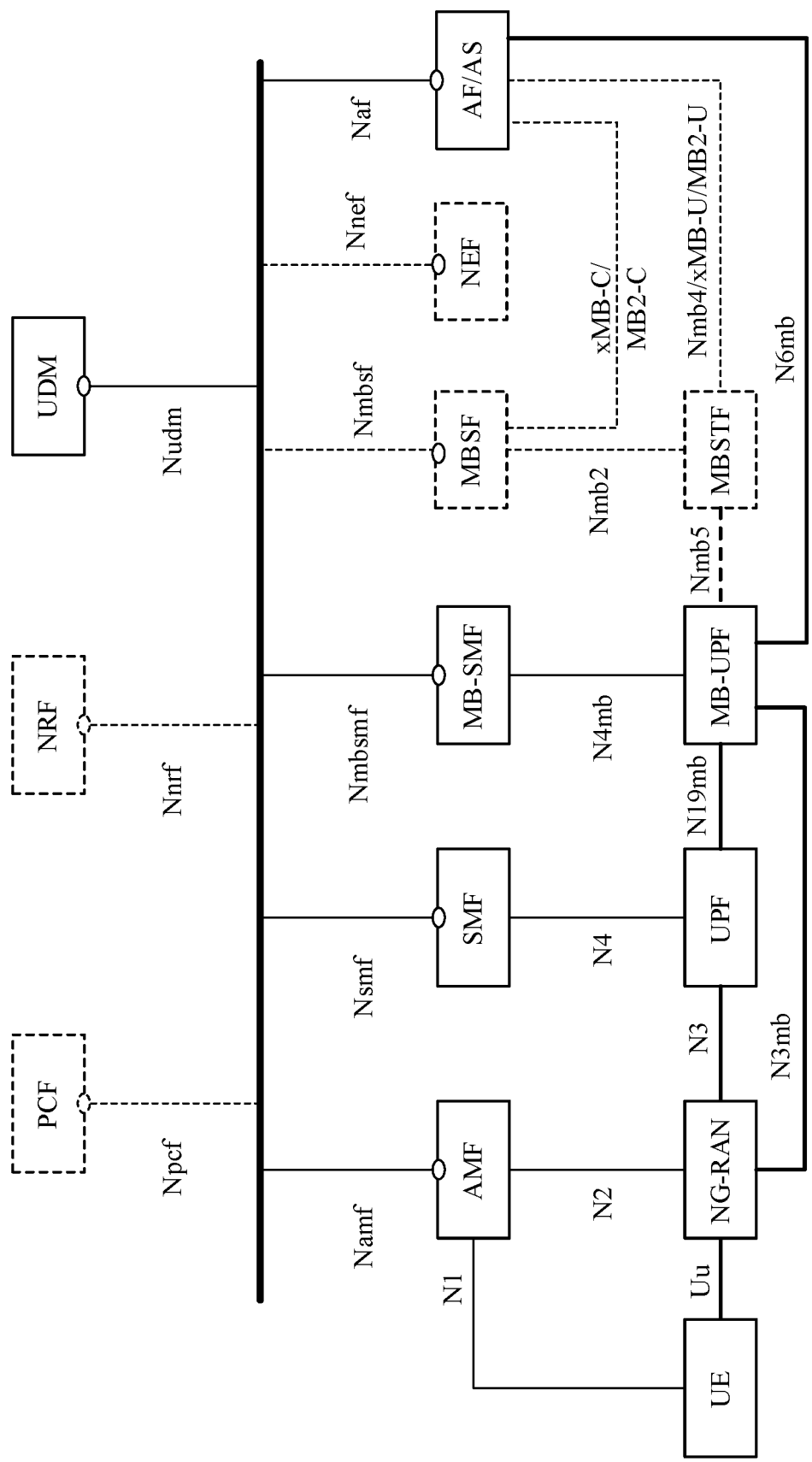
FIG. 3b is a schematic diagram of an architecture of another 5G communication system.

For example, the communication system shown in FIG. 2 is a 5G communication system shown in FIG. 3b. Different from the system shown in FIG. 3a, the system shown in FIG. 3b may further include a multicast/broadcast service transport function (MBSTF) and a multicast broadcast service function (multicast broadcast MBSF). The MBSTF may have a function of the UPF, and is configured to transmit multicast service data. The MBSF may have a function of the MB-SMF, for example, establishing/managing a multicast session corresponding to a multicast service. The MBSF may further support interworking with an MBMS in LTE, and the like.

Figure 3C:
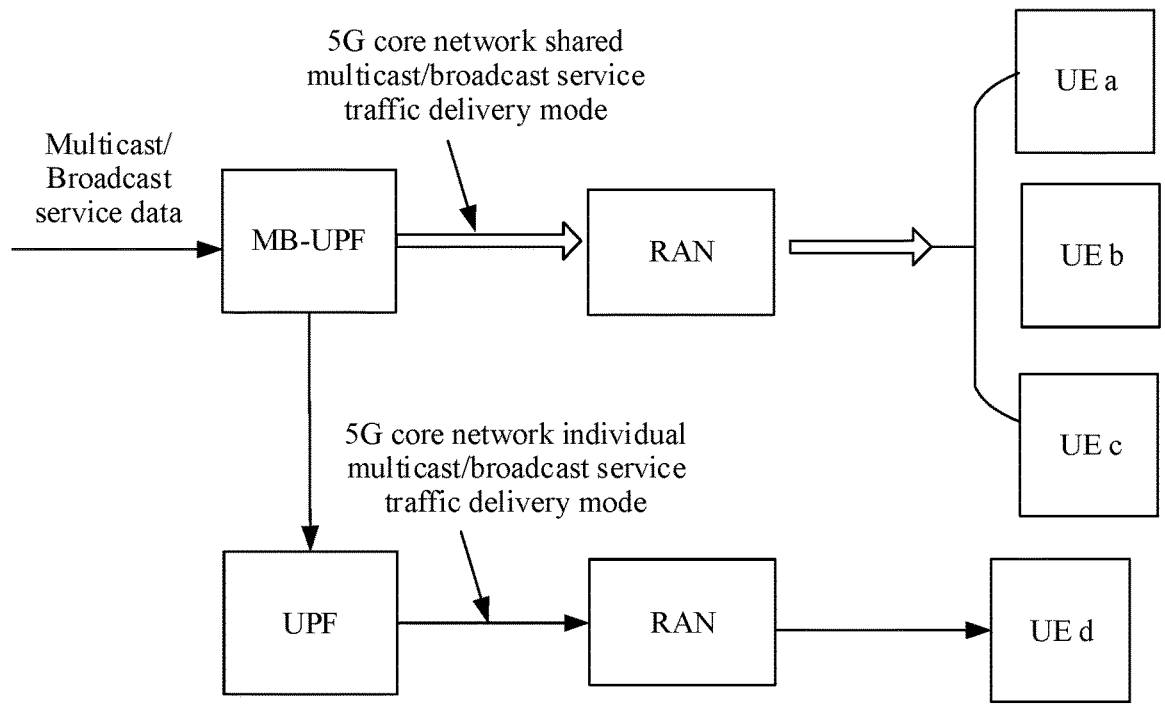
FIG. 3c is a schematic diagram of a multicast/broadcast service transmission manner according to an embodiment of this application.

In embodiments of this application, when an access network device does not support a multicast function, multicast service data may be transmitted between the access network device and a user plane function network element in a 5G core network individual multicast/broadcast service traffic delivery mode. When the access network device supports a multicast function, the multicast/broadcast service data may be transmitted in a 5G core network shared multicast/broadcast service traffic delivery (5GC shared MBS traffic delivery) mode. For example, as shown in FIG. 3c, in a 5GC shared MBS traffic delivery mode, multicast/broadcast service data directly reaches a RAN through an MB-UPF and an N3 tunnel between the MB-UPF and the RAN, and the RAN may send, in a point-to-point (point to point, PTP) or point-to-multipoint (point to multi-point, PTM) manner, the multicast/broadcast service data to a terminal that joins a multicast service. In a 5G core network individual multicast/broadcast service traffic delivery mode, multicast/broadcast service data is transmitted to a UPF through an MB-UPF and then to a RAN through an N3 tunnel (for example, a PDU session of a terminal) between the UPF and RAN. The RAN sends the data to the UE in a point-to-point manner.

That the access network device does not support the multicast function may be understood as that the access network device does not support multicast/broadcast service data transmission in the 5G core network shared multicast/broadcast service traffic delivery (5GC shared MBS traffic delivery) mode. In other words, the access network device supports only multicast/broadcast service data transmission in the 5G core network individual multicast/broadcast service traffic delivery (5GC Individual MBS traffic delivery) mode. To be specific, the multicast/broadcast service data is sent to the terminal by using an associated PDU session of the terminal that joins the multicast service.

It should be understood that, after reaching the access network device (for example, the RAN), the multicast/broadcast service data is processed by a service data adaptation protocol (SDAP) layer, a packet data convergence protocol (PDCP) layer, a radio link control (RLC) layer, a media access control (MAC) layer, and a physical layer (physical, PHY) of the RAN, and then is sent to each terminal that is to receive the multicast/broadcast service data.

Optionally, the session management function network element, the access network device, and the access and mobility management function network element in embodiments of this application each may also be referred to a communication apparatus, and may be a general-purpose device or a dedicated device. This is not specifically limited in embodiments of this application. Optionally, related functions of the session management function network element, the user plane function network element, the access network device, and the access and mobility management function network element in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 4:
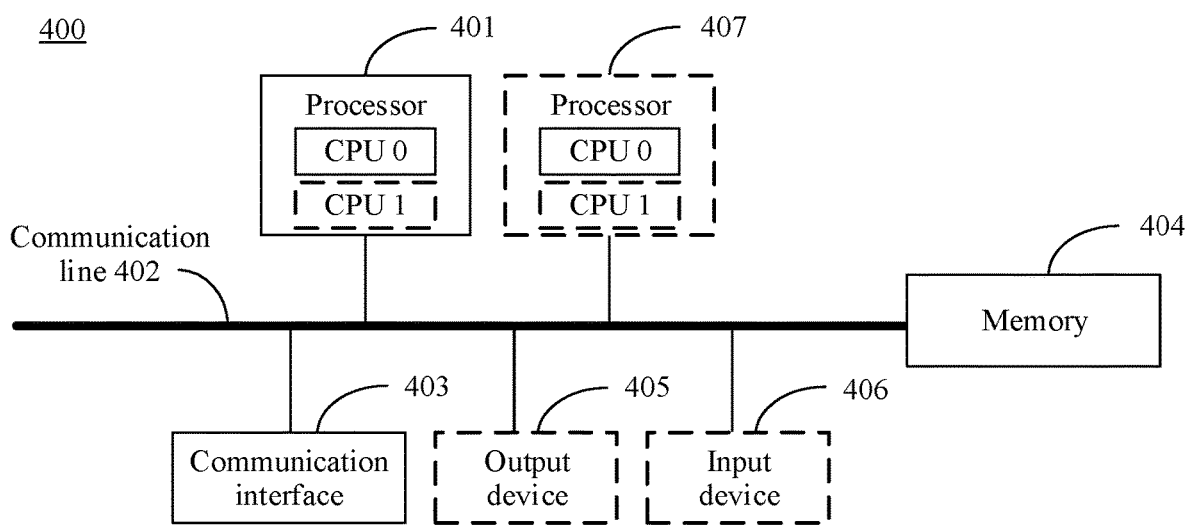
FIG. 4 is a schematic diagram of composition of a communication apparatus 400 according to an embodiment of this application.

During specific implementation, the devices shown in FIG. 2, such as the first session management function network element, the access network device, and the access and mobility management function network element, may use a composition structure shown in FIG. 4, or include components shown in FIG. 4. FIG. 4 is a schematic diagram of composition of a communication apparatus 400 according to an embodiment of this application. The communication apparatus 400 may include a processor 401 and a memory 404. Further, the communication apparatus 400 may further include a communication line 402 and a communication interface 403. The processor 401, the memory 404, and the communication interface 403 may be connected to each other through the communication line 402.

The processor 401 may be a central processing unit (CPU), a general-purpose processor, a network processor (NP), a digital signal processor (DSP), a microprocessor, a microcontroller, a programmable logic device (PLD), or any combination thereof. The processor 401 may alternatively be another apparatus having a processing function, for example, a circuit, a component, or a software module. This is not limited.

The communication line 402 is configured to transmit information between the components included in the communication apparatus 400.

The communication interface 403 is configured to communicate with another device or another communication network. The another communication network may be an Ethernet, a radio access network (RAN), a wireless local area network (WLAN), or the like. The communication interface 403 may be a module, a circuit, a transceiver, or any apparatus that can implement communication.

The memory 404 is configured to store instructions. The instructions may be a computer program.

The memory 404 may be a read-only memory (ROM) or another type of static storage device that can store static information and/or instructions; may be a random access memory (RAM) or another type of dynamic storage device that can store information and/or instructions; or may be an electrically erasable programmable read-only memory (EEPROM), a compact disc read-only memory (CD-ROM) or another compact disc storage, optical disc storage (including a compressed optical disc, a laser disc, an optical disc, a digital universal optical disc, and a Blu-ray optical disc), magnetic disk storage medium, or another magnetic storage device. This is not limited.

It should be noted that the memory 404 may exist independently of the processor 401, or may be integrated into the processor 401. The memory 404 may be configured to store instructions, program code, some data, or the like. The memory 404 may be located inside the communication apparatus 400, or may be located outside the communication apparatus 400. This is not limited.

The processor 401 is configured to execute the instructions stored in the memory 404, to implement the communication method provided in the following embodiments of this application. For example, when the communication apparatus 400 is a first session management function network element, or a chip or a system-on-a-chip in the first session management function network element, the processor 401 executes the instructions stored in the memory 404, to implement steps performed by a first session management function network element in the following embodiments of this application. For another example, when the communication apparatus 400 is an access network device, or a chip or a system-on-a-chip in the access network device, the processor 401 may execute the instructions stored in the memory 404, to implement steps performed by an access network device in the following embodiments of this application.

In an example, the processor 401 may include one or more CPUs, for example, a CPU 0 and a CPU 1 in FIG. 4.

In an optional implementation, the communication apparatus 400 includes a plurality of processors. For example, the communication apparatus 400 may further include a processor 407 in addition to the processor 401 in FIG. 4.

In an optional implementation, the communication apparatus 400 further includes an output device 405 and an input device 406. For example, the input device 406 is a device such as a keyboard, a mouse, a microphone, or a joystick, and the output device 405 is a device such as a display screen or a speaker.

It should be noted that the communication apparatus 400 may be a desktop computer, a portable computer, a network server, a mobile phone, a tablet computer, a wireless terminal, an embedded device, a chip system, or a device having a structure similar to that in FIG. 4. In addition, the composition structure shown in FIG. 4 does not constitute a limitation on the communication apparatus. In addition to the components shown in FIG. 4, the communication apparatus may include more or fewer components than those shown in the figure, or some components may be combined, or different component arrangements may be used.

In this embodiment of this application, the chip system may include a chip, or may include a chip and another discrete component.

In addition, actions, terms, and the like in embodiments of this application may be mutually referenced. This is not limited. In embodiments of this application, names of messages exchanged between devices, names of parameters in the messages, or the like are merely examples. Other names may alternatively be used during specific implementation. This is not limited.

The following uses the architecture shown in FIG. 2 as an example to describe communication methods provided in embodiments of this application. Network elements in the following embodiments may have components shown in FIG. 4. Details are not described again. It should be noted that, in embodiments of this application, names of messages exchanged between devices, names of parameters in the messages, or the like are merely examples. Other names may alternatively be used during specific implementation. For example, "determining" in embodiments of this application may also be understood as "creation (create)" or "generation (generate)", "include" in embodiments of this application may also be understood as "carrying" or the like, "indicate" in embodiments of this application may also be understood as "trigger", "notify", "request", or the like. This is not specifically limited in embodiments of this application.

Figure 5:
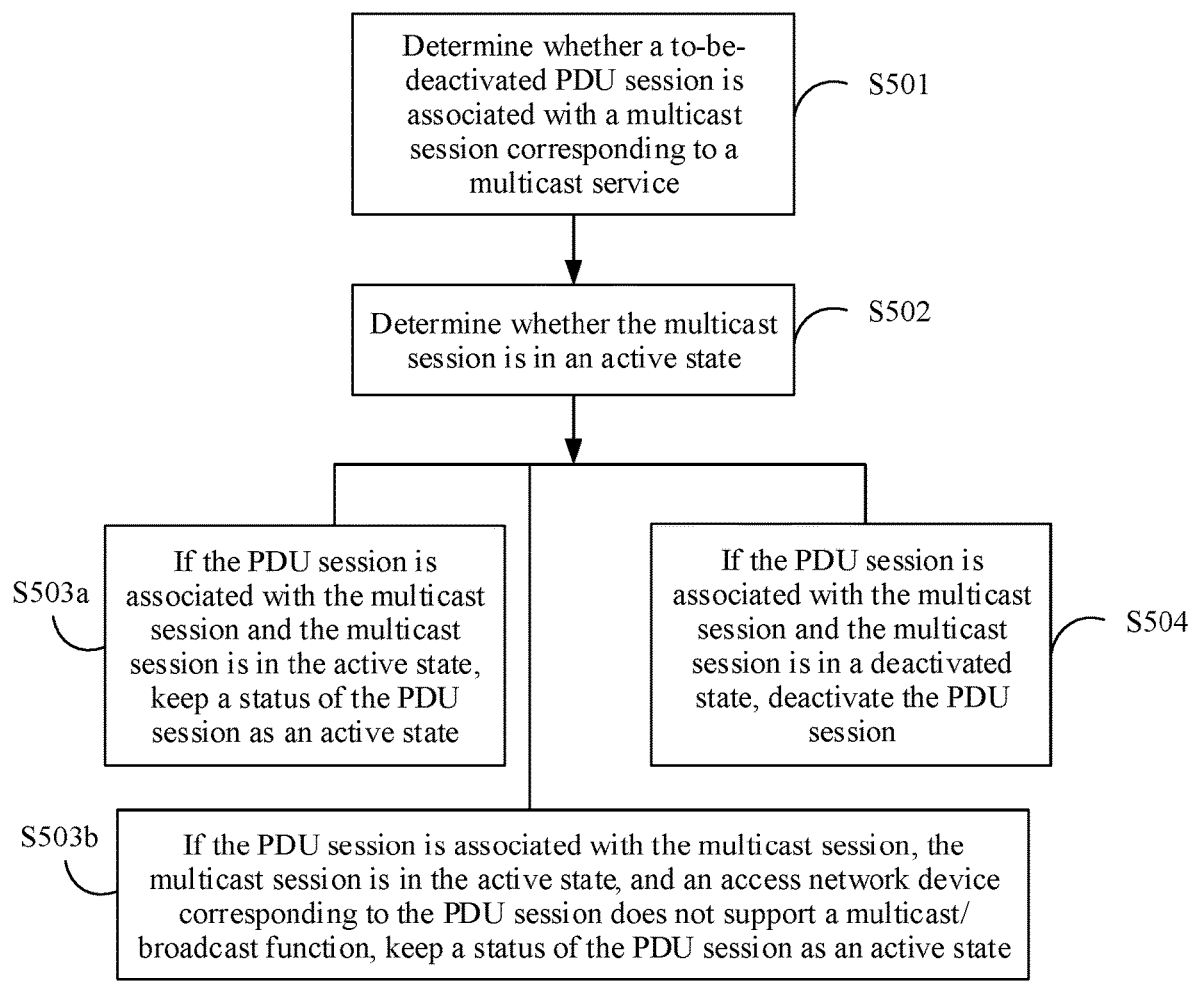
FIG. 5 is a flowchart of a communication method according to an embodiment of this application.

FIG. 5 is a flowchart of a communication method according to an embodiment of this application. The method may be performed by a first session management function network element or an access network device. The first session management function network element may be a session management function network element corresponding to a PDU session of a first terminal. The first session management function network element manages the PDU session of the first terminal. The access network device may be an access network device corresponding to the PDU session of the first terminal. As shown in FIG. 5, the method may include the following steps.

S501. Determine whether a to-be-deactivated PDU session is associated with a multicast session corresponding to a multicast service.

The PDU session may be a PDU session of a first terminal, and the first terminal may be any terminal in FIG. 2. It should be noted that, in this application, the to-be-deactivated PDU session may be the last PDU session that corresponds to the first terminal and that is in an active state/not released, or may be any one of a plurality of PDU sessions that correspond to the first terminal and that are in an active state/not released. This is not limited.

In this application, a session management function network element corresponding to the PDU session is a first session management function network element, a user plane function network element corresponding to the PDU session is a first user plane function network element, and the first user plane function network element is a PDU session anchor (PDU session anchor UPF, PSA). A session management function network element corresponding to the multicast session is a second session management function network element, and a user plane function network element corresponding to the multicast session is a second user plane function network element.

When the method shown in FIG. 5 is performed by an access network device, if the access network device does not receive data transmitted in a PDU session for a long time, the access network device determines that the PDU session is to be deactivated; or if the access network device determines that the first terminal no longer receives data transmitted in a PDU session, for example, the first terminal moves out of a service area, the access network device determines that the PDU session is to be deactivated. Alternatively, in a scenario in which the first session management function network element receives, from the first user plane function network element, information indicating that no transmission data of a PDU session is detected in a period of time, after determining that the PDU session is to be deactivated, the first session management function network element may send, to the access network device, information indicating or notifying to deactivate the PDU session. For example, the first session management function network element sends fifth information to the access network device through a first access and mobility management function network element, where the fifth information may indicate to deactivate the PDU session. The access network device receives the fifth information that is from the first session management function network element and that indicates to deactivate the PDU session, and determines, based on the fifth information, that the PDU session is to be deactivated.

The first access and mobility management function network element in this application corresponds to the first terminal, and is an access and mobility management function network element that serves non-access stratum (NAS) signaling of the first terminal. The second access and mobility management function network element corresponds to a multicast group corresponding to the multicast session.

When the method shown in FIG. 5 is performed by the first session management function network element, if the first session management function network element receives, from the first user plane function network element, information indicating that no transmission data of a PDU session is detected in a period of time, the first session management function network element determines that the PDU session is to be deactivated. Alternatively, the first session management function network element receives information indicating or notifying to deactivate a PDU session, and determines that the PDU session is to be deactivated. Alternatively, after receiving a message that is sent by a first access and mobility management function network element and that indicates that the first terminal moves out of a service area, the first session management function network element determines to deactivate the PDU session of the first terminal. Alternatively, the first session management function network element receives, from the first user plane function network element, indication information indicating that no transmission data of a PDU session is detected in a period of time, and the first session management function network element determines, based on the indication information that is sent by the first user function plane network element and that indicates that no data in the PDU session is detected, that the PDU session is to be deactivated.

Further, after determining that the PDU session is to be deactivated, the first session management function network element may send, to an access network device, fifth information indicating or notifying to deactivate the PDU session. For example, the first session management function network element sends the fifth information to the access network device through a first access and mobility management function network element, where the fifth information may indicate to deactivate the PDU session, so that the access network device receives the fifth information that is from the first session management function network element and that indicates to deactivate the PDU session, and determines, based on the fifth information, that the PDU session is to be deactivated.

Further, if the method shown in FIG. 5 is performed by the access network device (for example, if the to-be-deactivated PDU session is the last PDU session of the first terminal), the access network device is triggered to initiate an access network release (AN release) procedure. Before initiating the AN release procedure, the access network device determines whether the to-be-deactivated PDU session is associated with the multicast session corresponding to the multicast service, to be specific, whether there is a multicast session associated with the to-be-deactivated PDU session, and determines whether to initiate the access network release (AN release) procedure based on a determining result and a status of the multicast session. If the method shown in FIG. 5 is performed by the first session management function network element, after determining that the PDU session is to be deactivated, the first session management function network element does not immediately release the PDU session or release a resource corresponding to the PDU session (for example, a packet detection rule (PDR) and a forwarding action rule (FAR) on a UPF corresponding to the PDU session, or an air interface resource configured for the PDU session), but determines, before releasing the PDU session, whether the to-be-deactivated PDU session is associated with the multicast session corresponding to the multicast service, and determines, based on a determining result and a status of the multicast session, whether to release the PDU session.

For example, in this application, after determining that the PDU session is to be deactivated, the first session management function network element or the access network device may determine, based on an association relationship that is between a PDU session and a multicast session and that is recorded locally or by another network element, whether the to-be-deactivated PDU session is associated with the multicast session corresponding to the multicast service. Specifically, the following three different determining manners (1) to (3) are included. It should be noted that a manner of determining whether the to-be-deactivated PDU session is associated with the multicast session corresponding to the multicast service is not limited to any one of the following three manners, and may be another manner.

(1) When the association relationship between the PDU session and the multicast session is recorded in the foregoing manner (1), identification information of the PDU session is used as an index to search for an SM context of the PDU session, to determine whether the SM context of the PDU session includes information related to the multicast service, for example, whether the SM context of the PDU session includes identification information (such as an MBS session ID, a TMGI, a multicast session ID, or an IP multicast address) corresponding to the multicast service. If the information related to the multicast service is included, it is determined that the to-be-deactivated PDU session is associated with the multicast session corresponding to the multicast service. Otherwise, it is determined that the to-be-deactivated PDU session is not associated with the multicast session.

(2) When the association relationship between the PDU session and the multicast session is recorded in the foregoing manner (2), an SM context ID of the PDU session is used as an index to search for locally whether identification information (for example, an MBS session ID, a TMGI, a multicast session ID, or an IP multicast address) of the multicast service corresponding to the SM context ID exists. If the identification information exists, it is determined that the to-be-deactivated PDU session is associated with the multicast session. Otherwise, it is determined that the to-be-deactivated PDU session is not associated with the multicast session.

(3) When the association relationship between the PDU session and the multicast session is recorded in the foregoing manner (3), whether a locally stored context related to the multicast session includes identification information of the first terminal and/or identification information (for example, an SM context) of the PDU session of the first terminal is checked. If the identification information is included, it is determined that the to-be-deactivated PDU session is associated with the multicast session. Otherwise, it is determined that the to-be-deactivated PDU session is not associated with the multicast session.

In this application, the context related to the multicast session may be referred to as a context of the multicast session, a multicast/broadcast service context, a multicast/broadcast group context, a multicast/broadcast service session context (MBS session context), a multicast session context, a multicast group context, a multicast service context, or the like. This is not limited.

In this embodiment of this application, the identification information of the PDU session may uniquely identify the PDU session. The identification information of the PDU session may include one or more of a PDU session ID and the SM context ID of the PDU session.

In this embodiment of this application, the identification information of the multicast service may uniquely identify the multicast service, and the identification information of the multicast service may include one or more of identification information of the multicast session, context information of the multicast session, address information of the multicast service, the identification information of the PDU session associated with the multicast session, a service data flow (SDF) identification rule of the multicast service, packet filter information of data of the multicast service, identification information of a multicast group corresponding to the multicast service (for example, a temporary mobile group identity (TMGI) of the multicast group), a multicast/broadcast service session ID, a multicast session ID, an Internet Protocol (IP) address of an application server (for example, an AF) that provides the data of the multicast service, a service identifier (service ID) of the multicast service, and a packet detection rule (PDR) for the multicast service. This is not limited herein. It should be understood that the PDR is a set of filters. Each filter is a 5-tuple, including a source address, a destination address, a source port number, a target port number, and a protocol number of the multicast service. The PDR is used to filter the data of the multicast service.

The identification information of the first terminal may uniquely identify the first terminal. The identification information of the first terminal may be a subscription permanent identifier (SUPI) of the first terminal, an internet protocol (IP) address of the first terminal, a media access control (MAC) address of the first terminal, an international mobile subscriber identity (IMSI) of the first terminal, or the like.

S502. Determine whether the multicast session is in an active state.

When the method shown in FIG. 5 is performed by the first session management function network element, the first session management function network element may determine, in the following manner, whether the multicast session is in the active state: The first session management function network element receives, from the access network device or a second session management function network element, first information indicating that the multicast session is to be deactivated, and the first session management function network element determines, based on the first information, that the multicast session is in a deactivated state. The first session management function network element receives, from the second session management function network element, second information indicating that the multicast session is to be activated, and the first session management function network element determines, based on the second information, that the multicast session is in the active state.

The second session management function network element corresponds to the multicast group, and the second session management function network element is a network element for managing the multicast session, for example, may be the MB-SMF shown in FIG. 3b. It should be understood that, that the second session management function network element corresponds to the multicast group in this application may be understood as that the second session management function network element has a capability of managing the multicast session corresponding to the multicast group. For example, the second session management function network element has a capability of establishing, modifying, or deleting the multicast session of the multicast group. In addition, that the second session management function network element corresponds to the multicast group may be alternatively described as that the second session management function network element corresponds to the multicast session, the multicast service, or the like. This is not limited.

The first information may directly indicate/notify to deactivate the multicast session. For example, the first information may carry an information element/indication/notification, where the information element/indication/notification explicitly indicates to deactivate the multicast session. Alternatively, the first information may be multicast broadcast service session deactivation (MBS session deactivation) or multicast session deactivation. In another example, the first information may indirectly indicate to deactivate the multicast session. For example, the first information may indicate/notify that the multicast session is to be stopped, for example, the first information may be multicast/broadcast service session stop (MBS session stop)/session stop, the first information may indicate that the second user plane function network element does not detect the data of the multicast service, or the first information may indicate that the first terminal is in a connection management (CM) idle state. The first session management function network element indirectly determines, based on the first information, that the multicast session is in the deactivated state. In still another example, the first information may directly or indirectly indicate that the multicast session is in the deactivated state. If the first information is received, the first session management function network element determines that the multicast session is in the deactivated state. Otherwise, if the first information is not received, the first session management function network element considers by default that the multicast session is still in the active state.

The second information may directly indicate/notify to activate the multicast session. For example, the second information may carry an information element/indication/notification, where the information element/indication/notification explicitly indicates to activate the multicast session. Alternatively, the second information may be multicast/broadcast service session activation (MBS session activation) or multicast session activation. In still another example, the second information may indirectly indicate to activate the multicast session. For example, the second information may indicate/notify that the multicast session is about to start/is about to be initiated/is initiated/starts, where the second information is multicast/broadcast service session start (MBS session start)/session start; the second information indicates that the second user plane function network element detects the data of the multicast service; or the second information may indicate that the first terminal is in a connection management (CM) connected state. The first session management function network element indirectly determines, based on the second information, that the multicast session is in the active state.

In this embodiment of this application, the multicast session may be alternatively described as a multicast/broadcast session, and the status of the multicast session may be alternatively described as a status of the multicast/broadcast session. The status of the multicast/broadcast session may include a deactivated state/an inactive state (deactivated or inactive or standby), an active state (active), and a released/deleted state (release/deleted).

That the status of the multicast/broadcast session is the deactivated state (inactive or deactive or MBS session deactivation) may mean: The multicast/broadcast session is deactivated when a content provider starts/initiates multicast/broadcast session stop (MBS session stop or Session stop), multicast/broadcast service session deactivation (MBS session deactivation), or multicast session deactivation. During an execution process of deactivating the multicast/broadcast session or after the multicast/broadcast session is deactivated, information related to the multicast/broadcast session is released on a terminal side and an access network device side, and the information related to the multicast/broadcast session (for example, an MBS session context or an MB service context) is reserved in the first session management function network element and/or the second session management function network element but is set to a deactivated state. Specifically, deactivation of the multicast/broadcast session may mean: Information related to the multicast/broadcast service (for example, quality of service (QoS) information related to the multicast/broadcast service) is released in the terminal; the information related to the multicast/broadcast service (for example, a context related to the multicast/broadcast service (for example, a multicast/broadcast context (MB Context), a multicast/broadcast service session context (MBS session context), a multicast/broadcast group context (MB group context), or a multicast/broadcast service context (MBS context))) is released in the access network device; tunnel information related to the multicast/broadcast session is released; an air interface resource related to the multicast/broadcast session is released; information, related to the multicast/broadcast service, in a terminal context stored in the access network device is released; information related to the multicast/broadcast service is reserved in the first session management function network element and the second session management function network element but is set to a deactivated state (for example, the related information may be an MBS session context or an MB service context); the information related to the multicast service is reserved in the first session management function network element but is set to a deactivated state, and is released in the second session management function network element; the information related to the multicast service is released in the first session management function network element, and is reserved in the second session management function network element but is set to a deactivated state; or the like. A deactivated multicast session can be re-initiated/started/activated by a multicast session initiate/start procedure (MBS session start), multicast/broadcast service session activation procedure (MBS session activation), or multicast session activation.

That the status of the multicast/broadcast service session (MBS session) is the deactivated state (inactive or deactive or MBS session deactivation) may alternatively mean: An established multicast/broadcast session is in a deactivated (inactive or deactive or MBS session deactivation) state, and no multicast/broadcast service data is being transmitted. A terminal device joining the multicast/broadcast session may be in a CM_CONNECTED state or a CM_IDLE state. An authenticated terminal device may be allowed to join the multicast/broadcast session. An activation operation may be triggered by a request of an application function (AF)/application server (AS) or may be triggered by a UPF when the UPF detects arrival of the data of the multicast/broadcast service. To activate the multicast/broadcast session, a terminal device that has joined the multicast/broadcast session and is in a CM_IDLE state needs to be paged back to a CM_CONNECTED state. It should be noted that, when the multicast/broadcast session is in the deactivated state, QoS information (for example, QoS information related to the multicast/broadcast service in an MBS session context) related to the multicast/broadcast service in a core network related network element may be removed or reserved. For example, the QoS information related to the multicast/broadcast service is removed from both an MB-SMF and an SMF; the QoS information related to the multicast/broadcast service is reserved in an MB-SMF and is removed from an SMF; the QoS information related to the multicast/broadcast service is removed from an MB-SMF, and is reserved in an SMF; or the QoS information related to the multicast/broadcast service is reserved in both an MB-SMF and an SMF. The QoS information related to the multicast/broadcast service may include, for example, a QoS flow ID related to the multicast/broadcast service, a data packet filter (for example, a service data flow (SDF) profile for generating a packet detection rule (PDR) in a PCC rule), and policy information related to the multicast/broadcast service. In addition, when the multicast/broadcast session is in the deactivated state, the MBS session context may be identified as an inactive state, or may not be identified as the inactive state. In addition, when the multicast/broadcast session is in an inactive state, an N3 tunnel related to the multicast/ broadcast service session is released or reserved. In addition, when the multicast/broadcast session is in the inactive state, a context related to the multicast/broadcast service may be removed/released/deleted from the access network device, or the context related to the multicast/broadcast service may be reserved in the access network device. Alternatively, when the multicast/broadcast session is in the deactivated state, multicast/broadcast related QoS information (for example, a QoS profile) related to the multicast/broadcast service is reserved in the access network device. For a terminal in a CM-CONNECTED state that joins the multicast/broadcast service, the access network device stores a context of the terminal, and the context of the terminal includes a QoS profile corresponding to a unicast QoS flow mapped to a multicast/broadcast QoS flow. To be specific, when the multicast/broadcast session is deactivated, the QoS profile corresponding to the unicast QoS flow mapped to the multicast/broadcast QoS flow is reserved in the access network device. Alternatively, when the multicast/broadcast session is in the deactivated state, QoS information (for example, a QoS profile) related to the multicast/broadcast service is reserved in the access network device.

That the status of the multicast/broadcast session is the active state (active or MBS session activation) may mean: The multicast/broadcast session is activated when a content provider starts/initiates/initiates multicast/broadcast session start/initiate (MBS session start or Session start), multicast/broadcast service session activation (MBS session activation), or multicast session activation; during an execution process of activating the multicast/broadcast session or after the multicast/broadcast session is activated, information related to the multicast/broadcast session is created on a terminal side and an access network device side, and the information related to the multicast/broadcast session is set to an active state (active) in the first session management function network element and/or the second session management function network element. Specifically, activation of the multicast/broadcast session may mean: Information related to the multicast/broadcast service (for example, QoS information related to the multicast/broadcast service) is created/allocated in a terminal; the information related to the multicast/broadcast service (for example, a context related to the multicast/broadcast service (for example, a multicast/broadcast context (MB context) or a multicast/broadcast service session context (MBS session context) or a multicast/broadcast group context (MB group context) or a multicast/broadcast service context (MBS context))) is created in the access network device; tunnel information related to the multicast/broadcast session is allocated; an air interface resource related to the multicast/broadcast session is allocated; information related to the multicast/broadcast service is established in a context of a terminal; a tunnel related to the multicast/broadcast session is established; information related to the multicast/broadcast service is set to an active state (active) in the first session management function network element and the second session management function network element; or the like. An activated multicast/broadcast session may be deactivated/stopped by a multicast/broadcast session stop procedure (MBS session stop), a multicast/broadcast service session deactivation (MBS session deactivation) procedure, or a multicast session deactivation procedure.

That the status of the multicast/broadcast session is an active state (active or MBS session activation) may alternatively mean: An established multicast/broadcast session is in an active state. The data of the multicast/broadcast service may be sent to a terminal that joins the multicast/broadcast group. A 5GC resource related to the multicast/broadcast session is reserved or configured. An air interface resource related to the multicast/broadcast session is reserved or configured based on a base station serving a terminal that joins the multicast/broadcast service. The UE that joins the multicast/broadcast session is in a CM_CONNECTED state. An authenticated terminal may be allowed to join the multicast/broadcast session. A multicast/broadcast session in the active state can be transited to the inactive state (inactive). A deactivation operation (Deactivation) may be triggered by a request of an application function (AF)/application server (AS) or may be triggered by a UPF by receiving the data of the multicast/broadcast service.

In addition, the status of the multicast/broadcast session may be a release/deleted state. The release/deleted state of the multicast/broadcast session may mean: The multicast/broadcast session is released/deleted when a content provider starts/initiates multicast/broadcast session release/delete (MBS session delete, MBS session release, session delete, or session release); during an execution process of releasing/deleting the multicast/broadcast session or after the multicast/broadcast session is released/deleted, information related to the multicast/broadcast session is released/deleted on a terminal side and an access network device side, and the information related to the multicast/broadcast session is released/deleted in the first session management function network element and/or the second session management function network element. Specifically, release/delete of the multicast/broadcast session may mean: The information related to the multicast/broadcast service (for example, QoS information related to the multicast/broadcast service) is released/deleted in a terminal; the information related to the multicast/broadcast service (for example, a context (for example, a multicast/broadcast context, a multicast/broadcast service session context, a multicast/broadcast group context, or a multicast/broadcast service context) related to the multicast/broadcast service) is released/deleted in the access network device; tunnel information related to the multicast/broadcast session is released/deleted; an air interface resource related to the multicast/broadcast session is released/deleted; information related to the multicast/broadcast service in a context of a terminal stored in the access network device is released/deleted; a tunnel related to the multicast/broadcast session is released/deleted; information related to the multicast/broadcast service is released/deleted in the first session management function network element and the second session management function network element; or the like. A released/deleted multicast/broadcast session cannot be restarted/re-initiated/re-activated by the following procedures: multicast session start/initiate (MBS session start or Session start), multicast/broadcast service session activation (Multicast Broadcast Service (MB S) Session Activation), or multicast session activation. The multicast session release/delete procedure may be applied to an activated multicast session or a deactivated multicast session.

When the method shown in FIG. 5 is performed by the access network device, the access network device may determine, in the following manner, that the multicast session is in the deactivated state: If duration in which the access network device does not receive the data of the multicast service in the multicast session is greater than preset duration, the access network device determines to deactivate the multicast session, and releases an air interface resource allocated to the multicast session, so that the multicast session is in the deactivated state. Alternatively, if there is no terminal that receives the data of the multicast service in terminals served by the access network device, the access network device determines to deactivate the multicast session of the multicast service, release an air interface resource allocated to the multicast session, release tunnel information related to the multicast session, and the like. The multicast session is in the deactivated state. Alternatively, the access network device receives ninth information from the second access and mobility management function network element, where the ninth information may be sent by the second session management function network element to the second access and mobility management function network element, and the ninth information may indicate/notify to deactivate the multicast session of the multicast service (for example, the ninth information may be session stop, multicast broadcast service session deactivation (MBS session deactivation), or multicast session deactivation). The access network device determines to deactivate the multicast session based on the ninth information, releases the air interface resource allocated to the multicast session, and releases the tunnel information related to the multicast session. In this way, the multicast session is in the deactivated state.

When the method shown in FIG. 5 is performed by the access network device, the access network device may determine, in the following manner, that the multicast session is in the active state: If the access network device receives the data of the multicast service in the multicast session, the access network device determines that the multicast session is in the active state. Alternatively, if there is a terminal that receives the data of the multicast service in terminals served by the access network device, the access network device determines that the multicast session is in the active state. Alternatively, if the access network device locally has context information related to the multicast session (for example, a multicast/broadcast service context or a multicast/broadcast group context or a multicast/broadcast session context or a multicast/broadcast context), or the access network device does not release an air interface resource allocated to the multicast session or tunnel information related to the multicast session, the access network device determines that the multicast session is in the deactivated state.

The ninth information may carry explicit indication information, where the indication information indicates/notifies to deactivate the multicast session. Alternatively, the ninth information may indicate multicast session stop (MBS session stop), multicast broadcast service session deactivation (MBS session deactivation), or multicast session deactivation, or indicate that the second user plane function network element does not detect the data of the multicast service. The information carried in the ninth information indirectly indicates to deactivate the multicast session.

Further, if the multicast session is in the active state, whether to activate the PDU session may be determined based on a status of the PDU session associated with the multicast session. For details about the method, refer to S503a. Alternatively, whether to activate the PDU session is determined based on capability information and a status of the PDU session associated with the multicast session. For details about the method, refer to S503b.

S503a. If the PDU session is associated with the multicast session and the multicast session is in the active state, keep the status of the PDU session as an active state.

Keeping the status of the PDU session as the active state may include keeping an air interface resource allocated to the PDU session, establishing a transmission tunnel corresponding to the PDU session between the access network device and the first user plane function network element, and/or the like.

Specifically, if the method shown in FIG. 5 is performed by the access network device, when the PDU session is associated with the multicast session and the multicast session is in the active state, the access network device does not perform/initiate an AN release procedure when data of another multicast service also arrives at the access network device in the multicast session for air interface transmission. If the method shown in FIG. 5 is performed by the first session management function network element, when the PDU session is associated with the multicast session and the multicast session is in the active state, the first session management function network element does not deactivate the associated PDU session.

The AN release procedure is for triggering a core network element to release the PDU session of the first terminal. The AN release procedure may include: The access network device sends, to the first session management function network element through the first access and mobility management function network element, information indicating or notifying to deactivate the PDU session. For example, the access network device sends N2 UE context release complete (N2 UE Context Release Complete) to the first access and mobility management function network element, and then the first access and mobility management function network element sends a service-based interface Nsmf_PDU session update session management context request (Nsmf_PDU session_updateSMContext request) to the first session management function network element, where the Nsmf_PDU session_updateSMContext request carries the information indicating to deactivate the PDU session, and triggers the first session management function network element to release an air interface resource corresponding to the PDU session.

It should be noted that, in this embodiment of this application, when the method shown in FIG. 5 is performed by the first session management function network element, even if the first session management function network element determines that the PDU session associated with the multicast session needs to be deactivated, because the first session management function network element finds/determines that the PDU session is associated with the multicast session and the multicast session is in the active state, the first session management function network element does not perform a deactivation procedure for the associated PDU session, and keeps the PDU session in the active state.

The first session management function network element may determine, in the following manner, that the PDU session needs to be deactivated (inactive): If an anchor UPF (PSA UPF) corresponding to the PDU session does not detect that service data in the PDU session arrives in a period of time, the PSA UPF sends a PDU session deactivation indication/notification to the first session management function network element, and the first session management function network element receives the PDU session deactivation indication/notification sent by the PSA UPF, and determines that the PDU session needs to be deactivated.

In this embodiment of this application, the PDU session deactivation procedure may include releasing an N3 tunnel of the PDU session and/or an air interface resource (for example, a DRB) corresponding to the PDU session, and the like.

S503b. If the PDU session is associated with the multicast session, the multicast session is in the active state, and the access network device corresponding to the PDU session does not support a multicast function, keep the status of the PDU session as an active state.

Keeping the status of the PDU session as the active state may include keeping an air interface resource allocated to the PDU session, establishing a transmission tunnel corresponding to the PDU session between the access network device and the first user plane function network element, and/or the like.

Specifically, if the method shown in FIG. 5 is performed by the first session management function network element, the PDU session is associated with the multicast session and the multicast session is in an active state. The first session management function network element determines whether the access network device supports the multicast function. If the first session management function network element determines that the access network device corresponding to the PDU session does not support the multicast function, the first session management function network element does not deactivate the associated PDU session, and keeps the PDU session in the active state. If the first session management function network element determines that the access network device corresponding to the PDU session supports the multicast function, the first session management function network element deactivates the associated PDU session, that is, deactivates the PDU session associated with the multicast session.

When the access network device does not support the multicast function, as shown in FIG. 3c, the data of the multicast/broadcast service needs to be transmitted in a 5G core network individual multicast/broadcast service traffic delivery (5GC Individual MBS traffic delivery) mode. In other words, the data of the multicast/broadcast service is sent to a terminal device by using a PDU session associated with the terminal device that joins the multicast service. When a base station does not support a multicast function, the data of the multicast/broadcast service needs to be sent by using an associated PDU session. A sending period of the data of the multicast/broadcast service may be longer than a sending period of data (which may be referred to as unicast service data) transmitted on the PDU session, to be specific, for example, the data of the multicast/broadcast service is sent once a day, but duration of an inactivity timer disposed in an anchor UPF (for example, a PSA UPF) of the PDU session is one hour, after the inactivity timer expires (that is, it is detected that there is no data transmission of a service on the PDU session within the duration of the timer), the PDU session cannot be deactivated. This is because there is still a multicast/broadcast session in an active state, and data of a multicast/broadcast service corresponding to the multicast/broadcast session needs to be transmitted by using the PDU session.

In this embodiment of this application, the first session management function network element may determine, in the following manner, whether the access network device corresponding to the PDU session supports the multicast function: The first session management function network element obtains, through the first access and mobility management function network element, capability information from the access network device corresponding to the PDU session, where the capability information indicates whether the access network device supports the multicast function. The first session management function network element determines, based on the capability information, whether the access network device supports the multicast function. For example, if the capability information indicates that the access network device supports the multicast function, the first session management function network element determines that the access network device supports the multicast function. Otherwise, if the capability information indicates that the access network device does not support the multicast function, the first session management function network element determines that the access network device does not support the multicast function.

In this embodiment of this application, for example, in S503a or S503b, the activating the PDU session associated with the multicast session may include: After the first session management function network element receives the second information for activating the multicast session, the first session management function network element sends, to the access network device, an Namf_Communication_N1N2MessageTransfer message including an N2 session management information (N2 SM information) or a PDU session context update response (Nsmf_PDUSession_UpdateSMContext Response) including N2 SM information, to trigger the access network device to activate, based on the N2 SM information, the PDU session associated with the multicast session, for example, establish an air interface resource and a transmission tunnel corresponding to the PDU session. Further, after activating the PDU session associated with the multicast session, the access network device may further send a response message for the N2 SM information to the first session management function network element.

The N2 SM information may be PDU session resource setup request transfer, and the response message for the N2 SM information may be PDU session resource setup response transfer. Alternatively, the N2 SM information may be a PDU session resource setup request, and the response message for the N2 SM information may be a PDU session resource setup response. Alternatively, the N2 SM information may be PDU session resource modify request transfer, and the response message for the N2 SM information may be PDU session resource modify response transfer. Alternatively, the N2 SM information may be a PDU session resource modify request, and the response message for the N2 SM information may be a PDU session resource modify response. This is not limited.

The N2 SM information may include identification information (for example, identification information of a multicast/broadcast service session (multicast broadcast service session, MBS session)) of the multicast service. Optionally, the N2 SM information may further include an indication for adding the terminal to the multicast session. Optionally, the N2 SM information may further include unicast QoS profile information mapped to/corresponding to QoS profile information of the multicast service corresponding to the multicast session.

If the N2 SM information includes the unicast QoS profile information mapped to/corresponding to the QoS profile information of the multicast service corresponding to the multicast session, the access network device may configure, based on the unicast QoS profile information, an air interface resource (or referred to as a radio bearer) for transmitting the data of the multicast service. After the air interface resource is created, if a transmission tunnel between the access network device and a UPF has not been established, the access network device includes downlink tunnel information (for example, NG-U transport layer information or an NG-RAN node endpoint) to the response message that is sent to the first session management function network element and that is for the N2 SM information. The downlink tunnel information is a mandatory information element of the response message. The downlink tunnel information may be for establishing a transmission tunnel for transmitting the data of the multicast service between the access network device and the UPF, to ensure that the PDU session associated with the multicast session is activated.

S504. If the PDU session is associated with the multicast session and the multicast session is in the deactivated state, deactivate the PDU session.

Deactivating the PDU session may include releasing an air interface resource allocated to the PDU session, releasing a transmission tunnel corresponding to the PDU session between the access network device and the first user plane function network element, and/or the like.

It should be noted that when the method shown in FIG. 5 is performed by the access network device, the access network device receives the fifth information from the first session management function network element, and determines, based on the fifth information, to deactivate the PDU session. If the status of the PDU session is kept in the active state, the access network device sends sixth information to the first session management function network element, where the sixth information indicates that deactivation of the PDU session is rejected. If the PDU session is deactivated, the access network device sends seventh information to the first session management function network element, where the seventh information indicates that the PDU session has been deactivated, to ensure that the status of the PDU session and the status of the multicast session are synchronized on an access network device side and a first session management function network element side.

The access network device may exchange information with the first session management function network element through the first access and mobility management function network element. For example, the access network device may send the sixth information to the first session management function network element through the first access and mobility management function network, or send the seventh information to the first session management function network element through the first access and mobility management function network.

Further, if the first session management function network element deactivates the PDU session, to ensure normal transmission of the data of the multicast service, the method may further include: The first session management function network element determines to send the data of the multicast service by using the PDU session, injects/maps, to the PDU session, the data of the multicast service transmitted by using the multicast session, and transmits, by using the PDU session, the data of the multicast service corresponding to the associated multicast session. It should be noted that the PDU session may be a PDU session associated with the multicast session, or may not be a PDU session associated with the multicast session, but may be another PDU session that is of the first terminal and that is in an active state/not released. This is not limited.

That the first session management function network element determines to send the data of the multicast service by using the PDU session may include: The first session management function network element sends tunnel information of the first user plane function network element to the second user plane function network element, to notify the second user plane function network element to establish a channel that is between the first user plane function network element and the second user plane function network element and that is used to transmit the data of the multicast service. For example, the first session management function network element sends the tunnel information of the first user plane function network element to the second session management function network element, the second session management function network element sends, to the second user plane function network element, a session update request (for example, an N4 session update request) that carries the tunnel information of the first user plane function network element, and the second user plane function network element receives and correspondingly stores the tunnel information of the first user plane function network element. Further, the second user plane function network element sends a session update response (for example, an N4 session update response) to the second session management function network element. In addition, the first session management function network element configures the first user plane function network element based on information about the multicast service and a mapping relationship between a multicast QoS flow included in the multicast service and a unicast QoS flow. For example, the first session management function network element sends, to the first user plane function network element, the information about the multicast service and a QFI of a unicast QoS flow to which a multicast quality of service (QoS) flow is mapped, to map/inject the multicast QoS flow into a PDU session tunnel of the PDU session for transmission in a unicast QoS flow manner. The information about the multicast service may include the identification information of the multicast service, and may further include a packet detection rule (PDR). For filtered multicast service data, the first user plane function network element maps the multicast service data to the PDU session based on a mapping relationship between a QFI of a multicast QoS flow and a QFI of a unicast QoS flow, for transmission in a unicast QoS flow manner.

Further, when the method shown in FIG. 5 is performed by the first session management function network element, and the multicast session is in the deactivated state, the method further includes: The first session management function network element receives the second information from the second session management function network element; and the first session management function network element determines, based on the second information, to activate the multicast session, and notifies, through the first access and mobility management function network element, the access network device to add the first terminal to the multicast group. Alternatively, the first session management function network element receives the second information from the second session management function network element, determines, based on the second information, to activate the multicast session, and notifies, through the first access and mobility management function network element, the access network device to add the first terminal to the multicast group.

For related descriptions of the second information, refer to the descriptions in S502. Details are not described again.

It should be noted that before the first session management function network element notifies, through the first access and mobility management function network element, the access network device to add the first terminal to the multicast group, if the PDU session associated with the multicast session is not in the active state, the first session management function network element further needs to activate the PDU session associated with the multicast session.

A process of activating the PDU session and notifying the access network device to add the first terminal to the multicast group may be: The first session management function network element activates the PDU session associated with the multicast session, and the first session management function network element sends an Namf_Communication_N1N2MessageTransfer message to the first access and mobility management function network element, where the Namf_Communication_N1N2MessageTransfer message may carry the identification information of the multicast group. After the first access and mobility management function network element receives the foregoing message, if the first terminal is in a connected state, the first access and mobility management function network element continues to interact with the access network device to perform a subsequent procedure to activate the associated PDU session. If the first terminal is in a CM-IDLE state, the first access and mobility management function network element and the access network device perform paging for single UE or group paging for the multicast group. After the first terminal receives a paging message, the first terminal initiates a service request procedure to activate the associated PDU session. Then, the first session management function network element notifies, by using signaling related to a terminal in the multicast group, the access network device to add the first terminal to the multicast group. Specifically, the process may include:

After the first session management function network element receives MBS session start/MB S session activation/session start, multicast broadcast service session activation (MBS session activation), or multicast session activation sent by the second session management function network element, or receives the information that is reported/notified/indicated by the first user plane function network element and that indicates that the data of the multicast service arrives, the first session management function network element sends an N11 message (for example, N1N2 message transfer (Namf_Communication_N1N2MessageTransfer)) to the first access and mobility management function network element, where the N11 message may carry the identification information of the multicast group. If the first access and mobility management function network element finds that there are a plurality of terminals in a CM-CONNECTED state in terminals that are managed by the first access and mobility management function network element and that are in the multicast group, the first access and mobility management function network element continues to interact with the access network device and the like to activate the associated PDU session; if there are a plurality of terminals in a CM-IDLE state, and the first terminal is included in the plurality of terminals in the CM-IDLE state, the first access and mobility management function network element initiates one or more paging messages to page one or more terminals in the CM-IDLE state, where the plurality of paging messages are in a one-to-one correspondence with the plurality of terminals in the CM-IDLE state, one paging message is oriented to one terminal, and one paging message is for paging one terminal in the CM-IDLE state. Alternatively, the first access and mobility management function network element initiates group paging, for example, initiates a paging message for paging a plurality of terminals in a CM-IDLE state in the multicast group. The paging message may carry the identification information (for example, one or more of a TMGI, an MBS session ID, an identifier of the multicast service, a multicast address, a multicast IP address, an identifier of the multicast group, an identifier of the multicast session, context information of the multicast session, address information of the multicast service, the identification information of the PDU session associated with the multicast session, or identification information of a service data flow SDF of the multicast service). The identification information of the multicast group may be the same as the identification information of the multicast service. This is not limited. The identification information of the multicast group is obtained by the first access and mobility management function network element from the first session management function network element. In this way, the plurality of terminals in the CM-IDLE state return to a CM-CONNECTED state by using one paging message. After a terminal (including the first terminal) in the multicast group receives the paging message, if the terminal finds that the PDU session associated with the multicast service is still in the deactivated state, the terminal initiates a service request procedure to activate the PDU session associated with the multicast session. For a service request procedure, refer to a conventional technology. Details are not described again. Further, after the PDU session associated with the multicast session is activated, the access network device is notified to add the first terminal to the multicast group.

This embodiment of this application is not limited to that the first session management function network element sends, to the first access and mobility management function network element, the N11 message that carries the identification information of the multicast group. Alternatively, the first session management function network element may send a third message to the first access and mobility management function network element, where the third message may be the N11 message, the third message may include the identification information of the first terminal, and the third message may be used by the first access and mobility management function network element to learn, based on an indication of the first session management function network element, which terminals join the multicast group, and when the first terminal in the multicast group is in the idle state or the CM-IDLE state, trigger the first access and mobility management function network element to initiate paging in a registration area of the first terminal. This can help the first access and mobility management function network element determine, based on the identification information of the terminal, to initiate paging to the terminal in the idle state or the CM-IDLE state. Specifically, a process in which the first access and mobility management function network element initiates paging is described above. For example, the first access network device may send one or more paging messages, where one paging message corresponds to paging one terminal. Alternatively, the first access network device sends group paging, for example, sends a group paging message corresponding to a plurality of terminals, where the group paging message may include the identification information of the multicast service, so that the plurality of terminals are paged at a time through group paging.

It should be noted that when there are a plurality of terminals in the CM-IDLE state in the multicast group, and registration areas of the plurality of terminals have areas overlapping with each other (which may be referred to as overlapping areas in this specification), to reduce signaling overheads, the first access and mobility management function network element may initiate group paging once in an overlapping area of a terminal, and does not need to repeatedly initiate group paging in an overlapping area of registration areas of all terminals. For example, there is a second terminal in the CM-IDLE state in the multicast group, and the identification information of the multicast group is further used by the first access and mobility management function network element to initiate group paging in another area different from an overlapping area in a registration area of the second terminal when the first access and mobility management function network element finds that the second terminal is in an idle state. The overlapping area may be an area in which the registration area of the first terminal overlaps the registration area of the second terminal. In this way, the first access and mobility management function network element may not repeatedly initiate group paging in an overlapping area of registration areas of all terminals in the CM-IDLE state in the multicast group, to reduce signaling overheads.

It should be noted that in this embodiment of this application, the first terminal may include one or more terminals. When the first terminal includes a plurality of terminals, that the first session management function network element sends the identification information of the first terminal to the first access and mobility management function network element may be alternatively described as that the first session management function network element sends a UE list to the first access and mobility management function network element, where the UE list may include identification information of a plurality of terminals joining the multicast session.

It should be noted that, for a terminal in a CM-CONNECTED state in the multicast group, the first session management function network element may interact with the access network device and another core network device after activating a PDU session associated with the terminal, to add the first terminal to the multicast group, or may first interact with the access network device and another core network device to add the first terminal to the multicast group, and then activate an associated PDU session. Alternatively, the first session management function network element may interact with the access network device and another core network to add the first terminal to the multicast group while activating the associated PDU session. This is not limited.

For a terminal in a CM-IDLE state in the multicast group, the first session management function network element may interact with the access network device and another core network device to add the first terminal to the multicast group after the terminal receives a paging message and performs a service request procedure (for example, after the associated PDU session is activated). Alternatively, after the terminal receives a paging message and performs a service request procedure (for example, although the terminal returns to a CM-CONNECTED state, the associated PDU session is not activated), the first session management function network element first interacts with the access network device and another core network device to add the first terminal to the multicast group, and then activates the associated PDU session. Alternatively, the first session management function network element may interact with the access network device and another core network to add the first terminal to the multicast group while activating the associated PDU session. This is not limited.

For example, it is assumed that UE is in a CM-CONNECTED state, the UE has three PDU sessions with a PDU session identifier 1, a PDU session identifier 3, and a PDU session identifier 5, and the three PDU sessions are all in an inactive state. The UE joins a multicast session 1 by using the PDU session whose PDU session identifier is 1. In this case, the UE knows which PDU session is associated with which multicast session. When data on the PDU session whose PDU session identifier is 5 arrives at a UPF, a network side device triggers a service request procedure. If the UE is in the CM-CONNECTED state (for example, at least one of the PDU sessions 1, 3, and 5 is in an active state), the first SMF needs to continue to perform a subsequent service request procedure to activate only the PDU session whose identifier is 1. If the UE is in a CM-IDLE state (that is, the PDU sessions 1, 3, and 5 are all in the deactivated state), after receiving the N11 message sent by the first SMF, the AMF sends a paging or group paging message. After receiving the paging or group paging message, the UE initiates a service request procedure initiated by the UE, to activate the PDU session associated with the multicast session. Then, the access network device is notified to add the UE to the multicast group, or first add the UE in the CM-CONNECTED state to the multicast group and then activate the associated PDU session if the associated PDU session is in the deactivated state. This is not limited.

For example, that the first session management function network element notifies the access network device to add the first terminal to the multicast group may be alternatively described as activating the multicast session, or allocating an air interface resource to the terminal to receive the data of the multicast service and receiving a radio bearer configuration for the data of the multicast service. In embodiments of this application, that the first session management function network element notifies the access network device to add the first terminal to the multicast group may include: The first session management function network element adds the first terminal to the multicast group by interacting with the access network device (for example, a RAN) and another core network element (for example, an AMF or an MB-SMF).

Specifically, that the first session management function network element notifies the access network device to add the first terminal to the multicast group may be: When the data of the multicast service is transmitted or delivered by using the multicast session, the first session management function network element notifies, by using UE-related signaling, the access network device to allocate an air interface resource related to the multicast session to the first terminal, and the access network device adds the first terminal to the multicast group. Optionally, the access network device may further interact with one or more of an AMF, an SMF, an MB-SMF, or an MB-UPF to establish a multicast session tunnel between the access network device and the MB-UPF, and the like. Alternatively, when the data of the multicast service is transmitted or delivered by using the PDU session of the UE, the first session management function network element notifies the access network device and the first user plane function network element to allocate a resource to a QoS flow related to the multicast service corresponding to the multicast session, establish a tunnel between the first user plane function network element and the second user plane function network element, and so on.

Based on the method shown in FIG. 5, the multicast session associated with the PDU session may be considered when the PDU session is deactivated. If the multicast session associated with the PDU session is in the active state, the PDU session is not deactivated, and the PDU session is kept in the active state, so that data of the multicast service is subsequently mapped/injected to the PDU session in an application scenario (for example, a handover scenario), to ensure normal transmission of the data of the multicast service, or to avoid a problem that the terminal cannot receive the data of the multicast service on an air interface resource when the PDU session is the last PDU of a terminal and the terminal enters an idle state after the PDU session is deactivated. If the multicast session associated with the PDU session is in the deactivated state, the PDU session is deactivated, to save transmission resources and improve resource utilization.

With reference to the 5G system shown in FIG. 3*a*, the following describes in detail the method shown in FIG. 5 performed by the access network device by using an example in which the first terminal is UE, the access network device is a RAN, the first session management function network element is a first SMF, the second session management function network element is an MB-SMF/second SMF, the first user plane function network element is a UPF, the second user plane function network element is an MB-UPF, and the access and mobility management function network element is an AMF. It should be noted that, in this application, the UPF may be integrated with the MB-UPF. An integrated UPF may have both a function of the UPF in this application and a function of the MB-UPF. Alternatively, the UPF and the MB-UPF are independently deployed. This is not limited. In this application, the SMF may be integrated with the MB-SMF. An integrated SMF may have both a function of the SMF in this application and a function of the MB-SMF. Alternatively, the SMF and the MB-SMF are independently deployed. This is not limited.

FIG. 6A and FIG. 6B are a flowchart of a communication method according to an embodiment of this application. When deactivating a PDU session, a RAN first determines a status of a multicast session associated with the PDU session, and then determines, based on the status of the multicast session associated with the PDU session, whether to deactivate the PDU session. As shown in FIG. 6A and FIG. 6B, the method includes the following steps.

S601. The RAN determines to deactivate a PDU session of UE.

The PDU session of the UE corresponds to a first SMF and a UPF. Alternatively, that the RAN determines to deactivate a PDU session of UE may be alternatively described as that the RAN determines that the PDU session of the UE is to be deactivated. This is not limited.

For example, the RAN may determine, in any one of the following four manners, to deactivate the PDU session of the UE. Manner (1): If the RAN does not receive data transmitted on the PDU session of the UE for a long time, the RAN determines to deactivate the PDU session of the UE. Manner (2): If the UE moves out of a service area of the RAN, and the UE is unreachable, and the RAN no longer provides a network service for the UE, the RAN determines to deactivate the PDU session of the UE. Manner (3): If the UE is in a radio resource control idle (RRC_idle) state or an RRC_inactive state, the RAN determines to deactivate the PDU session of the UE. Manner (4): The RAN receives fifth information from the first SMF, where the fifth information may be information indicating to stop the PDU session of the UE, information indicating that the UPF does not detect data sent to the UE, or information indicating to deactivate the PDU session, and the RAN determines, based on the fifth information, to deactivate the PDU session of the UE.

S602. The RAN determines whether the to-be-deactivated PDU session is associated with a multicast session.

For an execution process of S602, refer to S501. Details are not described again.

S603. The RAN determines whether the multicast session is in an active state. If the PDU session is associated with the multicast session and the multicast session is in the active state, S604 is performed, and the procedure ends. Otherwise, S605 to S610 are performed, and the procedure ends.

For example, if any one or more of the following events 1 to 3 are executed (or occur), it is determined that the multicast session is in a deactivated state. Otherwise, if none of the following events 1 to 3 occurs, it is determined that the multicast session is in the active state.

Event 1: The RAN does not receive data of a multicast service transmitted on the multicast session for a long time, or the RAN does not serve UE that receives data of a multicast service. In this case, the RAN determines to deactivate the multicast session, and releases an air interface resource allocated to the multicast session, so that the multicast session is in the deactivated state.

Further, when the RAN determines to deactivate the multicast session, the RAN may further delete/remove/release a context (or referred to as a multicast context) of the multicast session stored in the RAN. Optionally, if the multicast session context is released, the RAN determines to release a transmission tunnel (or referred to as a multicast session tunnel) corresponding to the multicast session between the RAN and an MB-UPF.

Further, the event 1 may further include: The RAN sends a notification message for deactivating the multicast session to the first SMF, or the RAN sends a notification message for deactivating the multicast session to an MB-SMF. That the RAN sends a notification message for deactivating the multicast session to the first SMF may include: The RAN sends, to an AMF, an N2 message that carries the notification message for deactivating the multicast session; after receiving the N2 message sent by the RAN, the AMF locates, based on a PDU session ID carried in the N2 message, the first SMF corresponding to the PDU session; and the AMF includes the notification message in an N11 message, and sends the N11 message to the first SMF.

That the RAN sends a notification message for deactivating the multicast session to an MB-SMF may include: The RAN sends, to an AMF, an N2 message that carries the notification message for deactivating the multicast session; after receiving the N2 message sent by the RAN, the AMF determines (locates) the MB-SMF based on identification information of the multicast service carried in the N2 message and a correspondence between the identification information of the multicast service and identification information of the MB-SMF, where the correspondence between the identification information of the multicast service and the identification information of the MB-SMF may be learned by the AMF when the UE joins the multicast service; and the AMF includes the notification message in an N11 message and sends the N11 message to the MB-SMF.

Further, after receiving the N11 message, the MB-SMF performs session update (for example, N4 session update) with the MB-UPF based on the notification message carried in the N11 message. For example, the MB-SMF sends a session update request (for example, an N4 session update request) to the MB-UPF. Further, the MB-SMF receives a session update response (for example, an N4 session update response) from the MB-UPF.

The N4 session update request may carry the identification information of the multicast service. Optionally, the N4 session update request further carries a notification indicating the MB-UPF to buffer the data of the multicast service. Optionally, if the MB-SMF does not notify the MB-UPF to buffer the data of the multicast service, the MB-SMF may still buffer the data of the multicast service. Optionally, the N4 session update request may further indicate the MB-UPF to notify the MB-SMF when the data of the multicast service arrives at the MB-UPF. Optionally, the N4 session update request may further carry a release notification for releasing the multicast session tunnel. It should be noted that the notification may be carried in the N4 session update request as an information element, or may be carried in a dedicated N4 message. This is not limited.

If the MB-UPF receives the notification for releasing the multicast session tunnel, the MB-UPF removes tunnel information related to the multicast session tunnel, for example, tunnel endpoint identification information, on a RAN side, of the multicast session tunnel between the MB-UPF and the RAN. Then, the MB-UPF sends the N4 session update response to the MB-SMF, and the MB-SMF receives the N4 session update response, and sends a response to a second message to the first SMF.

When the notification message is carried in the N2 message, the notification message may be an indication carried in the N2 message or a cause value (cause) for sending the N2 message. The cause value indicates that a cause for triggering sending of the N2 message is that the multicast session is deactivated. The N2 message may be an N2 message of a new type, or may be a UE-related N2 message, for example, an N2 message related to the PDU session that is currently in the active state and that is associated with the multicast session. The N2 message may carry the ID of the PDU session associated with the multicast session. In addition, optionally, the N2 message may further carry identification information of the multicast service corresponding to the deactivated multicast session. Similarly, when the notification message is carried in the N11 message, the notification message may be an indication carried in the N11 message or a cause value for sending the N11 message. The cause value indicates that a cause for triggering sending of the N11 message is that the multicast session is deactivated. The N11 message may be an N11 message of a new type, or may be an N11 message related to the PDU session associated with the multicast session, for example, a PDU session context update request (Nsmf_P-DUSession_UpdateSMContext Request)

Optionally, if the RAN determines to release the multicast session tunnel between the RAN and the MB-UPF, the RAN may further include the notification for releasing the multicast session tunnel in the notification message. The release notification may be an indication in the notification message, to indicate to release the multicast session tunnel.

In embodiments of this application, that the MB-SMF determines the first SMF joining the multicast service may include: the MB-SMF determines, based on the identification information of the multicast service, the first SMF joining the multicast service. The MB-SMF determines, based on the identification information of the multicast service, the first SMF joining the multicast service may include: The MB-SMF may locally search for a context (for example, the context may be a multicast service context, a multicast group context, a multicast context, a multicast session context, or the like) corresponding to the multicast service by using the identification information of the multicast service as an index, or obtains the context from a UDR. The MB-SMF views an SMF list in the context corresponding to the multicast service, and determines an SMF in the list as the first SMF. When the UE joins the multicast service, the multicast session, or the multicast group through an SMF, when the MB-SMF receives, for the first time, information (for example, multicast QoS information) related to the multicast session or the multicast service from the SMF, the MB-SMF adds the SMF to the SMF list related to the multicast service or the multicast group.

When the last UE in the SMF leaves the multicast group or the multicast service, the SMF sends a message to the MB-SMF. After receiving the message, the MB-SMF deletes the SMF from the SMF list related to the multicast service or the multicast group.

Event 2: An AS/CP sends a multicast session stop (MBS session stop) message to the MB-SMF, where the message includes the identification information of the multicast service corresponding to the multicast session that needs to be stopped (or deactivated). The MB-SMF receives the multicast session stop message, performs N4 session update with the MB-UPF, and notifies the MB-UPF to deactivate or stop the multicast session. Further, the MB-SMF may determine whether to release the multicast session tunnel. If the MB-SMF determines to release the multicast session tunnel, when performing the N4 session update with the MB-UPF, the MB-SMF notifies the MB-UPF to release the multicast session tunnel. After the MB-SMF receives the multicast session stop message, the MB-SMF determines the first SMF joining the multicast service, and sends first information to the first SMF, where the first information may indicate multicast session stop (MBS session stop) or directly indicate deactivation of the multicast session, for example, multicast broadcast service session deactivation (MBS session deactivation) or multicast session deactivation. Optionally, if the MB-SMF determines to release the multicast session tunnel, a message for releasing the multicast session tunnel is further included in eighth information. The first SMF receives seventh information sent by the MB-SMF, and determines, based on the identification information of the multicast service, whether there is a PDU session associated with the multicast session service. If there is a PDU session associated with the multicast session service, the first SMF sends N1N2 message transfer to an AMF. The AMF receives the N1N2 message transfer, and sends an N2 message to the RAN, where the N2 message may carry the first information. After receiving the first information, the RAN determines to deactivate the multicast session, and releases an air interface resource allocated to the multicast session.

Alternatively, the MB-SMF sends a multicast session stop (MBS session stop), multicast broadcast service session deactivation (MBS session deactivation), or multicast session deactivation message to the AMF, and the AMF forwards the message to the RAN. After receiving the multicast session stop (MBS session stop), multicast broadcast service session deactivation (MBS session deactivation), or multicast session deactivation message, the RAN determines to deactivate the multicast session and releases the air interface resource allocated to the multicast session.

Event 3: If the MB-UPF does not detect the data of the multicast service for a long time, the MB-UPF sends, to the MB-SMF, a message indicating that the data of the multicast service is not detected, where the message includes identification information of the multicast service whose data is not detected. The MB-SMF receives a message indicating that no data of the multicast service is detected, and the MB-SMF sends a response message to the MB-UPF, to notify the MB-UPF to deactivate the multicast session, and buffer the data of the multicast service, or send a notification to the MB-SMF when the data of the multicast service arrives at the MB-UPF. Further, the MB-SMF may determine whether to release the multicast session tunnel, and if determining to release the multicast session tunnel, may further notify the MB-UPF to release the multicast session tunnel. After the MB-SMF receives the message indicating that no data of the multicast service is detected, the MB-SMF determines the first SMF that joins the multicast service, and sends the first information to the first SMF, where the first information may be a message indicating that no data of the multicast service is detected or directly indicate to deactivate the multicast session. Optionally, if the MB-SMF determines to release the multicast session tunnel, a message for releasing the multicast session tunnel is further included in eighth information. The first SMF receives the first information sent by the MB-SMF, and determines whether there is a PDU session associated with the multicast session service. If there is a PDU session associated with the multicast session service, the first SMF sends N1N2 message transfer to an AMF. The AMF receives the N1N2 message transfer, and sends an N2 message to the RAN, where the N2 message may carry the first information. After receiving the first information, the RAN determines to deactivate the multicast session, and releases an air interface resource allocated to the multicast session.

Alternatively, the MB-SMF sends, to the AMF, a message indicating that no data of the multicast service is detected, and the AMF forwards the message to the RAN. After receiving the message indicating that no data of the multicast service is detected, the RAN determines to deactivate the multicast session, and releases an air interface resource allocated to the multicast session.

Further, optionally, if the RAN further receives a notification for releasing the multicast session tunnel, the RAN may further delete (or remove) a multicast session context (for example, a multicast context) stored in the RAN. Optionally, if the multicast session context is released, the RAN releases a transmission tunnel corresponding to the multicast session between the RAN and the MB-UPF.

S604. The RAN keeps a status of the PDU session as an active state.

If the RAN determines to deactivate the PDU session in the manner (4) in S601, the access network device further sends sixth information to the first session management function network element, for example, sends the sixth information to the first SMF through the first AMF, where the sixth information indicates that deactivation of the PDU session is rejected, and the first AMF corresponds to the PDU session of the UE.

S605. The RAN deactivates the PDU session.

S606. The RAN sends the seventh information to the first SMF, where the seventh information indicates that the PDU session has been deactivated.

For example, the RAN may send the seventh information to the first SMF through the first AMF.

S607. The first SMF receives the seventh information sent by the RAN, and determines to transmit the data of the multicast service by using a PDU session.

It should be noted that the PDU session is any PDU session in an active state other than the deactivated PDU session.

For a process in which the first SMF determines to transmit the data of the multicast service by using the PDU session, refer to the following S1004 to S1007. For example, the first SMF sends, to the MB-SMF, an N16mb message that carries tunnel information of a UPF corresponding to the PDU session. The MB-SMF receives the N16mb message, performs N4 session update with the MB-UPF, sends the tunnel information of the UPF to the MB-UPF, and establishes a channel for transmitting the data of the multicast service between the MB-SMF and the UPF. In addition, the first SMF and the UPF perform N4 session update, to map a multicast QoS flow of the multicast service to a PDU session tunnel of the PDU session for transmission in a unicast QoS flow manner. For example, the first SMF sends, to the UPF, information about the multicast service and a QFI of a unicast QoS flow to which the multicast QoS flow is mapped, to map the multicast QoS flow to the PDU session tunnel of the PDU session for transmission in the unicast QoS flow manner. The information about the multicast service may include the identification information of the multicast service, and may further include a PDR and the like. For filtered multicast service data, the UPF maps the multicast service data to a PDU session based on a mapping relationship between a QFI of a multicast QoS flow and a QFI of a unicast QoS flow, for transmission in a unicast QoS flow manner.

S608. The first SMF sends third information to the UPF. Correspondingly, the UPF receives the third information.

The third information indicates to monitor the data of the multicast service from the MB-SMF, and sends fourth information to the first SMF when the data of the multicast service from the MB-SMF arrives at the UPF.

S609. The UPF receives the data of the multicast service from the MB-UPF, and sends fourth information to the first SMF. Correspondingly, the first SMF receives the fourth information from the UPF.

The fourth information may indicate that the data of the multicast service is detected. For example, the UPF may send a user plane notification message, for example, an N4 message, to the first SMF. The N4 message may carry the fourth information indicating that the data of the multicast service is detected and the identification information of the multicast service. Optionally, the fourth information indicating that the data of the multicast service is detected may be carried in the N4 message as an information element. The information element may be an indication or a cause value, to be specific, indicating that a cause for sending the N4 message is a data arrival notification for the multicast service. Alternatively, the fourth information indicating that the data of the multicast service is detected may be sent by the UPF to the first SMF as a dedicated message, and the message may be a dedicated N4 message.

It should be noted that S607 to S609 are optional steps, and may or may not be performed. This is not limited.

S610. The first SMF receives the second information from the MB-SMF, and the first SMF notifies the RAN to add the UE to the multicast group. Before the first SMF notifies the RAN to add the UE to the multicast group, if the PDU session associated with the multicast session is in the deactivated state, the first SMF activates the PDU session associated with the multicast session.

Specifically, for the process of S610, refer to the description in FIG. 5. Details are not described again.

That the first SMF notifies the RAN to add the UE to the multicast group may be alternatively described as activating the multicast session, allocating an air interface resource to the UE to receive the data of the multicast service, or the like. For a process in which the first SMF notifies the RAN to add the UE to the multicast group, refer to the description in FIG. 5. Details are not described again.

Figure 7:
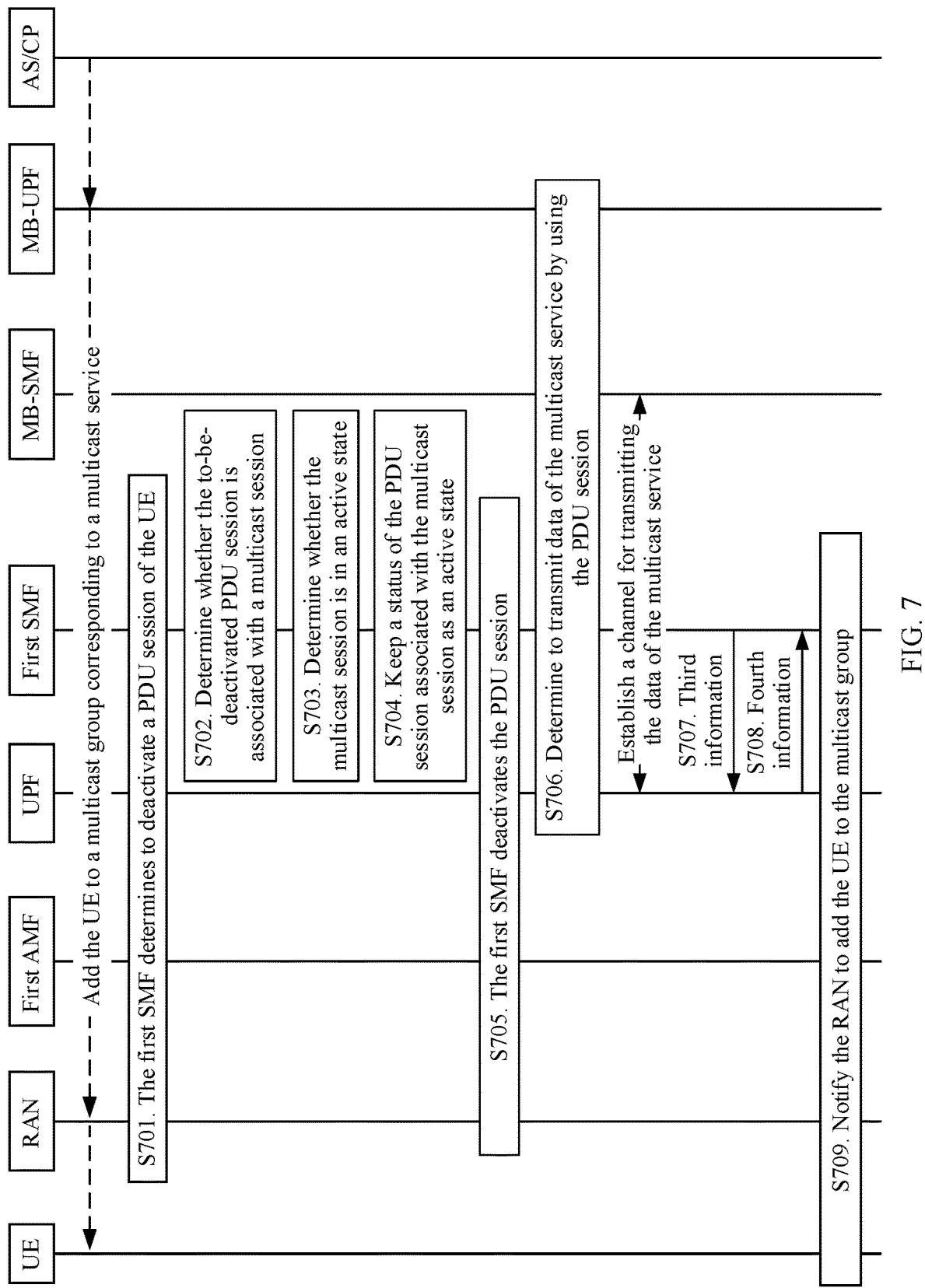
FIG. 7 is a flowchart of another communication method according to an embodiment of this application.

With reference to the 5G system shown in FIG. 3a, the following describes in detail the method shown in FIG. 5 performed by the first session management function network element by using an example in which the first terminal is UE, the access network device is a RAN, the first session management function network element is a first SMF, the second session management function network element is an MB-SMF/second SMF, the first user plane function network element is a UPF, the second user plane function network element is an MB-UPF, and the access and mobility management function network element is an AMF. It should be noted that, in this application, the UPF may be integrated with the MB-UPF. An integrated UPF may have both a function of the UPF in this application and a function of the MB-UPF. Alternatively, the UPF and the MB-UPF are independently deployed. This is not limited. In this application, the SMF may be integrated with the MB-SMF. An integrated SMF may have both a function of the SMF in this application and a function of the MB-SMF. Alternatively, the SMF and the MB-SMF are independently deployed. This is not limited. FIG. 7 is a flowchart of a communication method according to an embodiment of this application. As shown in FIG. 7, the method includes the following steps.

S701. A first SMF determines to deactivate a PDU session of UE.

For example, the first SMF may determine, in either of the following two manners, to deactivate the PDU session of the UE. Manner (1): The first SMF receives a PDU session deactivation notification sent by a RAN, and determines to deactivate the PDU session of the UE. Manner (2): The first SMF receives a notification that is sent by a UPF and that indicates that no data transmitted by using the PDU session of the UE is detected for a long time, and determines to deactivate the PDU session.

S702. The first SMF determines whether the to-be-deactivated PDU session is associated with a multicast session.

For an execution process of S702, refer to S501. Details are not described again.

S703. The first SMF determines whether the multicast session is in an active state. If the PDU session is associated with the multicast session and the multicast session is in the active state, S704 is performed, and the procedure ends. Otherwise, S705 is performed, and the procedure ends.

For example, if any one or more of the following events 1 to 3 are executed (or occur), it is determined that the multicast session is in a deactivated state. Otherwise, if none of the following events 1 to 3 occurs, it is determined that the multicast session is in the active state.

Event 1: The first SMF receives an indication/notification for deactivating the multicast session from the RAN, determines to deactivate the multicast session, and marks a status of the multicast session as a deactivated state.

Event 2: An AS/CP sends a multicast session stop (MBS session stop or Session stop) message to an MB-SMF through an NEF or directly, where the message includes identification information of a multicast service corresponding to the multicast session that needs to be stopped (or deactivated) (for example, the identification information of the multicast service may be a multicast IP address of a multicast group, or an ID, a name, or a group ID of the multicast group). An MB-SMF receives the multicast session stop message, and performs session update (for example, N4 session update) with the MB-UPF to notify the MB-UPF of multicast session deactivation or multicast session stop. Further, the MB-SMF may determine whether to release a multicast session tunnel. If the MB-SMF determines to release the multicast session tunnel, when performing session update (for example, N4 session update) with the MB-UPF, the MB-SMF notifies the MB-UPF to release the multicast session tunnel. After the MB-SMF receives the multicast session stop message, the MB-SMF determines the first SMF that joins the multicast service, and sends first information to the first SMF. The first information may be a multicast session stop indication/notification message or may directly indicate to deactivate the multicast session. Optionally, if the MB-SMF determines to release the multicast session tunnel, a message for releasing the multicast session tunnel is further included in the first information. The first SMF receives the first information sent by the MB-SMF, determines, based on the first information, to deactivate the multicast session, and marks the status of the multicast session as the deactivated state.

Event 3: If the MB-UPF does not detect the data of the multicast service for a long time, the MB-UPF sends, to the MB-SMF, a message indicating that the data of the multicast service is not detected, where the message includes identification information of the multicast service whose data is not detected. The MB-SMF receives a message indicating that no data of the multicast service is detected, and determines that the multicast session corresponding to the multicast service is deactivated. The MB-SMF sends a response message to the MB-UPF, to notify the MB-UPF to buffer the data of the multicast service for next activation of the multicast session, or send a notification to the MB-SMF when the data of the multicast service arrives at the MB-UPF. Further, the MB-SMF may determine whether to release the multicast session tunnel, and if determining to release the multicast session tunnel, may further notify the MB-UPF to release the multicast session tunnel. After the MB-SMF receives the message indicating that no data of the multicast service is detected, the MB-SMF determines the first SMF that joins the multicast service, and sends the first information to the first SMF, where the first information may be a message indicating that no data of the multicast service is detected or directly indicate to deactivate the multicast session. Optionally, if the MB-SMF determines to release the multicast session tunnel, a message for releasing the multicast session tunnel is further included in the first information. The first SMF receives the first information sent by the MB-SMF, determines, based on the first information, to deactivate the multicast session, and marks the status of the multicast session as the deactivated state.

S704. The first SMF keeps a status of the PDU session associated with the multicast session in an active state.

S705. The first SMF deactivates the PDU session.

S706. The first SMF determines to transmit the data of the multicast service by using the PDU session.

It should be noted that the PDU session is any PDU session in an active state other than the deactivated PDU session.

For a process in which the first SMF determines to transmit the data of the multicast service by using the PDU session, refer to the following S1004 to S1007. For example, the first SMF sends, to the MB-SMF, an N16mb message that carries tunnel information of a UPF corresponding to the PDU session. The MB-SMF receives the N16mb message, performs session update (for example, N4 session update) with the MB-UPF, sends the tunnel information of the UPF to the MB-UPF, and establishes a channel for transmitting the data of the multicast service between the MB-SMF and the UPF. In addition, the first SMF and the UPF perform session update (for example, N4 session update), to map a multicast QoS flow of the multicast service to a PDU session tunnel of the PDU session for transmission in a unicast QoS flow manner. For example, the first SMF sends, to the UPF, a session update request (for example, an N4 session update request) that carries information about the multicast service and a QFI of a unicast QoS flow to which the multicast QoS flow is mapped, to map the multicast QoS flow to the PDU session tunnel of the PDU session for transmission in the unicast QoS flow manner. The information about the multicast service may include the identification information of the multicast service, and may further include a PDR and the like. For filtered multicast service data, the UPF maps the multicast service data to a PDU session based on a mapping relationship between a QFI of a multicast QoS flow and a QFI of a unicast QoS flow, for transmission in a unicast QoS flow manner. Further, the UPF returns a session update response (for example, an N4 session update response) to the first SMF.

S707. The first SMF sends third information to the UPF. Correspondingly, the UPF receives the third information.

The third information indicates to monitor the data of the multicast service from the MB-SMF, and sends fourth information to the first SMF when the data of the multicast service from the MB-SMF arrives at the UPF.

It should be noted that the third information may be carried in the session update request and sent to the UPF in a process of performing session update (for example, N4 session update) by the first SMF and the UPF. In this case, step S707 may be combined into the process of performing session update by the first SMF and the UPF.

S708. The UPF receives the data of the multicast service from the MB-UPF, and sends fourth information to the first SMF. Correspondingly, the first SMF receives the fourth information from the UPF.

The fourth information may indicate that the data of the multicast service is detected. For example, the UPF may send a user plane notification message, for example, an N4 message, to the first SMF. The N4 message may carry the fourth information indicating that the data of the multicast service is detected and the identification information of the multicast service. Optionally, the fourth information indicating that the data of the multicast service is detected may be carried in the N4 message as an information element. The information element may be an indication, a notification, or a cause value, to be specific, indicating that a cause for sending the N4 message is a data arrival notification for the multicast service. Alternatively, the fourth information indicating that the data of the multicast service is detected may be sent by the UPF to the first SMF as a dedicated message, and the message may be a dedicated N4 message.

It should be noted that S706 to S708 are optional steps, and may or may not be performed. This is not limited.

S709. The first SMF receives the second information from the MB-SMF, and the first SMF notifies the RAN to add the UE to the multicast group.

It should be noted herein that before the first SMF interacts with the RAN and another core network device to add the UE to the multicast group, if the PDU session associated with the multicast session is in the deactivated state, the first SMF activates the PDU session associated with the multicast session. It should be noted herein that the SMF may interact with the RAN and another core network to add the UE to the multicast group while activating the PDU session associated with the multicast session, may first add the UE to the multicast group and then activate the PDU session associated with the multicast session, or may first activate the PDU session associated with the multicast session and then add the UE to the multicast group. This is not limited.

For example, for UE in a CM-CONNECTED state in the multicast group, if the associated PDU session is in the deactivated state, the first SMF (that is, the first session management function network element) activates the associated PDU session. For UE in a CM-IDLE state, a network side device may first perform group paging or paging for a single UE. After receiving a paging message, the UE initiates a first message, for example, initiates a service request, and activates, by performing a service request procedure, the PDU session associated with the multicast session. The UE may be added to the multicast group after the PDU session associated with the multicast session is activated, the UE may be first added to the multicast group and then the associated PDU session is activated, or the associated PDU session may be activated when the UE is added to the multicast group. This is not limited.

Specifically, for a process of activating the PDU session associated with the multicast session, refer to the description in FIG. 5. Details are not described again.

For example, that the first SMF notifies the RAN to add the UE to the multicast group may be alternatively described as activating the multicast session, or allocating an air interface resource to the UE to receive the data of the multicast service and receiving a radio bearer configuration for the data of the multicast service. For a process in which the first SMF notifies the RAN to add the UE to the multicast group, refer to the description in FIG. 5. Details are not described again.

In the methods shown in FIG. 5 to FIG. 7, the multicast session and the PDU session associated with the multicast session are used as an example. When the PDU session is to be deactivated, whether the multicast session of the PDU session is in the deactivated state is considered to determine whether to deactivate the PDU session. Alternatively, this application further provides a communication method, and the communication method includes: After receiving second information for activating a multicast session, a first session management function network element notifies an access network device to add a first terminal to a multicast group corresponding to the multicast session, to ensure that the first terminal receives data of a multicast service by using the multicast session, thereby improving resource utilization. Alternatively, after receiving second information for activating a multicast session, a first session management function network element activates a PDU session associated with the multicast session, for example, directly activates the PDU session associated with the multicast session, or activates the PDU session associated with the multicast session based on a multicast capability corresponding to the PDU session. Specifically, for this method, refer to FIG. 8.

Figure 8:
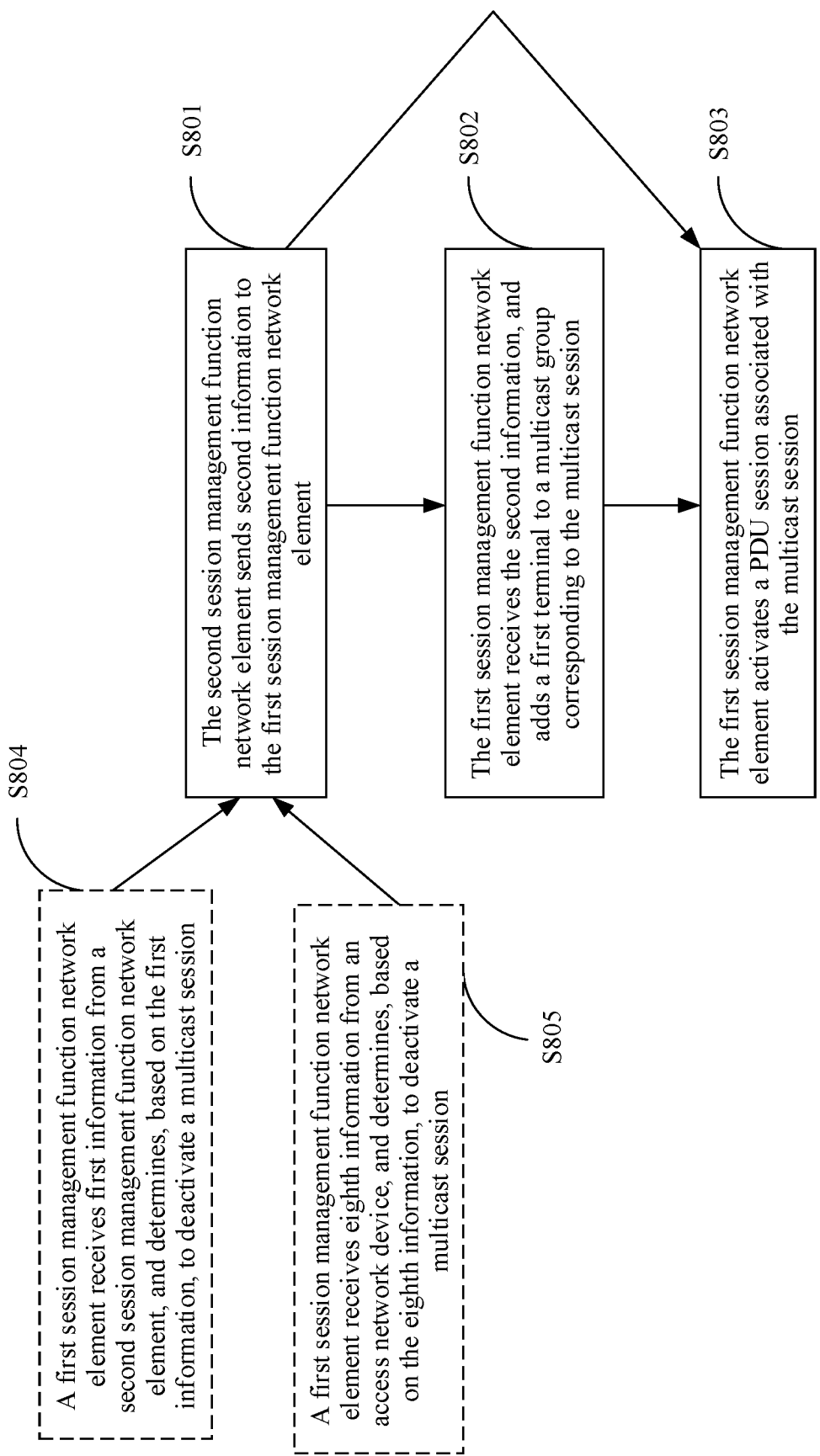
FIG. 8 is a flowchart of another communication method according to an embodiment of this application.

FIG. 8 is a flowchart of a communication method according to an embodiment of this application. The method may be applied to a scenario in which a multicast session is in a deactivated state. As shown in FIG. 8, the method may include the following steps.

S801. A second session management function network element sends second information to a first session management function network element.

The first session management function network element may be a session management function network element corresponding to a PDU session of a first terminal. The first session management function network element may manage the PDU session of the first terminal. The first terminal may be any terminal that joins a multicast group corresponding to a multicast service.

The second information may indicate to activate a multicast session, and the second information may include identification information of the multicast service or identification information of the multicast group (for example, one or more of a TMGI, a multicast broadcast service session (MBS session ID), an identifier of the multicast service, a multicast address, a multicast IP address, an identifier of the multicast group, an identifier of the multicast session, context information of the multicast session, address information of the multicast service, identification information of the PDU session associated with the multicast session, service data flow SDF identification information of the multicast service, and the like). It should be noted that the identification information of the multicast group may uniquely identify the multicast group. The second information may directly indicate/notify to activate the multicast session. For example, the second information may carry an information element/indication/notification, where the information element/indication/notification explicitly indicates that the multicast session is to be activated. In still another example, the second information may indirectly indicate that the multicast session is to be activated. For example, the second information may indicate/notify multicast session initiate/start, and the second information is MBS session start/session start, multicast broadcast service session activation (MBS session activation), or multicast session activation. Alternatively, the second information indicates that a second user plane function network element detects data of the multicast service, for example, may be multicast broadcast service session activation (MBS session activation) or multicast session activation. Alternatively, the second information may indicate that the first terminal is in a connection management (CM) connected state. Alternatively, the second information may indicate that data of the multicast service arrives at a second user plane function network element, or the second user plane function network element detects the data of the multicast service, the data of the multicast service is to be transmitted, or the like.

S802. The first session management function network element receives the second information, and adds the first terminal to the multicast group corresponding to the multicast session.

For example, the first session management function network element may interact with an access network device and another core network device (for example, one or more of a first access and mobility management function network element, a second access and mobility management function network element, and the second session management function network element), to add the first terminal to the multicast group corresponding to the multicast session. Specifically, for a process in which the first session management function network element interacts with the access network device and the another core network device to add the first terminal to the multicast group corresponding to the multicast session, refer to the description in FIG. 5. Details are not described again.

Further, if the PDU session associated with the multicast session is in a deactivated state, the method shown in FIG. 8 may further include the following steps.

S803. The first session management function network element activates the PDU session associated with the multicast session.

For example, for the first terminal in the CM-CONNECTED state in the multicast group, if the PDU session of the first terminal is associated with the multicast session, and the associated PDU session is in the deactivated state, the first session management function network element activates the associated PDU session. Alternatively, for the first terminal in the CM-CONNECTED state in the multicast group, when the access network device (that is, the access network device that has an RRC connection to the first terminal) corresponding to the first terminal does not support a multicast function, if the associated PDU session is in the deactivated state, the first session management function network element activates the associated PDU session.

For the first terminal in a CM-IDLE state, a network side device (for example, the first access and mobility management function network element) may first send a paging message to the first terminal through group paging or through paging to a single terminal. After receiving the paging message, the first terminal initiates a service request procedure, to trigger the first session management function network element to activate the PDU session associated with a multicast session.

In a possible design, for activating the PDU session associated with the multicast session, refer to the description in FIG. 5. Details are not described again.

In another possible design, that the first session management function network element activates the associated PDU session may include: The first session management function network element activates the PDU session associated with the multicast session when the first session management function network element receives indication information that is of the first mobility and access management network element and that indicates to activate the PDU session. For example, the first session management function network element receives the second information for activating the multicast session, determines the PDU session associated with the multicast session, and sends, to the first access and mobility management function network element corresponding to the PDU session, N1N2Namf_communication_N1N2 message transfer (N1N2Namf_Communication_N1N2MessageTransfer) carrying the identification information of the PDU session, so that the first access and mobility management function network element determines, based on the identification information of the PDU session associated with the multicast session, that the PDU session associated with the multicast session needs to be activated. The first access and mobility management function network element sends an Nsmf_PDU session_update session management context request (Nsmf_PDUSession_UpdateSMContext Request) to the first session management function network element. The Nsmf_PDUSession_UpdateSMContext request may include indication information for activating the PDU session, for example, may include an operation type field. The operation type field indicates that an operation type is set to user plane activate (operation type set to "UP activate"). The first session management function network element receives the Nsmf_PDUSession_UpdateSMContext request, and the first session management function network element activates, based on the operation type field included in the Nsmf_PDUSession_UpdateSMContext request, the PDU session associated with the multicast session.

This application does not limit an execution sequence in which the first session management function network element interacts with the access network device and the another core network element to add the first terminal to the multicast group corresponding to the multicast session and activates the associated PDU session. After the PDU session associated with the multicast session is activated, the first session management function network element interacts with the access network device and the another core network element to add the first terminal to the multicast group corresponding to the multicast session. Alternatively, the first session management function network element may first interact with the access network device and the another core network element to add the first terminal to the multicast group corresponding to the multicast session, and then activate the associated PDU session. Alternatively, the first session management function network element may interact with the access network device and the another core network element to add the first terminal to the multicast group corresponding to the multicast session and activate the associated PDU session at the same time. For example, in a possible design, after receiving the second information, the first session management function network element may perform S802 based on the second information. Further, optionally, the first session management function network element performs S803. In another possible design, after receiving the second information, the first session management function network element may perform S803 based on the second information. Further, optionally, the first session management function network element performs S802.

In the method shown in FIG. 8, before S801, the first session management function network element may determine, by using S804 or S805, to deactivate the multicast session.

S804. The first session management function network element receives first information from the second session management function network element, and determines, based on the first information, to deactivate the multicast session.

The first information may be MBS session stop/session stop/MBS session deactivation, and the first information is explicit indication information that directly indicates to deactivate the multicast session. For example, a content provider may send, to the second session management function network element, the first information (MBS session stop/Session stop) indicating to deactivate the multicast session, and the second session management function network element receives the first information, and sends the first information to the first session management function network element. Alternatively, the first information may be information indicating multicast session stop/deactivation; or the first information may be information indicating that the second user plane function network element does not detect the data of the multicast service. The first information may carry the identification information of the multicast service. For specific descriptions of the first information, refer to FIG. 5. Details are not described again.

Specifically, for a process in which the first session management function network element receives the first information from the second session management function network element, refer to descriptions in the following embodiments corresponding to FIG. 11A to FIG. 14a-3.

Further, after the first session management function network element receives the first information from the second session management function network element, the method may further include: The first session management function network element sends the first information to the access network device, so that the access network device determines, based on the first information, to deactivate the multicast session, release an air interface resource allocated to the multicast session, and the like.

S805. The first session management function network element receives eighth information, and determines, based on the eighth information, to deactivate the multicast session.

The eighth information may indicate to deactivate the multicast session corresponding to the multicast service. The eighth information may alternatively be a notification for releasing a multicast session tunnel. In example 1, the eighth information may be an indication/notification, and directly indicate/notify to deactivate the multicast session, and the eighth information may carry the identification information of the multicast service; or the eighth information is information for deactivating the PDU session associated with the multicast session, and the eighth information may carry the identification information of the PDU session associated with the multicast session. The eighth information may be sent by the access network device to the first session management function network element through the first access and mobility management function network element or the second access and mobility management function network element.

For example, the first session management function network element may receive the eighth information through the first access and mobility management function network element, or the first session management function network element receives the eighth information through the second session management function network element. For example, the access network device sends the eighth information to the second access and mobility management function network element. After receiving the eighth information, the second access and mobility management function network element forwards the eighth information to the second session management function network element, and the second session management function network element sends the eighth information to the first session management function network element. Specifically, for a process in which the first session management function network element receives the eighth information, refer to descriptions in the following embodiments corresponding to FIG. 9A and FIG. 9B and FIG. 10A and FIG. 10B.

Further, after the first session management function network element receives the eighth information from the second session management function network element, the method may further include: The first session management function network element sends the eighth information to the second session management function network element, so that the second session management function network element interacts with the second user plane function network element, and triggers the second user plane function network element to buffer the data of the multicast service and delete information related to the multicast session (for example, context information related to the multicast session and a tunnel (for example, a multicast session tunnel) related to the multicast session).

Further, after determining to deactivate the multicast session, the first session management function network element marks the multicast session as the deactivated state.

For example, the first session management function network element may set a multicast session status in related information corresponding to the multicast session/multicast service to a deactivated state (deactivated/inactive/standby), or set related information of the multicast session to a deactivated state, or the like.

Further, in the method shown in FIG. 8, before the multicast session is successfully activated, to maintain normal transmission of the data of the multicast service, the method may further include the following step: The first session management function network element determines to send the data of the multicast service by using the PDU session associated with the multicast session, notifies the first user plane function network element to establish a channel between the first user plane function network element and the second user plane function network element, maps the data of the multicast service to the PDU session, and transmits the data of the multicast service to the first terminal by using the PDU session. Specifically, the process may include:

The first session management function network element sends an N16 message to the second session management function network element, where the N16 message may be for establishing the channel (or referred to as a tunnel) that is for transmitting the data of the multicast service and that is between the second user plane function network element and the first user plane function network element, and the N16 message may include tunnel information of the first user plane function network element. The second session management function network element receives the N16 message, and sends, to the second user plane function network element, a session update request (for example, an N4 session update request) that carries the tunnel information of the first user plane function network element. The second user plane function network element receives the session update request, correspondingly stores the tunnel information of the first user plane function network element and the identification information of the multicast service, and establishes the channel that is for transmitting the data of the multicast service and that is between the second user plane function network element and the first user plane function network element. The second user plane function network element sends a session update response (for example, an N4 session update response) to the second session management function network element. The second session management function network element receives the session update response from the second user plane function network element, and sends, to the first session management function network element, a response, to the N16 message, that carries the identification information of the multicast service. After receiving the response to the N16 message, the first session management function network element sends, to the first user plane function network element based on a mapping relationship between a multicast QoS flow and a unicast QoS flow that correspond to the multicast service, the identification information of the multicast service and a QFI of the unicast QoS flow to which the multicast QoS flow is mapped, so that the first user plane function network element correspondingly stores the identification information of the multicast service and the QFI of the unicast QoS flow to which the multicast QoS flow is mapped, and maps the data of the multicast service to the PDU session, to transmit the data of the multicast service in a unicast QoS flow manner.

It should be understood that a name of the N16 message is not limited in this embodiment of this application. Alternatively, the N16 message may also be referred to as an N16mb message or another name. This is not limited.

Further, after the data of the multicast service is mapped to the PDU session, the method may further include: The first session management function network element sends third information to the first user plane function network element, where the third information may indicate to detect the data of the multicast service sent by the second user plane function network element or indicate to send a notification to the first session management function network element when the data of the multicast service arrives at the first user plane function network element. In this way, the first user plane function network element sends fourth information to the first session management function network element when detecting that the data of the multicast service arrives at the first user plane function network element, so that the first session management function network element activates the multicast session based on the fourth information.

It should be noted that the third information may be carried in a session update request and sent to the first user plane function network element in a process in which the first session management function network element and the first user plane function network element perform session update (for example, N4 session update).

Optionally, if the first session management function network element determines to transmit the data of the multicast service by using the PDU session in the method shown in FIG. 8, after the re-adding the first terminal to the multicast group corresponding to the multicast session, to save a transmission resource, the method may further include: The first session management function network element releases a resource for transmitting the data of the multicast service by using the PDU session, for example, triggering the access network device to release an air interface resource that corresponds to the PDU session and that is for transmitting the data of the multicast service, releasing the channel that is between the first user plane function network element and the second user plane function network element and that is for transmitting the data of the multicast service, and releasing a PDR that is in the first user plane function network element and that identifies the data of the multicast service.

Based on the method shown in FIG. 8, when the multicast session is in the deactivated state, after the first session management function network element receives the second information for activating the multicast session, for the UE in the CM-CONNECTED state in the multicast group, if the associated PDU session is in the deactivated state, the first session management function network element activates the associated PDU session. For the UE in the CM-IDLE state, the network side device may first perform group paging or paging for single UE. After receiving the paging message, the UE initiates the service request procedure to activate the PDU session associated with the multicast session. After the PDU session associated with the multicast session is activated, the first session management function network element may interact with the access network device and the another core network element to add the first terminal to the multicast group corresponding to the multicast session. Alternatively, the first session management function network element may interact with the access network device and the another core network element to add the first terminal to the multicast group corresponding to the multicast session, and then activate the associated PDU session. Alternatively, the first session management function network element may interact with the access network device and the another core network element to add the first terminal to the multicast group corresponding to the multicast session and activate the associated PDU session at the same time. This is not limited. Optionally, when the data of the multicast service is mapped to the PDU session, after the multicast session is activated, the resource for transmitting the data of the multicast service by using the PDU session is released. In this way, the multicast session can be flexibly activated/deactivated.

With reference to the 5G system shown in FIG. 3a, the following describes in detail the method shown in FIG. 5 performed by the access network device by using an example in which the first terminal is UE, the access network device is a RAN, the first session management function network element is a first SMF, the second session management function network element is an MB-SMF/second SMF, the first user plane function network element is a UPF, the second user plane function network element is an MB-UPF, and the access and mobility management function network element is an AMF. It should be noted that, in this application, the UPF may be integrated with the MB-UPF. An integrated UPF may have both a function of the UPF in this application and a function of the MB-UPF. Alternatively, the UPF and the MB-UPF are independently deployed. This is not limited. In this application, the SMF may be integrated with the MB-SMF. An integrated SMF may have both a function of the SMF in this application and a function of the MB-SMF. Alternatively, the SMF and the MB-SMF are independently deployed. This is not limited. In the method shown in FIG. 8, a process in which the first session management function network element receives the eighth information from the RAN, the first session management function network element marks deactivation of the multicast session, triggers the RAN and the MB-UPF to deactivate the multicast session, and subsequently activates/restarts the multicast session after receiving the second information (MBS session start/Session start) is described in detail.

In this embodiment of this application, the second information may include multicast/broadcast service session deactivation (MBS session deactivation) or multicast session deactivation.

Figure 9A:
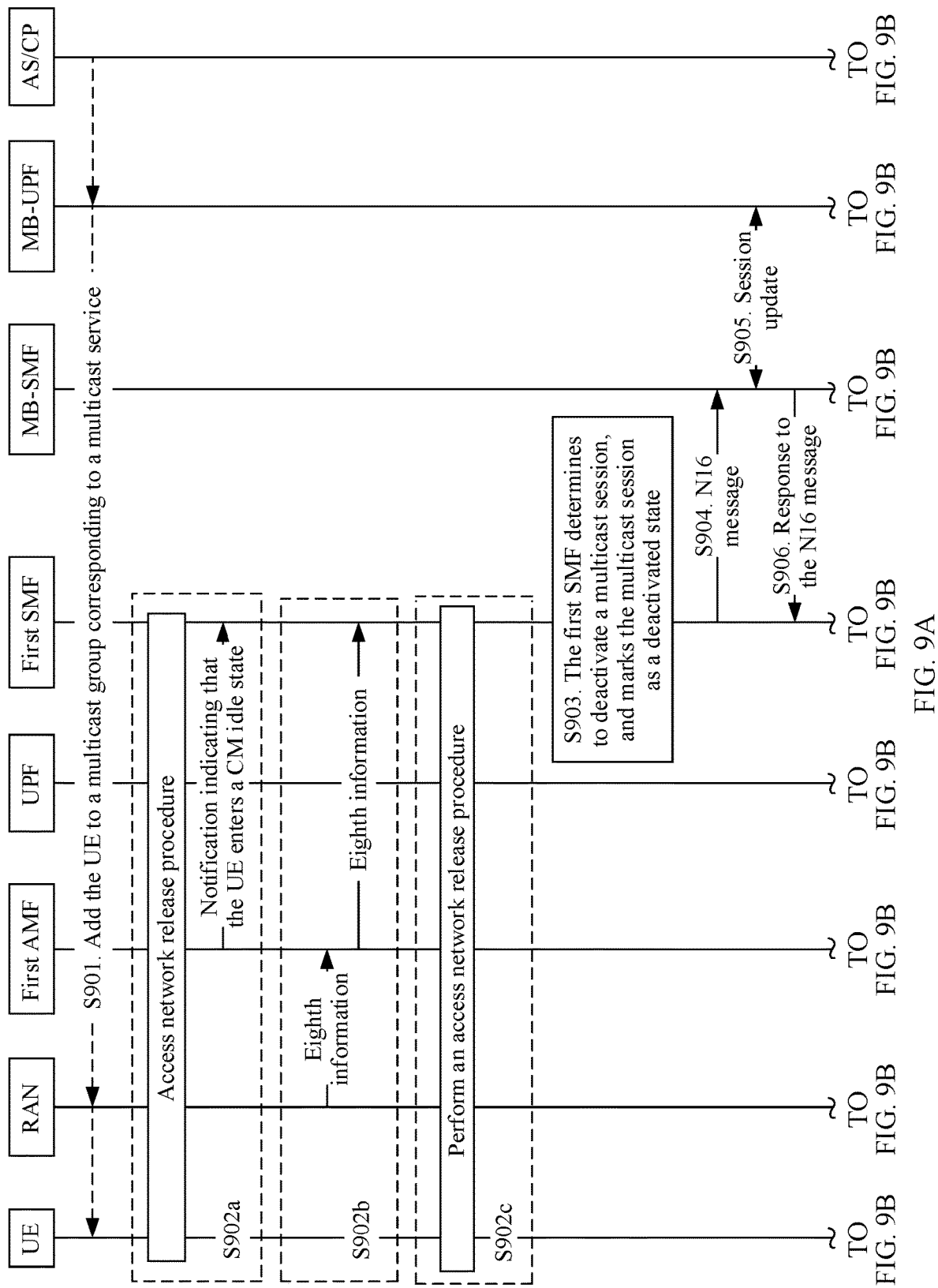
FIG. 9A and FIG. 9B are a flowchart of another communication method according to an embodiment of this application.
Figure 9B:
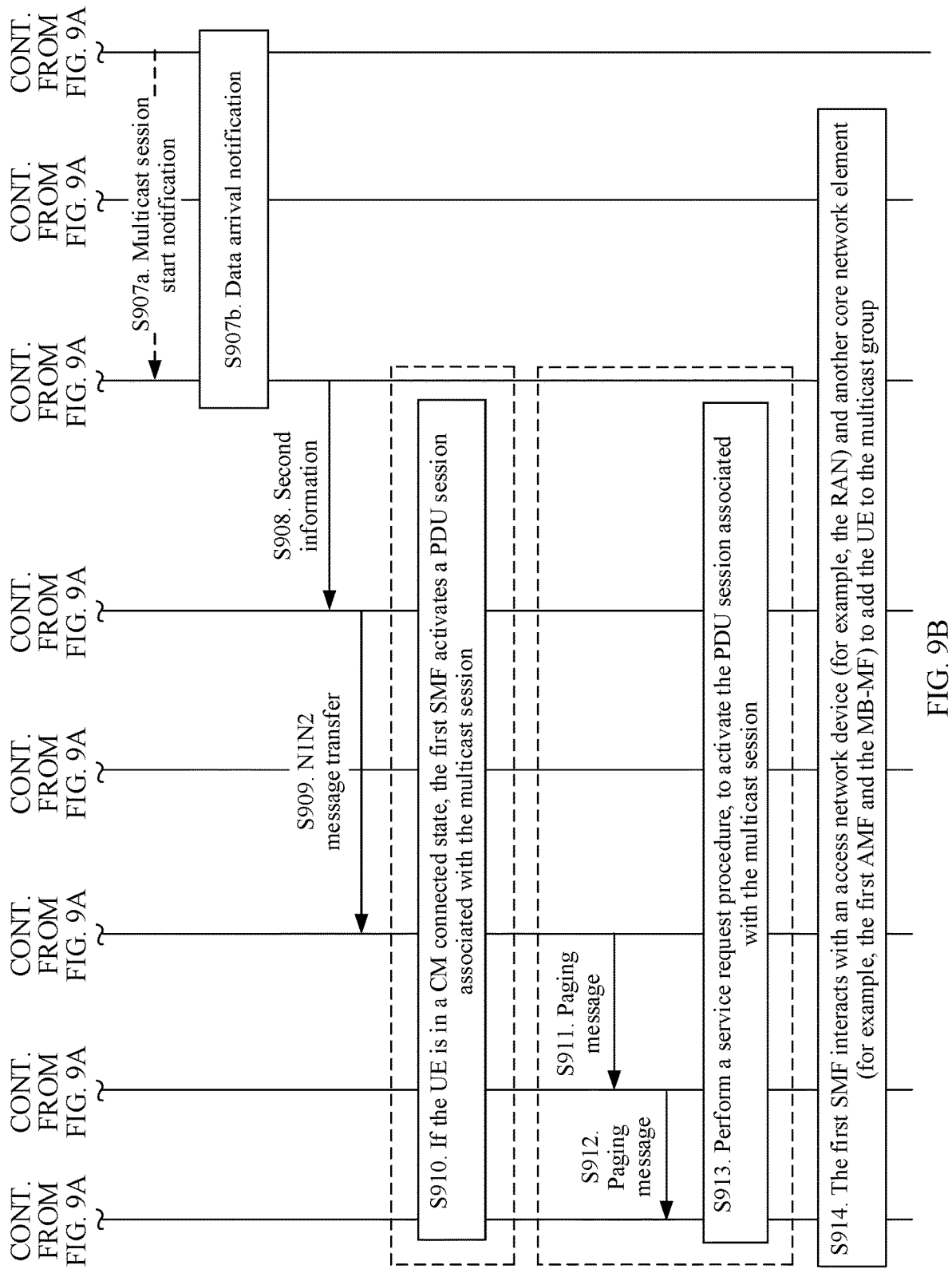

FIG. 9A and FIG. 9B are a flowchart of a communication method according to an embodiment of this application. As shown in FIG. 9A and FIG. 9B, the method may include the following steps.

S901. Set up a multicast session corresponding to a multicast service, and add UE to a multicast group corresponding to the multicast service.

For example, the UE joins the multicast session corresponding to the multicast service by using a PDU session of the UE. The process is described above, and details are not described again.

S902a. A RAN performs an AN release procedure. After the AN release procedure is performed, a first AMF determines that the UE enters a CM idle state, and the first AMF sends, to a first SMF, a notification that the UE enters the CM idle state. Correspondingly, the first SMF receives the notification that the UE enters the CM idle state. It should be noted herein that the RAN performs the AN release procedure. If it is found that the PDU session of the UE is associated with the multicast session and the multicast session is in an active state, the RAN does not perform AN release.

The first AMF may be an AMF (that is, the first access and mobility management function network element described above) corresponding to the PDU session of the UE.

For example, the first SMF may subscribe to, from the first AMF, the notification that the UE enters the CM idle state. For example, when the first SMF finds that the UE joins the multicast group by using a control plane message of a PDU session of the UE or a user plane notification message, the first SMF may subscribe to, from the first AMF, the notification that the UE corresponding to the PDU session enters the CM idle state. Optionally, the first SMF may subscribe to, from the first AMF by using an Namf_EventExposure service, the notification that the UE enters the idle state. When the UE enters the CM idle state, the first AMF may send, to the first SMF, the notification that the UE enters the CM idle state. For example, the first AMF may send the notification that the UE enters the CM idle state to the first SMF by using a call-back uniform resource identifier (call-back URI) used when the first SMF subscribes to the notification from the first AMF.

S902b. The RAN determines to deactivate the multicast session, and sends eighth information to the first SMF. Correspondingly, the first SMF receives the eighth information.

The eighth information may indicate to deactivate the multicast session corresponding to the multicast service.

For example, if duration in which the RAN does not receive data of the multicast service on the multicast session is greater than preset duration, the RAN determines to deactivate the multicast session of the multicast service. Alternatively, if there is no UE that receives data of the multicast service in UEs served by the RAN, the RAN determines to deactivate the multicast session of the multicast service.

The RAN may send the eighth information to the first SMF through the first AMF or a second AMF. The RAN may send, to the first AMF or the second AMF, the eighth information indicating to deactivate the multicast session corresponding to the multicast service, where the eighth information may be carried in an N2 message. After receiving the eighth information, the first AMF locates the corresponding first SMF based on the eighth information (for example, an ID of the PDU session associated with the multicast session or an SM context ID) carried in the N2 message, and may send the eighth information to the first SMF. The eighth information may be carried in an N11 message. Alternatively, after receiving the eighth information, the second AMF sends the eighth information to a second SMF. The second SMF locates the corresponding first SMF based on the eighth information (for example, an ID of the PDU session associated with the multicast session or an SM context ID) carried in an N2 message, and may send the eighth information to the first SMF. The eighth information may be carried in an N11 message.

The eighth information may be an indication carried in the N2 message or a cause value (cause) for sending the N2 message. The cause value indicates that a cause for triggering sending of the N2 message is that the multicast session is deactivated. The N2 message may be an N2 message of a new type, or may be a UE-related N2 message, for example, an N2 message related to the PDU session that is currently in the active state and that is associated with the multicast session. The N2 message may carry the ID of the PDU session associated with the multicast session. In addition, optionally, the N2 message may further carry identification information of the multicast service corresponding to the deactivated multicast session. Similarly, the eighth information may be an indication carried in the N11 message or a cause value for sending the N11 message. The cause value indicates that a cause for triggering sending of the N11 message is that the multicast session is deactivated. The N11 message may be an N11 message of a new type, or may be an N11 message related to the PDU session associated with the multicast session, for example, a PDU session context update request (Nsmf first-SMF_PDUSession_UpdateSMContext Request)

S902c. The RAN performs an AN release procedure. For example, the RAN sends an N2 UE context release complete message carrying eighth information to the first AMF, and the first AMF receives the N2 UE context release complete message, and sends the eighth information to the first SMF based on the eighth information. Correspondingly, the first SMF receives the eighth information.

For example, the first AMF may send, to the first SMF, an Nsmf SMF_PDUSession_UpdateSMContext request carrying the eighth information. In this case, the eighth information may indicate to deactivate the PDU session, that is, indirectly indicate to deactivate the multicast session, where the PDU session is associated with the multicast session.

Further, after determining that the multicast session is deactivated or the PDU session associated with the multicast session is deactivated, the RAN releases an air interface resource allocated to the multicast session. Optionally, the RAN further deletes/removes/releases a multicast session context stored in the RAN. Optionally, if the multicast session context is released, the RAN may determine to release a transmission tunnel (or referred to as a multicast session tunnel) corresponding to the multicast session between the RAN and an MB-UPF.

Further, if the RAN determines to release the multicast session tunnel between the RAN and the MB-UPF, the eighth information may further carry a release notification/indication for releasing the multicast session tunnel, to indicate/notify to release the multicast session tunnel.

S903. The first SMF determines to deactivate the multicast session, and marks the multicast session as a deactivated state.

For example, when receiving the notification that is sent by the first AMF and that indicates that the UE enters the CM idle state, the first SMF determines to deactivate the multicast session, where the UE is UE that joins the multicast group. Alternatively, when receiving the eighth information that is sent by the RAN and that is for deactivating the multicast session, the first SMF determines to deactivate the multicast session. Alternatively, when the first SMF receives the N first SMF_PDUSession_UpdateSMContext request carrying PDU session deactivation, the first SMF determines, based on a PDU session deactivation information element and an association relationship between the PDU session and the multicast session that are carried in the N first SMF_PDUSession_UpdateSMContext request, to deactivate the multicast session.

S904. The first SMF sends an N16 message to the MB-SMF. Correspondingly, the MB-SMF receives the N16 message.

The N16 message may notify the MB-SMF to deactivate the multicast session. For example, the N16 message may be an existing N16 message, the N16 message may carry a multicast session deactivation notification/indication, and the multicast session deactivation notification/indication may be carried in the N16 message as an information element. For example, the information element may be an indication/notification, or may be a cause value, to be specific, a cause for sending the N16 message is the multicast session deactivation notification/indication, or the like. Alternatively, the multicast session deactivation notification/indication may be used as separate signaling, for example, a dedicated N16 message notifying/indicating/requesting to deactivate the multicast session is sent to the MB-SMF.

Optionally, if the eighth information received by the first SMF further carries the release notification/indication for releasing the multicast session tunnel, the N16 message sent by the first SMF to the MB-SMF further carries the release notification/indication for releasing the multicast session tunnel, to indicate/notify the MB-SMF to release the multicast session tunnel.

S905. The MB-SMF performs session update (for example, N4 session update) with the MB-UPF.

For example, the MB-SMF sends an N4 session update request to the MB-UPF, where the N4 session update request may carry the identification information of the multicast service. Optionally, the N4 session update request further carries a notification/indication indicating the MB-UPF to buffer the data of the multicast service. Optionally, if the MB-SMF does not notify the MB-UPF to buffer the data of the multicast service, the MB-SMF may still buffer the data of the multicast service. Optionally, the N4 session update request may further indicate/notify the MB-UPF to notify the MB-SMF when the data of the multicast service arrives at the MB-UPF.

Optionally, when the N16 message carries the release notification for releasing the multicast session tunnel, the N4 session update request may further carry the release notification for releasing the multicast session tunnel. If the MB-UPF receives the notification for releasing the multicast session tunnel, the MB-UPF removes tunnel information related to the multicast session tunnel, for example, tunnel endpoint identification information, on a RAN side, of the multicast session tunnel between the MB-UPF and the RAN. Then, the MB-UPF sends an N4 session update response to the MB-SMF.

It should be noted that the notification may be carried in the N4 session update request as an information element, or may be carried in a dedicated N4 message. This is not limited.

S906. The MB-SMF sends a response to the N16 message to the first SMF. Correspondingly, the first SMF receives the response to the N16 message.

S901 to S906 are a related procedure of deactivating the multicast session. Further, when the data of the multicast service is transmitted again, to ensure transmission of the multicast service, the multicast session further needs to be activated. For a process of activating the multicast session, refer to the following content.

S907a. An AS/CP determines to start the multicast session to transmit the data of the multicast service, and the AS/CP sends a multicast session start (MBS session start) notification to the MB-SMF directly or through an NEF. Correspondingly, the MB-SMF receives the multicast session start notification.

For example, the AS/CP may send, to the MB-SMF, a notification of starting the multicast session start (MBS session start) notification and identification information of the multicast service corresponding to the multicast session that needs to be started.

In this embodiment of this application, content indicated by multicast session start, multicast/broadcast service session activation (MBS session activation), or multicast session activation is the same. The descriptions may be used interchangeably. This is not limited.

S907b. The MB-UPF detects that the data of the multicast service arrives at the MB-UPF, and sends a data arrival notification for the multicast service to the MB-SMF. Correspondingly, the MB-SMF receives the data arrival notification.

For example, the MB-UPF may send a user plane notification message, for example, an N4 message, to the MB-SMF, where the N4 message may carry the data arrival notification and the identification information of the multicast service. Optionally, the data arrival notification may be carried in the N4 message as an information element. The information element may be an indication, a notification, or a cause value, and the cause value may indicate that a cause for sending the N4 message is the data arrival notification. Alternatively, the data arrival notification may be sent by the MB-UPF to the MB-SMF as a dedicated message, where the message may be a dedicated N4 message.

It should be noted that either S907a or S907b may be performed. This is not limited.

S908. The MB-SMF sends second information to the first SMF. Correspondingly, the first SMF receives the second information.

The second information may indicate that the data of the multicast service is to be transmitted, the second information is MBS session start, and the second information may carry the identification information of the multicast service, identification information of the multicast group (for example, one or more of a TMGI, an identifier of the multicast service, a multicast address, a multicast IP address, an identifier of the multicast group, an identifier of the multicast session, context information of the multicast session, address information of the multicast service, the identification information of the PDU session associated with the multicast session, service data flow SDF identification information of the multicast service), and other information. This is not limited. The identification information of the multicast group may be the same as the identification information of the multicast service. This is not limited.

For example, the MB-SMF may send an N16 message to the first SMF, where the N16 message carries the second information. The N16 message may carry the identification information of the multicast service. The N16 message may carry, as an information element, a data arrival notification for the multicast service or a notification that the multicast session needs to be started. The data arrival notification or the notification that the multicast session needs to be started may be an indication, or the data arrival notification or the notification that the multicast session needs to be started may be a cause value, to indicate that a cause for sending the N16 message is the data arrival notification or the notification that the multicast session needs to be started. Optionally, the N16 message may alternatively be a dedicated N16 message, to specially indicate that the data of the multicast service arrives or the multicast session needs to be started.

For example, after receiving the control plane message or the user plane notification message, the MB-SMF determines, based on the identification information of the multicast service carried in the control plane message or the user plane notification message, the first SMF that joins the multicast service, and sends the second information to the determined first SMF.

Optionally, if the MB-SMF finds that the multicast session tunnel has been released when the multicast session is deactivated, the MB-SMF requests to establish the multicast session tunnel between the RAN and the MB-UPF. Optionally, the information for requesting to establish the multicast session tunnel between the RAN and the MB-UPF may be an indication, a request (request), or a notification. This is not limited. The information for requesting to establish the multicast session tunnel between the RAN and the MB-UPF may be carried in the second information.

S909. The first SMF determines, based on the identification information of the multicast service carried in the second information, that there is a PDU session associated with the multicast session, and sends N1N2 message transfer (Namf_Communication_N1N2Message Transfer) to the first AMF corresponding to the PDU session. Correspondingly, the first AMF receives the N1N2 message transfer.

For determining, by the first SMF, that there is a PDU session associated with the multicast session, refer to S501. Details are not described again.

The N1N2 message transfer may carry identification information of the UE, the identification information of the PDU session, an N1 container (including an SM message sent to the UE), the identification information of the multicast group, N2 SM information, and the like. The N2 SM information may include information related to the multicast service. The information related to the multicast service is for triggering the RAN to allocate an air interface resource to the multicast session, and re-add the UE to the multicast group corresponding to the multicast service. For example, the information related to the multicast service may include the identification information of the multicast service, and may further include a QFI of a multicast QoS flow, QoS parameter information corresponding to the QFI of the multicast QoS flow, information about a unicast QoS flow corresponding to the multicast QoS flow, and a request or an indication for establishing a multicast session tunnel. The information about the unicast QoS flow may include a QFI of the unicast QoS flow and QoS parameter information corresponding to the unicast QoS flow.

Further, if the UE is in a CM connected state (CM-CONNECTED), and if the associated PDU session is in a deactivated state, step 910 may be first performed, and then step 914 is performed; or step 914 may be first performed, and then step 910 is performed; or step 910 and step 914 are simultaneously performed. This is not limited. If the UE is in a CM idle state (CM-IDLE), steps 911 to 913 may be first performed to activate the associated PDU session, and then step 914 is performed; steps 911 to 913 may be first performed to return to a connected state (for example, the associated PDU session is not activated in this case), and then S914 is performed; or the associated PDU session is activated while performing step 914. This is not limited.

S910. If the UE is in the CM-CONNECTED state, the first SMF activates the PDU session associated with the multicast session (for example, continues to perform a service request procedure to activate the associated PDU session).

S911. After receiving the N1N2 message transfer (Namf_Communication_N1N2Message Transfer) in step S909, the first AMF triggers the first AMF to send a paging message to the RAN in a registration area of the first terminal. Correspondingly, the RAN receives the paging message.

The paging message may be for paging single UE. The paging message may include the identification information of the UE. Alternatively, the paging message may be a group paging message. The paging message may be for paging a plurality of UEs in a CM-IDLE state in the multicast group. The paging message may include the identification information of the multicast service or the identification information of the multicast group (for example, a TMGI of the multicast group). For example, if the N1N2 message transfer carries the identification information of the multicast group, the first AMF is triggered to send the paging message to the RAN in the registration area of the first terminal. If the N1N2 message transfer does not carry the identification information of the multicast group, the first AMF is triggered to send the paging message for the first terminal to the RAN in the registration area of the first terminal.

S912. The RAN sends a paging message to the UE based on the identification information of the UE or the identification information of the multicast group. Correspondingly, the UE receives the paging message sent by the RAN.

S913. The UE performs a service request procedure after receiving the paging message, to activate the PDU session associated with the multicast session.

For example, for a process of performing the service request procedure by the UE, refer to a conventional technology. Details are not described again.

S914. The first SMF interacts with an access network device (for example, the RAN) and another core network element (for example, the first AMF or the MB-SMF) to add the UE to the multicast group.

For example, the adding the UE to the multicast group may include: when a multicast service is transmitted or delivered by using the multicast session, the first SMF notifies, by using UE-related signaling, the RAN to allocate an air interface resource related to the multicast session to the UE, and the RAN adds the UE to the multicast group. Optionally, a base station may further interact with one or more of an AMF, an SMF, an MB-SMF, or an MB-UPF to establish a multicast session tunnel between the base station and the MB-UPF, and the like.

When the multicast service is transmitted or delivered by using the PDU session associated with the UE, the first SMF notifies the RAN and a first user plane function network element to allocate a resource to a QoS flow related to the multicast service corresponding to the multicast session, establish a tunnel between the first user plane function network element and a second user plane function network element, and so on.

Based on the method shown in FIG. 9A and FIG. 9B, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

With reference to the 5G system shown in FIG. 3a, the following uses an example in which the first terminal is UE, the access network device is a RAN, the first session management function network element is a first SMF/SMF, the second session management function network element is an MB-SMF, the first user plane function network element is a UPF, the second user plane function network element is an MB-UPF, and the access and mobility management function network element is an AMF, to describe in detail a process in which the first session management function network element receives the eighth information, marks, based on the eighth information, the status of the multicast session as deactivated, maps the data of the multicast service to the PDU session, and transmits the data of the multicast service by using the PDU session in the method shown in FIG. 8. It should be noted that, in this application, the UPF may be integrated with the MB-UPF. An integrated UPF may have both a function of the UPF in this application and a function of the MB-UPF. Alternatively, the UPF and the MB-UPF are independently deployed. This is not limited. In this application, the first SMF may be integrated with the MB-SMF. An integrated SMF may have both a function of the first SMF in this application and a function of the MB-SMF. Alternatively, the first SMF and the MB-SMF are independently deployed. This is not limited.

Figure 10A:
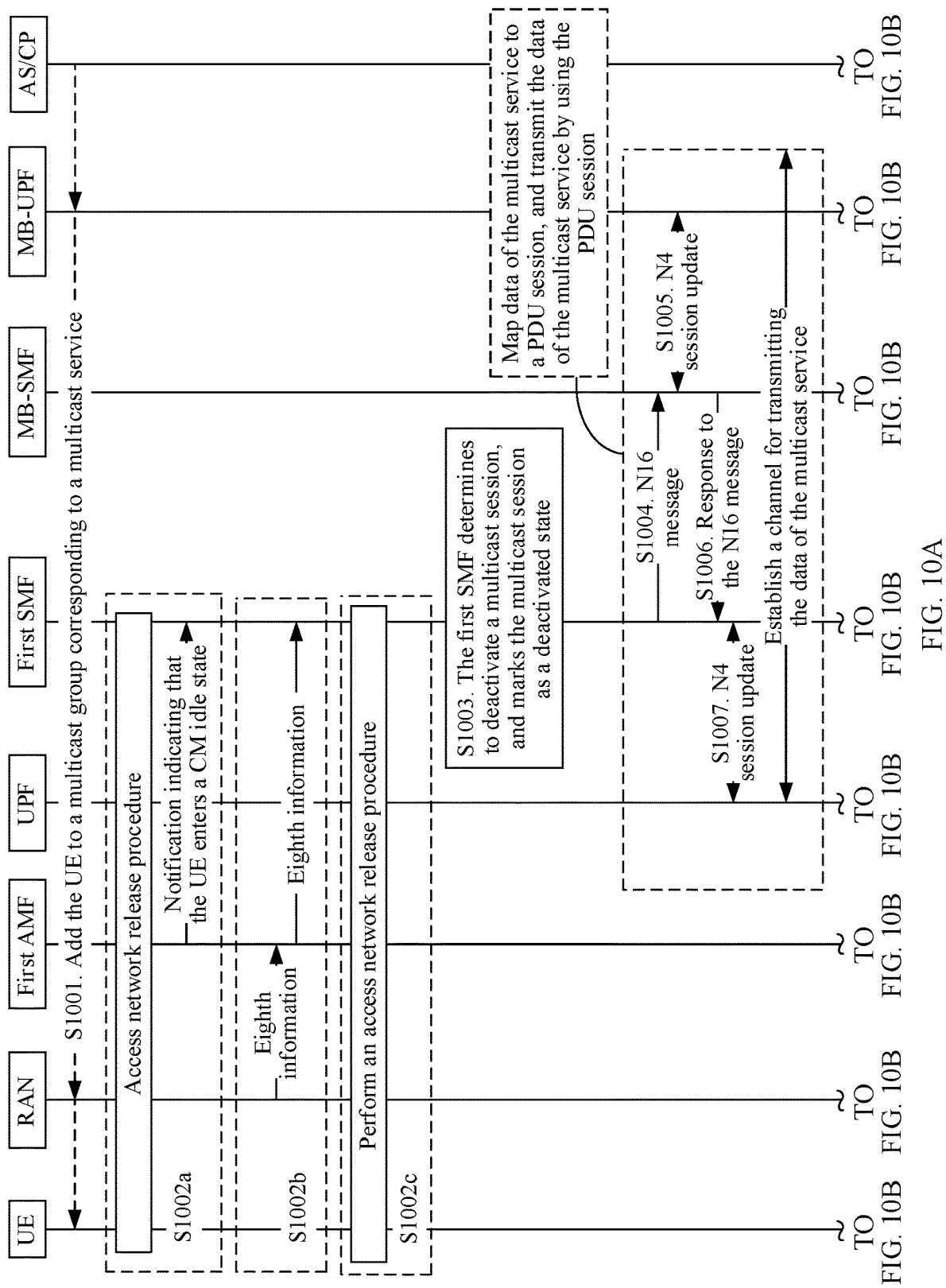
FIG. 10A and FIG. 10B are a flowchart of another communication method according to an embodiment of this application.
Figure 10B:
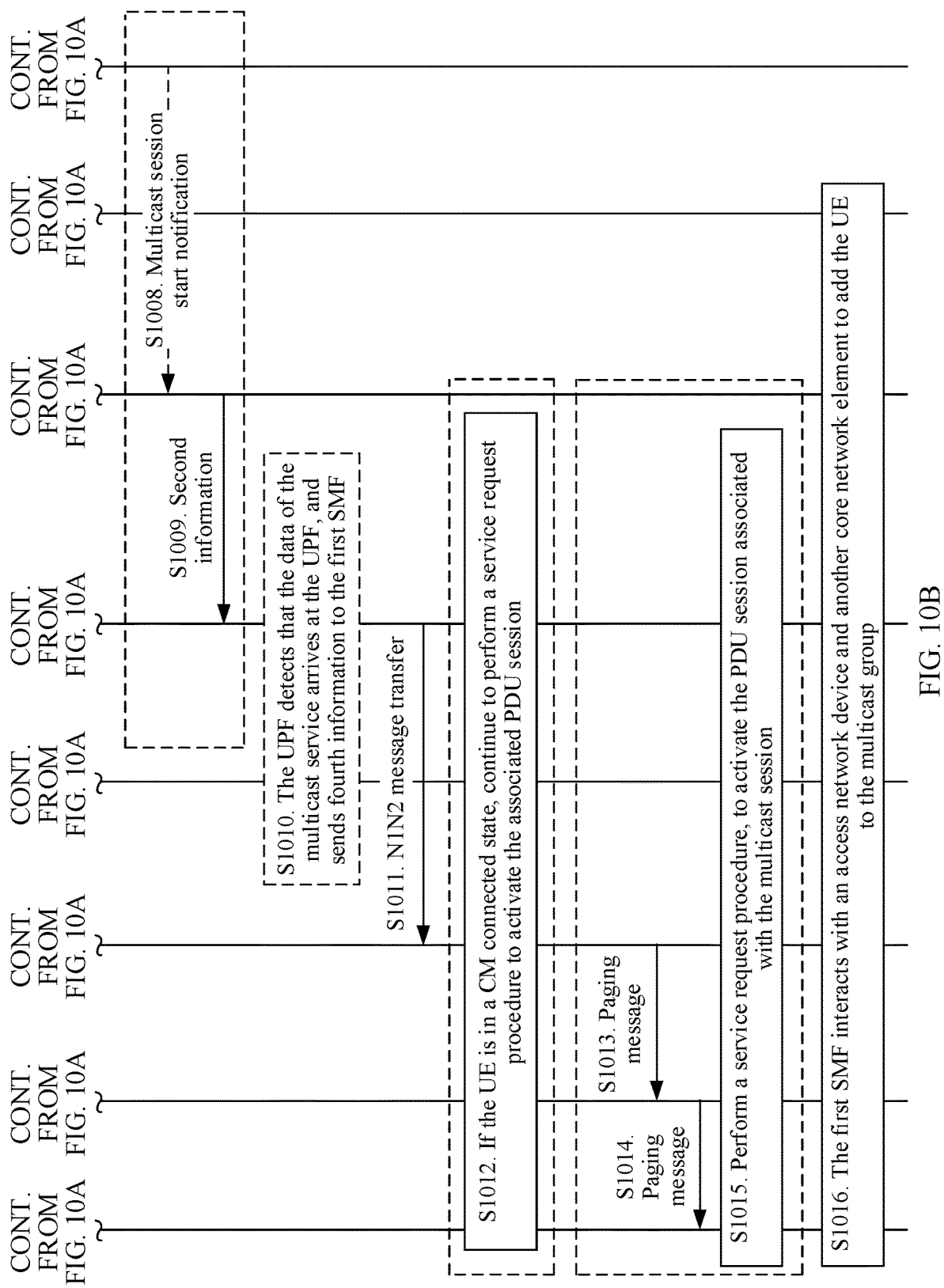

FIG. 10A and FIG. 10B are a flowchart of a communication method according to an embodiment of this application. As shown in FIG. 10A and FIG. 10B, the method may include the following steps.

S1001. Set up a multicast session corresponding to a multicast service, and add UE to a multicast group corresponding to the multicast service.

For S1001, refer to S901. Details are not described again.

S1002a. A RAN performs an AN release procedure. After the AN release procedure is performed, a first AMF determines that the UE enters a CM idle state, and the first AMF sends, to a first SMF, a notification that the UE enters the CM idle state. Correspondingly, the first SMF receives the notification that the UE enters the CM idle state.

For S1002a, refer to S902a. Details are not described again.

S1002b. The RAN determines to deactivate the multicast session, and sends eighth information to the first SMF through the first AMF. Correspondingly, the first SMF receives the eighth information.

For S1002b, refer to S902b. Details are not described again.

S1002c. The RAN performs the AN release procedure, and sends, to the first AMF, a UE context release complete message that carries the eighth information. The first AMF receives the UE context release complete message, and sends the eighth information to the first SMF based on the eighth information. Correspondingly, the first SMF receives the eighth information.

For S1002c, refer to S902c. Details are not described again.

S1003. The first SMF determines to deactivate the multicast session, and marks the multicast session as a deactivated state.

For S1003, refer to S903. Details are not described again.

Then, the first SMF maps data of the multicast service to a PDU session, and transmits the data of the multicast service by using the PDU session. The PDU session may be a PDU session associated with the multicast session, or may not be a PDU session associated with the multicast session. This is not limited. Specifically, for this process, refer to S1004 to S1007.

S1004. The first SMF sends an N16 message to an MB-SMF. Correspondingly, the MB-SMF receives the N16 message.

The N16 message may notify the MB-SMF to deactivate the multicast session. Optionally, the N16 message may include tunnel information of a UPF and a multicast session deactivation notification. Optionally, the multicast session deactivation notification may be included in the N16 message as an information element. For example, the information element may be an indication, or may be a cause value, to be specific, a cause for sending the N16 message is the multicast session deactivation notification. Alternatively, the multicast session deactivation notification may be used as separate signaling, for example, a dedicated N16 message, specially for notifying multicast session deactivation.

S1005. The MB-SMF and an MB-UPF perform N4 session update, to establish a channel that is between the MB-SMF and the UPF and that is for transmitting the data of the multicast service.

For example, the MB-SMF sends an N4 session update request to the MB-UPF. Optionally, the N4 session update request carries the tunnel information of the UPF in S1005. The MB-UPF receives the tunnel information of the UPF, establishes, with the UPF, a channel/tunnel for transmitting the data of the multicast service, and sends an N4 session update response to the MB-SMF.

S1006. The MB-SMF sends a response to the N16 message to the first SMF. Correspondingly, the first SMF receives the response to the N16 message.

S1007. The first SMF performs N4 session update with the UPF, and maps a multicast QoS flow of the multicast service to a PDU session tunnel of the PDU session for transmission in a unicast QoS flow manner.

For example, after receiving the response to the N16 message, the first SMF configures the UPF based on information about the multicast service and a mapping relationship between the multicast QoS flow included in the multicast service and a unicast QoS flow. Specifically, the first SMF sends, to the UPF, the information about the multicast service and a QFI of the unicast QoS flow to which the multicast QoS flow is mapped, to map the multicast QoS flow to the PDU session tunnel of the PDU session for transmission in a unicast QoS flow manner. The information about the multicast service may include identification information of the multicast service, and may further include a PDR and the like. For filtered multicast service data, the UPF maps the multicast service data to the PDU session based on a mapping relationship between a QFI of the multicast QoS flow and a QFI of the unicast QoS flow, for transmission in a unicast QoS flow manner.

Further, the first SMF may further send third information to the UPF, where the third information indicates to monitor the data of the multicast service from the MB-SMF, and send fourth information to the first SMF when the data of the multicast service from the MB-SMF arrives at the UPF, so that the first SMF determines, based on the fourth information, to activate the multicast session.

The third information may be sent to the UPF when the first SMF performs N4 session update with the UPF. For example, the third information is carried in a session update request and sent to the UPF. Alternatively, the third information may be sent to the UPF before or after the first SMF performs N4 session update with the UPF. This is not limited.

S1001 to S1007 are related procedures of deactivating the multicast session and mapping the data of the multicast service to the PDU session. Further, when the data of the multicast service is transmitted in a multicast manner again, to ensure transmission of the multicast service, the multicast session further needs to be activated. For a process of activating the multicast session, refer to the following content.

S1008. An AS/CP determines to start a multicast session, that is, to start to transmit the data of the multicast service, and sends a multicast session start notification (MBS Session start/Session start), multicast broadcast service session activation (MBS session activation), or multicast session activation to the MB-SMF directly or through an NEF. Correspondingly, the MB-SMF receives the multicast session start notification.

S1009. The MB-SMF sends second information to the first SMF, where the second information may include identification information or identification information of the multicast group. Correspondingly, the first SMF receives the second information.

S1010. If the UPF receives the third information sent by the first SMF, after detecting that the data of the multicast service arrives at the UPF, the UPF sends, to the first SMF, a data arrival notification for the multicast service or fourth information indicating that the data of the multicast service is detected. Correspondingly, the first SMF receives the fourth information.

It should be noted that, in FIG. 10A and FIG. 10B, S1008 and S1009 may be performed, or S1010 may be performed. This is not limited.

S1011. The first SMF determines, based on identification information of the multicast service carried in the second information or the fourth information, that there is a PDU session associated with the multicast session, and sends N1N2 message transfer (Namf_Communication_N1N2Message Transfer) to a first AMF corresponding to the PDU session, where the N1N2 message transfer may include the identification information of the multicast group. Correspondingly, the first AMF receives the N1N2 message transfer.

If the UE is in the CM connected state, and the PDU session is in the deactivated state, S1012 is performed and then S1016 is performed, S1016 is performed before S1012, or S1016 and S1012 are performed at the same time. This is not limited. For the UE in the CM idle state, S1013 to S1015 are first performed to activate the associated PDU session, and then S1016 is performed. Alternatively, S1013 to S1015 may be first performed to return to a connected state (for example, the associated PDU session is not activated in this case), and then S1016 is performed. Alternatively, activating the associated PDU session and adding the UE to the multicast group may be performed at the same time. This is not limited.

S1012. If the UE is in the CM-CONNECTED state, the first SMF continues to perform a service request procedure to activate the associated PDU session.

S1013. After the first AMF receives the N1N2 message transfer (Namf_Communication_N1N2Message Transfer), the first AMF is triggered to send a paging message to the RAN in a registration area of the UE. Correspondingly, the RAN receives the paging message.

Specifically, for step S1013, refer to S911. Details are not described again.

S1014. The RAN sends a paging message to the UE based on the identification information of the UE or the identification information of the multicast group. Correspondingly, the UE receives the paging message sent by the RAN.

S1015. The UE performs a service request procedure after receiving the paging message, to activate the PDU session associated with the multicast session.

S1016. The first SMF interacts with an access network device and another core network element to add the UE to the multicast group.

Specifically, for step S1016, refer to FIG. 5. Details are not described again.

Based on the method shown in FIG. 10A and FIG. 10B, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

With reference to the 5G system shown in FIG. 3a, the following uses an example in which the first terminal is UE, the access network device is a RAN, the first session management function network element is a first SMF/SMF, the second session management function network element is an MB-SMF, the first user plane function network element is a UPF, the second user plane function network element is an MB-UPF, and the access and mobility management function network element is an AMF, to describe in detail a process in which the first session management function network element receives the first information (MBS session stop/Session stop) from the second session management function network element, marks the status of the multicast session as the deactivated state based on the first information, and subsequently re-activates/restarts the multicast session after receiving the second information (MBS session start/Session start) in the method shown in FIG. 8. It should be noted that, in this application, the UPF may be integrated with the MB-UPF. An integrated UPF may have both a function of the UPF in this application and a function of the MB-UPF. Alternatively, the UPF and the MB-UPF are independently deployed. This is not limited. In this application, the first SMF may be integrated with the MB-SMF. An integrated SMF may have both a function of the SMF in this application and a function of the MB-SMF. Alternatively, the SMF and the MB-SMF are independently deployed. This is not limited.

In this embodiment of this application, the first information further includes multicast/broadcast service session deactivation (MBS session deactivation) or multicast session deactivation. Content indicated by multicast/broadcast service session stop, multicast/broadcast session stop, multicast/broadcast service session deactivation (MBS session deactivation), or multicast/broadcast session deactivation is the same, and the descriptions may be used interchangeably.

In this embodiment of this application, the second information may further include multicast/broadcast service session activation (MBS session activation) or multicast session activation. Content indicated by multicast/broadcast service session start, multicast/broadcast session start, multicast/broadcast service session deactivation (MBS session deactivation), or multicast/broadcast session deactivation is the same, and the descriptions may be used interchangeably.

Figure 11A:
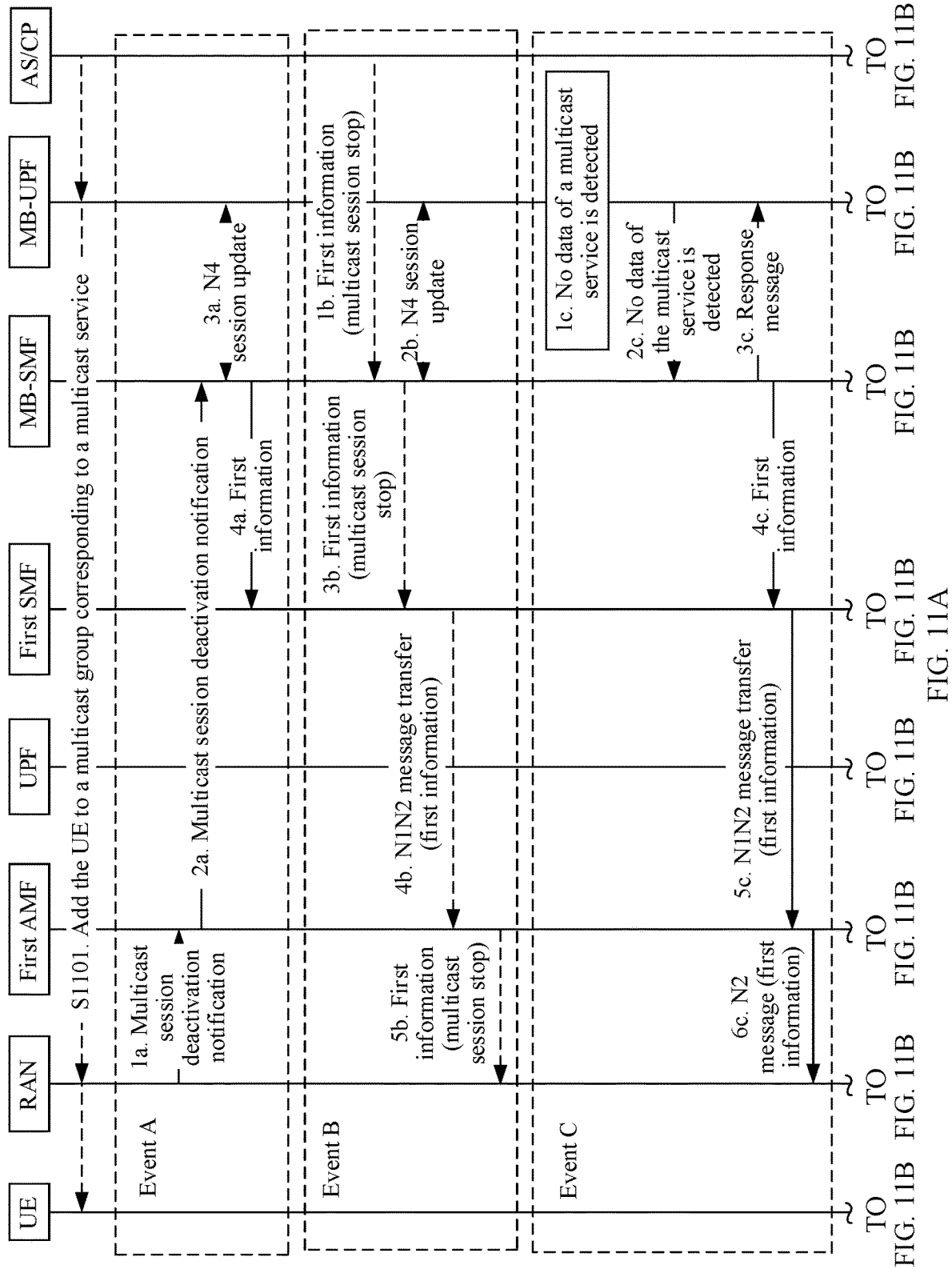
FIG. 11A and FIG. 11B are a flowchart of another communication method according to an embodiment of this application.
Figure 11B:
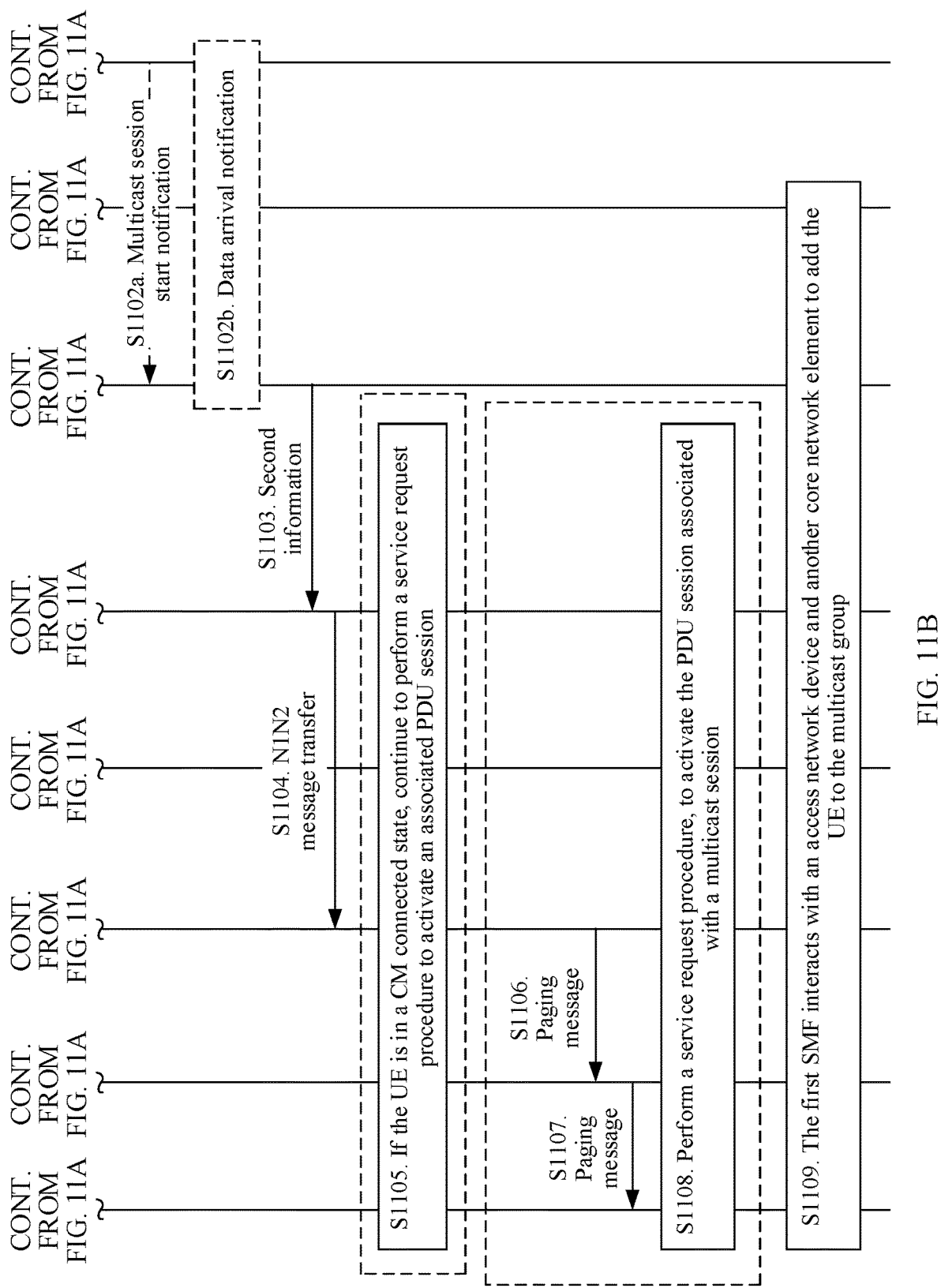

FIG. 11A and FIG. 11B are a flowchart of a communication method according to an embodiment of this application. As shown in FIG. 11A and FIG. 11B, the method may include the following steps.

S1101. Set up a multicast session corresponding to a multicast service, and add UE to a multicast group corresponding to the multicast service.

For S1101, refer to S901. Details are not described again.

Next, an event A, an event B, or an event C is performed. A first SMF receives first information from an MB-SMF, determines, based on the first information, to deactivate the multicast session, and marks the multicast session as a deactivated state.

The event A may include: 1a. A RAN determines to deactivate the multicast session, and sends eighth information for deactivating the multicast session to a first AMF (or a second AMF (not shown in FIG. 11A and FIG. 11B)). 2a. The first AMF (or the second AMF) receives a multicast session deactivation notification, and sends the multicast session deactivation notification to the MB-SMF. 3a. The MB-SMF receives the multicast session deactivation notification, and performs N4 session update with an MB-UPF. 4a. The MB-SMF sends the first information to the first SMF. Correspondingly, the first SMF receives the first information from the MB-SMF.

The second AMF may be an AMF corresponding to the multicast group.

For a process in which the RAN determines to deactivate the multicast session, refer to S902b in FIG. 9A and FIG. 9B. For a process in which the MB-SMF and the MB-UPF perform session update in the event A, refer to S905. Details are not described again.

As shown in FIG. 11A and FIG. 11B, the event B may include: 1b. An AS/CP sends first information (for example, multicast session stop (MBS session stop/Session stop)) to the MB-SMF directly or through a network exposure function (NEF), where the first information includes identification information of a multicast service corresponding to the multicast session that needs to be stopped (or deactivated).

2b. The MB-SMF receives the multicast session stop message, performs N4 session update with the MB-UPF, and notifies the MB-UPF to deactivate or stop the multicast session. Further, the MB-SMF may determine whether to release the multicast session tunnel. If the MB-SMF determines to release the multicast session tunnel, when performing the N4 session update with the MB-UPF, the MB-SMF notifies the MB-UPF to release the multicast session tunnel. The MB-SMF notifies/indicates the MB-UPF to buffer a notification/report of next-time arrival of multicast session data.

3b. After the MB-SMF receives the multicast session stop message, the MB-SMF determines the first SMF joining the multicast service, and sends the first information (for example, multicast session stop (MBS session stop/Session stop)) to the first SMF, where the first information may indicate multicast session stop (for example, MBS session stop) or directly indicate to deactivate the multicast session. Optionally, if the MB-SMF determines to release the multicast session tunnel, a message for releasing the multicast session tunnel is further included in the first information.

4b. The first SMF receives the first information sent by the MB-SMF, marks or sets (set as) a status of the multicast session as a deactivated state based on the first information, and determines, based on the identification information of the multicast service, whether there is a PDU session associated with the multicast session service. If there is a PDU session associated with the multicast session service, the first SMF sends N1N2 message transfer to the first AMF. The N1N2 message transfer may include identification information of the UE, a PDU session identifier, N2 SM information, and the like. The N2 SM information may include the first information (for example, multicast session stop (MBS session stop/Session stop)) described in 3b, to notify the RAN that the multicast session corresponding to the multicast service needs to be stopped (or deactivated).

5b. The first AMF sends an N2 message to the RAN, where the N2 message may carry the first information. After receiving the first information, the RAN releases an air interface resource allocated to the multicast session. Optionally, if the RAN further receives a release notification for releasing the multicast session tunnel, the RAN may further remove context information (for example, a multicast session context, a multicast group context, a multicast context, or a multicast service context) that corresponds to the multicast service and that is stored in the RAN, remove information related to the multicast tunnel, release the air interface resource corresponding to the multicast session, and the like.

It should be noted herein that after the multicast session is deactivated, the first SMF may deactivate the PDU session associated with the multicast session. Alternatively, in other words, when the first SMF is to deactivate the associated PDU session associated with the multicast session, if the first SMF finds that the PDU session is associated with the multicast session and the multicast session is in an active state, the first SMF does not deactivate the PDU session. On the contrary, when the multicast session is in the deactivated state or a release/deleted state, the PDU session may be deactivated.

It should be noted that a sequence of 2b and 3b to 5b is not limited. For example, 2b may be performed in parallel with 3b, 4b, or 5b. For another example, 2b, 3b, 4b, and 5b may be performed in sequence. For another example, 3b, 2b, 4b, and 5b may be performed in sequence. For another example, 3b, 4b, 2b, and 5b may be performed in sequence. This is not limited.

As shown in FIG. 11A and FIG. 11B, the event C may include: 1c. The MB-UPF does not detect the data of the multicast service for a long time. 2c. The MB-UPF sends a message indicating that no data of the multicast service is detected to the MB-SMF, where the message includes the identification information of the multicast service whose data is not detected.

3c. The MB-SMF receives a message indicating that no data of the multicast service is detected, and the MB-SMF sends a response message to the MB-UPF, to notify the MB-UPF to deactivate the multicast session, and buffer the data of the multicast service, or send a notification to the MB-SMF when the data of the multicast service arrives at the MB-UPF. Further, the MB-SMF may determine whether to release the multicast session tunnel, and if determining to release the multicast session tunnel, may further notify the MB-UPF to release the multicast session tunnel.

4c. After the MB-SMF receives the message indicating that no data of the multicast service is detected, the MB-SMF determines the first SMF that joins the multicast service, and sends the first information to the first SMF, where the first information may be a message indicating that no data of the multicast service is detected or directly indicate to deactivate the multicast session. Optionally, if the MB-SMF determines to release the multicast session tunnel, a message for releasing the multicast session tunnel is further included in eighth information.

5c. The first SMF receives the first information sent by the MB-SMF, marks a status of the multicast session as a deactivated state based on the first information, and determines, based on the identification information of the multicast service, whether there is a PDU session associated with the multicast session service. If there is a PDU session associated with the multicast session service, the first SMF sends N1N2 message transfer to the first AMF. The N1N2 message transfer may include identification information of the UE, a PDU session identifier, N2 SM information, and the like. The N2 SM information may include the first information in S3b, to notify the RAN that the multicast session corresponding to the multicast service needs to be stopped (or deactivated).

6c. The first AMF sends an N2 message to the RAN, where the N2 message may carry the first information. After receiving the first information, the RAN releases an air interface resource allocated to the multicast session. Optionally, if the RAN further receives a release notification for releasing the multicast session tunnel, the RAN may further remove a multicast session context that corresponds to the multicast service and that is stored in the RAN, release information related to the multicast session tunnel, and the like.

It should be noted that a sequence of 2c and 3c to 6c is not limited. For example, 2c may be performed in parallel with 3c, 4c, 5c, or 6c. For another example, 2c, 3c, 4c, 5c, and 6c may be performed in sequence. For another example, 3c, 2c, 4c, 5c, and 6c may be performed in sequence. For another example, 3c, 4c, 2c, 5c, and 6c may be performed in sequence. This is not limited.

The foregoing steps are a related procedure of deactivating the multicast session. Further, when the data of the multicast service is transmitted again, to ensure transmission of the multicast service, the multicast session further needs to be activated. For a process of activating the multicast session, refer to the following content.

S1102a. The AS/CP determines to start the multicast session to transmit the data of the multicast service, and sends a multicast session start notification (for example, MBS session start) to the MB-SMF through the NEF. Correspondingly, the MB-SMF receives the multicast session start notification. The multicast session start notification may alternatively be described as multicast broadcast service session activation (MBS session activation) or multicast session activation.

S1102b. The MB-UPF detects that the data of the multicast service arrives at the MB-UPF, and sends a data arrival notification for the multicast service to the MB-SMF. Correspondingly, the MB-SMF receives the data arrival notification.

It should be noted that, in FIG. 11A and FIG. 11B, either or both of S1102a and S1102b may be performed. This is not limited.

S1103. The MB-SMF sends second information to the first SMF corresponding to the PDU session associated with the multicast session, where the second information may include identification information of the multicast group. Correspondingly, the first SMF receives the second information.

S1104. The first SMF determines, based on the identification information of the multicast group carried in the second information, that there is a PDU session associated with the multicast session, and sends N1N2 message transfer (Namf_Communication_N1N2Message Transfer) to an AMF corresponding to the PDU session, where the N1N2 message transfer may include the identification information of the multicast group. Correspondingly, the AMF receives the N1N2 message transfer.

If the UE is in a CM connected state, and the PDU session is in the deactivated state, S1105 may be first performed, and then S1109 is performed, S1109 is first performed and then S1105 is performed, or S1105 and S1109 are simultaneously performed. This is not limited. For the UE in a CM idle state, steps 1106 to 1108 are first performed to activate the associated PDU session, and then step 1109 is performed; or steps 1106 to 1108 may be first performed to return to a connected state (for example, the associated PDU session is not activated in this case), and then S1109 is performed; or S1106 to S1108 and S1109 are simultaneously performed (that is, activating the associated PDU session and adding the UE to the multicast group are simultaneously performed). This is not limited.

S1105. If the UE is in the CM-CONNECTED state, the first SMF continues to perform a service request procedure to activate the associated PDU session.

S1106. After the first AMF receives the N1N2 message transfer (Namf_Communication_N1N2Message Transfer), the first AMF is triggered to send a paging message to the RAN in a registration area of the UE. Correspondingly, the RAN receives the paging message.

Specifically, for step S1106, refer to S911. Details are not described again.

S1107. The RAN sends a paging message to the UE based on the identification information of the UE or the identification information of the multicast group. Correspondingly, the UE receives the paging message sent by the RAN.

S1108. The UE performs a service request procedure after receiving the paging message, to activate the PDU session associated with the multicast session.

Specifically, for step S1107, refer to S913. Details are not described again.

S1109. The first SMF interacts with an access network device and another core network element to add the UE to the multicast group.

Specifically, for step S1109, refer to the description in the embodiment corresponding to FIG. 5. Details are not described again.

Based on the method shown in FIG. 11A and FIG. 11B, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

With reference to the 5G system shown in FIG. 3a, the following uses an example in which the first terminal is UE, the access network device is a RAN, the first session management function network element is a first SMF, the second session management function network element is an MB-SMF, the first user plane function network element is a UPF, the second user plane function network element is an MB-UPF, and the access and mobility management function network element is an AMF, to describe in detail a process in which the first session management function network element receives the first information from the second session management function network element, marks the status of the multicast session as the deactivated state based on the first information, maps the data of the multicast service to the PDU session, transmits the data of the multicast service in a unicast manner by using the PDU session, and re-activates/restarts the multicast session after receiving the second information (MBS session start) in the method shown in FIG. 8. In the following embodiment, the second information may alternatively be multicast/broadcast service session activation (MBS session activation) or multicast session activation.

Figure 12A:
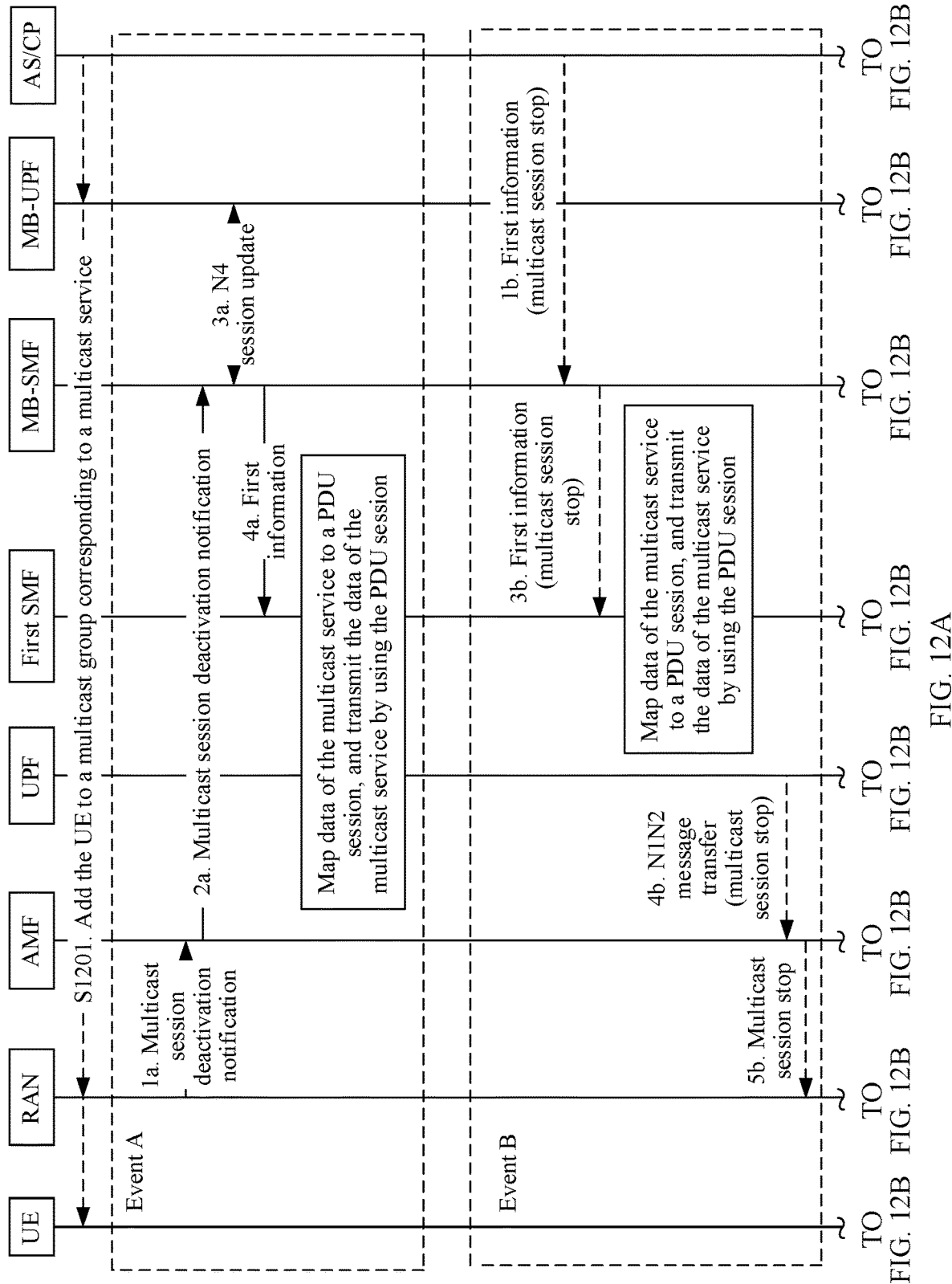
FIG. 12A to FIG. 12C are a flowchart of another communication method according to an embodiment of this application.
Figure 12B:
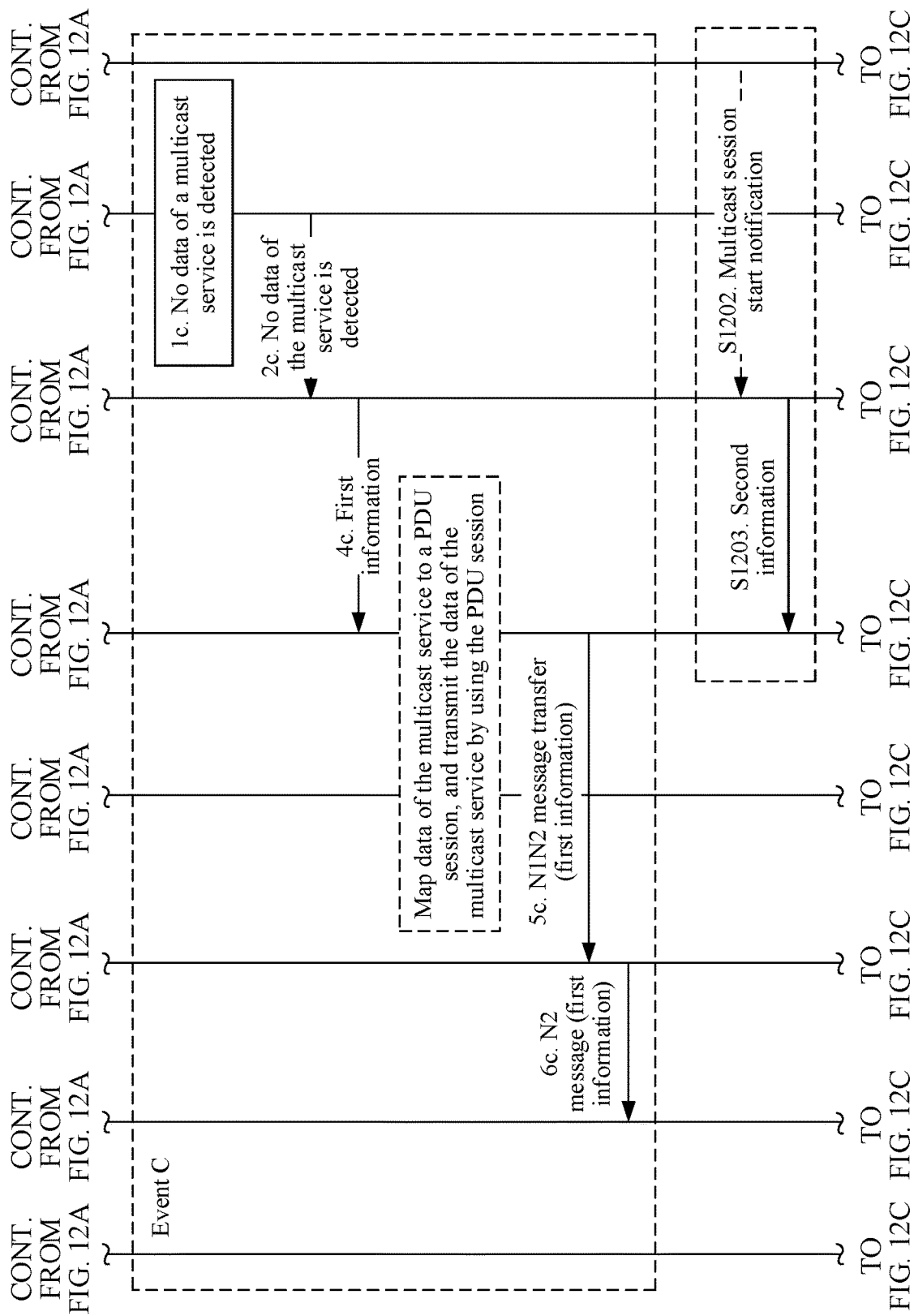
Figure 12C:
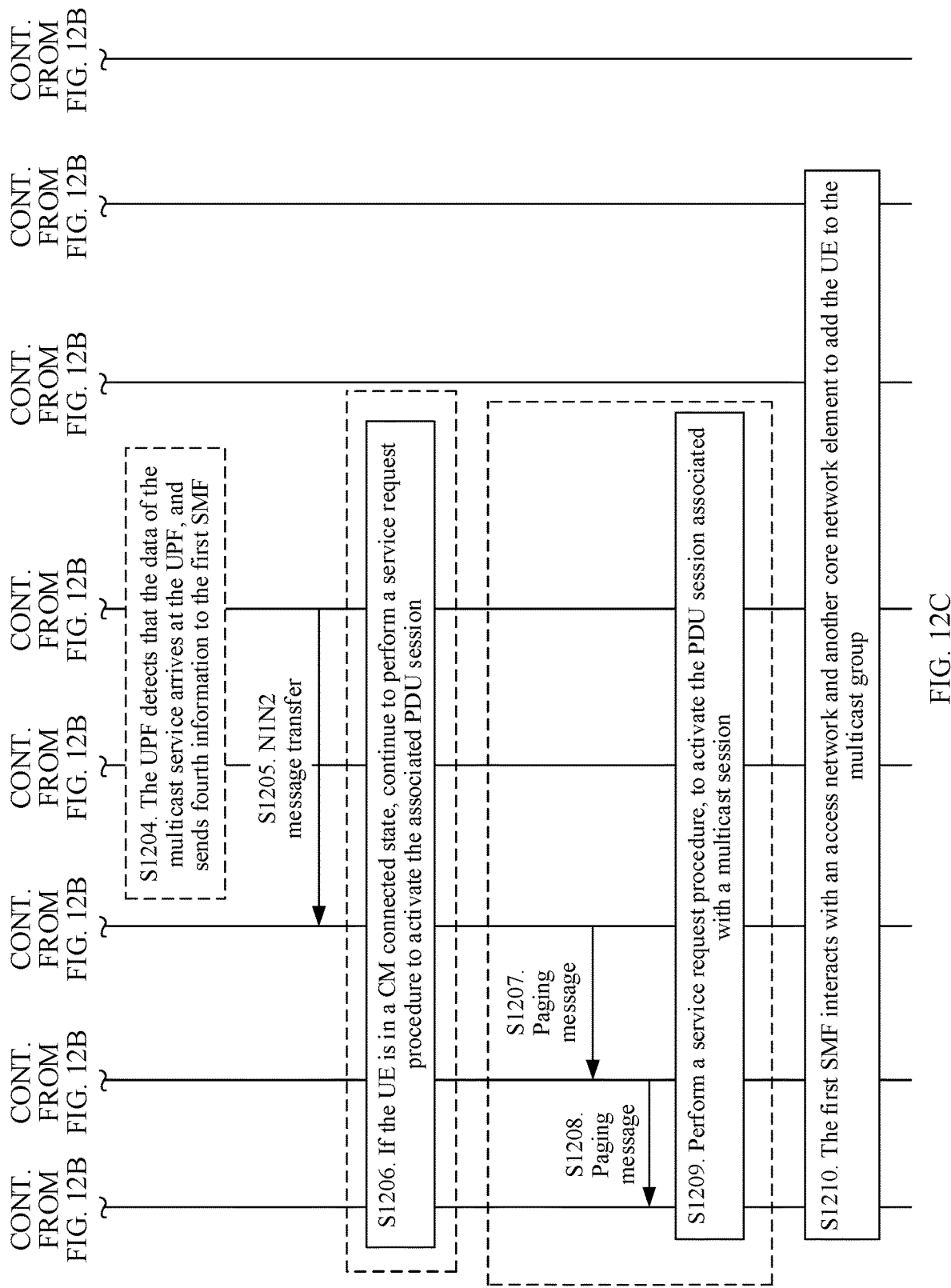

FIG. 12A to FIG. 12C are a flowchart of a communication method according to an embodiment of this application. As shown in FIG. 12A to FIG. 12C, the method may include the following steps.

S1201. Set up a multicast session corresponding to a multicast service, and add UE to a multicast group corresponding to the multicast service.

For S1201, refer to S901. Details are not described again.

Next, in a possible implementation, an event A is performed. A first SMF receives first information from an MB-SMF, determines, based on the first information, to deactivate the multicast session, and marks the multicast session as a deactivated state. In addition, after receiving the first information from the MB-SMF, the first SMF maps data of the multicast service to a PDU session, and transmits the data of the multicast service by using the PDU session. The PDU session may be a PDU session associated with the multicast session, or may not be a PDU session associated with the multicast session. This is not limited.

Specifically, for a related process of the event A, refer to steps 1a to 4a in FIG. 11A and FIG. 11B. For a process in which the first SMF maps the data of the multicast service to the PDU session, refer to S1004 to S1007 in FIG. 10A and FIG. 10B. Details are not described again.

In another possible design, as shown in FIG. 12A to FIG. 12C, steps 1b and 3b to 5b in the event B are performed. A first SMF receives first information from an MB-SMF, determines, based on the first information, to deactivate the multicast session, and marks the multicast session as a deactivated state. In addition, after step 3b and before step 4b, the first SMF maps data of the multicast service to a PDU session, and transmits the data of the multicast service by using the PDU session. The PDU session may be a PDU session associated with the multicast session, or may not be a PDU session associated with the multicast session. This is not limited.

Specifically, for a process in which the first SMF maps the data of the multicast service to the PDU session, refer to S1005 to S1008 in FIG. 10A and FIG. 10B. Details are not described again.

In still another possible implementation, as shown in FIG. 12A to FIG. 12C, steps 1c, 2c, and 4c to 6c in the event C are performed. A first SMF receives first information from an MB-SMF, determines, based on the first information, to deactivate the multicast session, and marks the multicast session as a deactivated state. In addition, after step 4c and before step 5c, the first SMF maps data of the multicast service to a PDU session, and transmits the data of the multicast service by using the PDU session. The PDU session may be a PDU session associated with the multicast session, or may not be a PDU session associated with the multicast session. This is not limited.

Specifically, for a process in which the first SMF maps the data of the multicast service to the PDU session, refer to S1004 to S1007 in FIG. 10A and FIG. 10B. Details are not described again.

Further, the first SMF may further send third information to a UPF, where the third information indicates to monitor the data of the multicast service from the MB-SMF, and send fourth information to the first SMF when the data of the multicast service from the MB-SMF arrives at the UPF, so that the first session management function network element activates the multicast session based on the fourth information.

The third information may be sent to the UPF when the first SMF performs N4 session update with the UPF, or may be sent to the UPF before or after the first SMF performs N4 session update with the UPF. This is not limited.

The foregoing steps are related procedures of deactivating the multicast session and mapping the data of the multicast service to the PDU session. Further, when the data of the multicast service is transmitted in a multicast manner again, to ensure multicast delivery of the multicast service, the multicast session further needs to be activated. For a process of activating the multicast session, refer to the following content.

S1202. An AS/CP determines to start the multicast session, that is, to start to transmit the data of the multicast service, and the AS/CP sends a multicast session start notification to the MB-SMF through an NEF or directly. Correspondingly, the MB-SMF receives the multicast session start notification.

S1203. The MB-SMF sends second information to the first SMF, where the second information may include identification information of the multicast group. Correspondingly, the first SMF receives the second information.

S1204. If the UPF receives the third information sent by the first SMF, after detecting that the data of the multicast service arrives at the UPF, the UPF sends, to the first SMF, a data arrival notification for the multicast service or fourth information indicating that the data of the multicast service is detected. Correspondingly, the first SMF receives the fourth information.

In the method shown in FIG. 12A to FIG. 12C, S1202 and S1203 may be performed, or S1204 may be performed. This is not limited.

S1205. The first SMF determines, based on identification information of the multicast service carried in the second information or the fourth information, that there is a PDU session associated with the multicast session, and sends N1N2 message transfer (Namf_Communication_N1N2Message Transfer) to an AMF corresponding to the PDU session, where the N1N2 message transfer may include the identification information of the multicast group. Correspondingly, the AMF receives the N1N2 message transfer.

If the UE is in a CM connected state, and the PDU session is in the deactivated state, S1206 is performed and then S1210 is performed, S1210 is first performed and then S1206 is performed, or S1210 and S1206 are performed at the same time. This is not limited. For the UE in a CM idle state, S1207 to S1209 are first performed to activate the associated PDU session, and then S1210 is performed. Alternatively, S1207 to S1209 may be first performed to return to a connected state (for example, the associated PDU session is not activated in this case), and then S1210 is performed. Alternatively, S1210 may be simultaneously performed when S1207 to S1209 are performed (that is, activating the associated PDU session and adding the UE to the multicast group are simultaneously performed). This is not limited.

S1206. If the UE is in the CM-CONNECTED state, the first SMF continues to perform a service request procedure to activate the associated PDU session.

S1207. A first AMF receives the N1N2 message transfer (Namf_Communication_N1N2Message Transfer), and the first AMF is triggered to send a paging message to a RAN in a registration area of the UE. Correspondingly, the RAN receives the paging message.

S1208. The RAN sends a paging message to the UE based on identification information of the UE or the identification information of the multicast group. Correspondingly, the UE receives the paging message sent by the RAN.

S1209. The UE performs a service request procedure after receiving the paging message, to activate the PDU session associated with the multicast session.

Specifically, for step S1209, refer to S913. Details are not described again.

S1210. The first SMF interacts with an access network device and another core network element to add the UE to the multicast group.

Specifically, for step S1210, refer to the description in the embodiment corresponding to FIG. 5. Details are not described again.

Based on the method shown in FIG. 12A to FIG. 12C, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

With reference to the 5G system shown in FIG. 3a, the following uses an example in which the first terminal is UE, the access network device is a RAN, the first session management function network element is a first SMF, the second session management function network element is an MB-SMF, the first user plane function network element is a UPF, the second user plane function network element is an MB-UPF, and the access and mobility management function network element is an AMF, to describe in detail a process in which the first session management function network element receives the first information from the second session management function network element, marks the status of the multicast session as the deactivated state based on the first information, deactivates the multicast session, and re-activates/restarts the multicast session after receiving the second information (MBS session start) in the method shown in FIG. 8. In the following embodiment, the second information may alternatively be multicast/broadcast service session activation (MBS session activation) or multicast session activation.

Figure 13A:
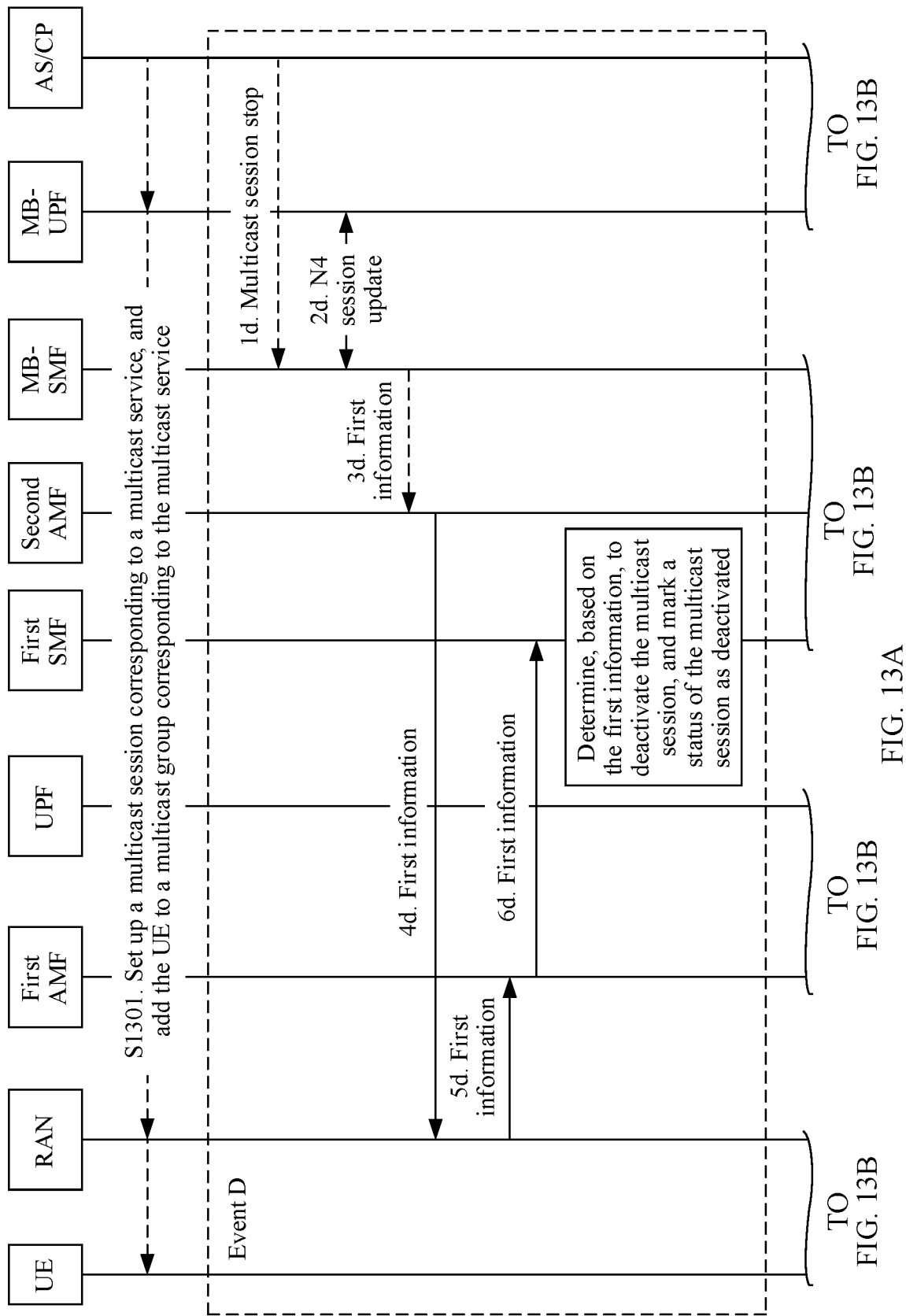
FIG. 13A to FIG. 13C are a flowchart of another communication method according to an embodiment of this application.
Figure 13B:
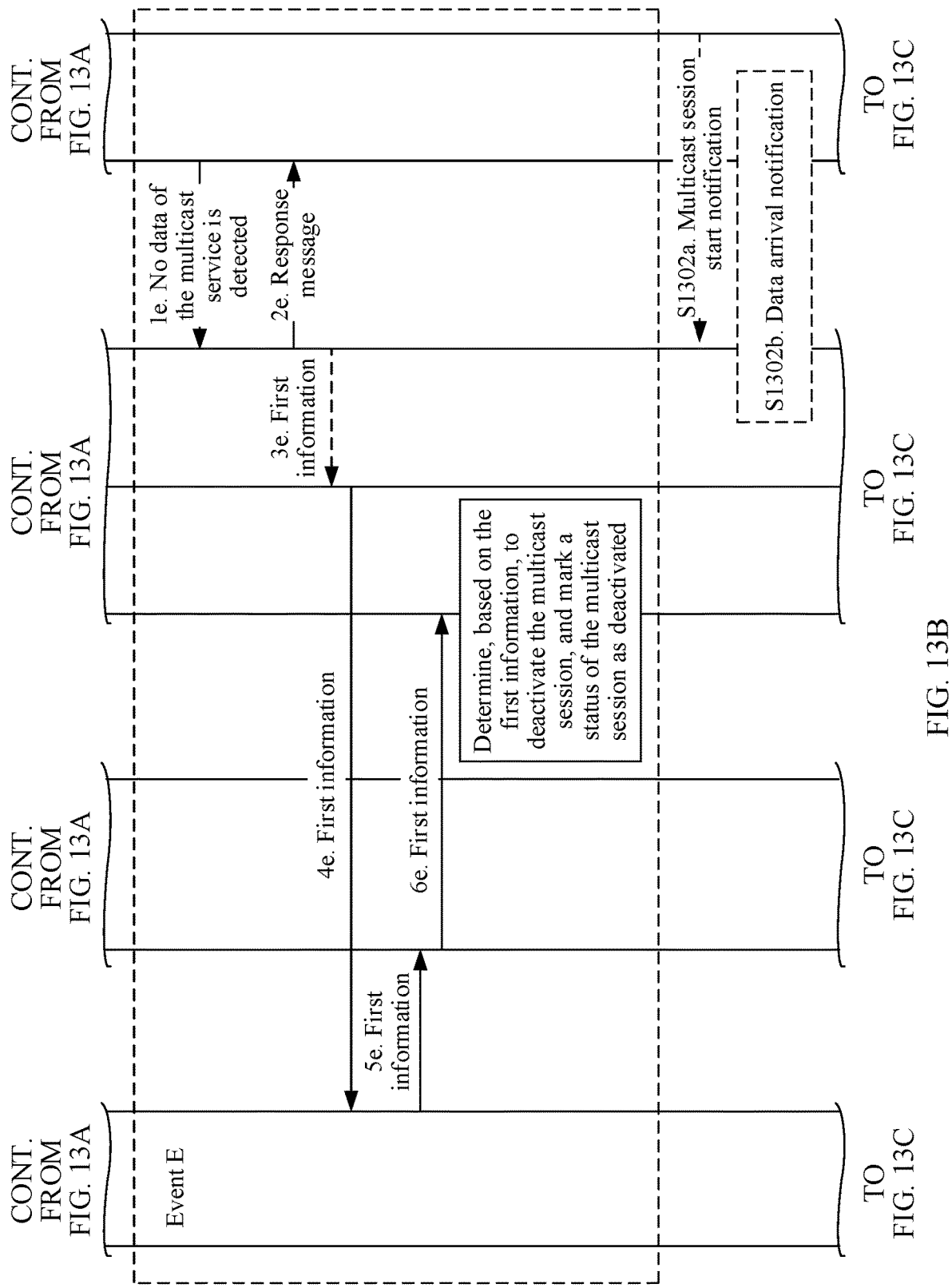
Figure 13C:
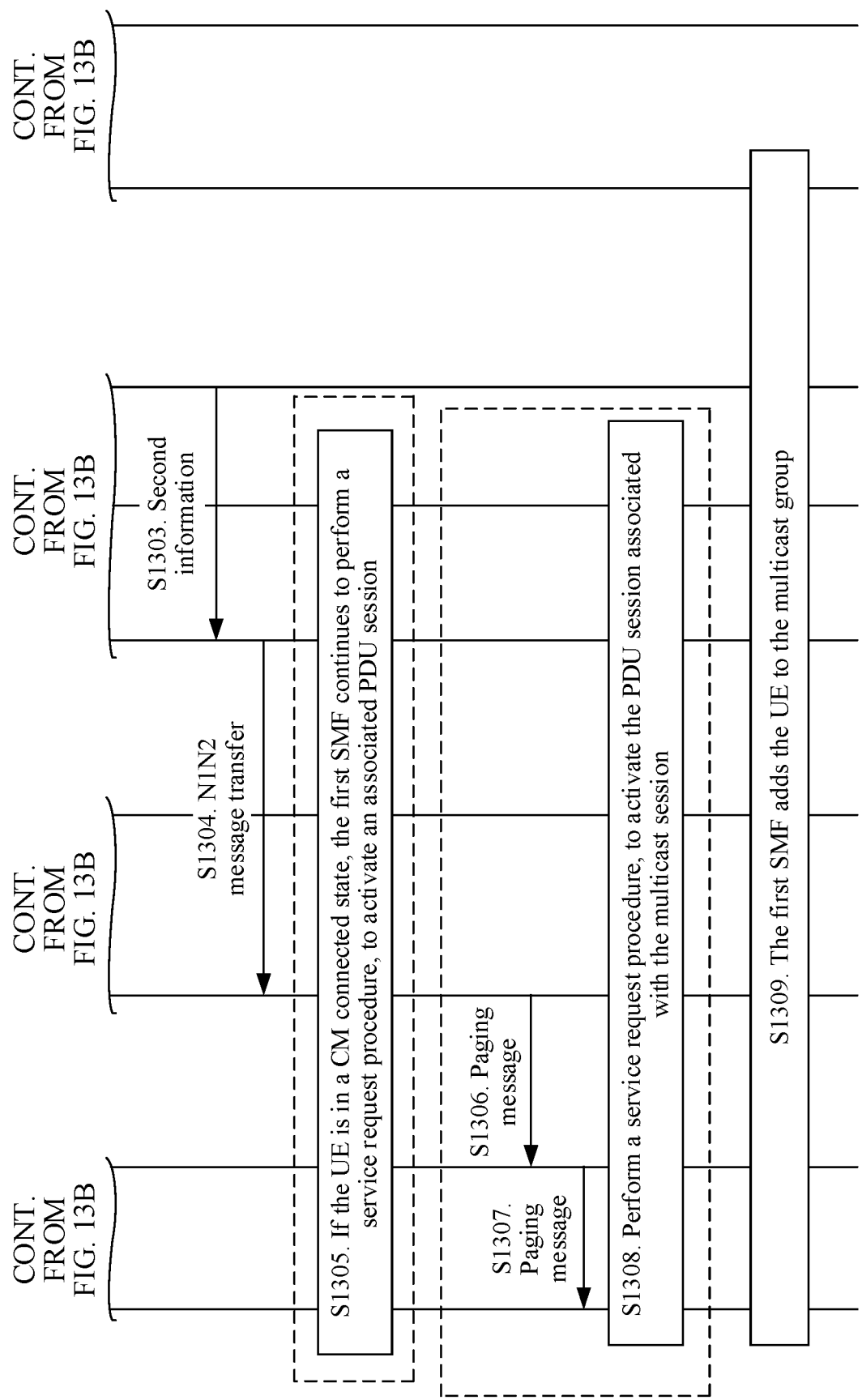

FIG. 13A to FIG. 13C are a flowchart of a communication method according to an embodiment of this application. As shown in FIG. 13A to FIG. 13C, the method may include the following steps.

S1301. Set up a multicast session corresponding to a multicast service, and add UE to a multicast group corresponding to the multicast service.

For S1301, refer to S901. Details are not described again.

Next, an event D or an event E is performed. A first SMF receives first information from an MB-SMF through a first AMF or a second AMF and a RAN, determines, based on the first information, to deactivate the multicast session, and marks the multicast session as a deactivated state.

As shown in FIG. 13A to FIG. 13C, the event D may include: 1d. An AS/CP sends a multicast session stop (MBS session stop) message to the MB-SMF, where the message includes identification information of the multicast service corresponding to the multicast session that needs to be stopped (or deactivated).

The multicast session stop may be alternatively described as multicast broadcast service session deactivation (MBS session deactivation) or multicast session deactivation.

2d. The MB-SMF receives the multicast session stop message. The MB-SMF performs N4 session update with an MB-UPF, indicates the MB-UPF to deactivate the multicast session or stop the multicast session, and indicate/notify the MB-UPF to report or notify arrival of next multicast session data. Further, the MB-SMF may determine whether to release a multicast session tunnel. If the MB-SMF determines to release the multicast session tunnel, when performing the N4 session update with the MB-UPF, the MB-SMF notifies the MB-UPF to release the multicast session tunnel.

3d. After receiving the multicast session stop message, the MB-SMF sends the first information to the second AMF, where the first information may carry the multicast session stop message and the identification information of the multicast service, to indicate to stop or deactivate the multicast session. If the MB-SMF determines to release the multicast session tunnel, the first information further indicates to release the multicast session tunnel.

4d. The second AMF receives the first information, and sends the first information to the RAN. For example, the first information is carried in an N2 message. After receiving the first information, the RAN releases an air interface resource allocated to the multicast session. Optionally, if the RAN further receives a release notification for releasing the multicast session tunnel, the RAN may further remove a multicast session context that corresponds to the multicast service and that is stored in the RAN, release information related to the multicast session tunnel, and the like.

5d. The RAN sends the first information to the first AMF.

6d. The first AMF receives the first information, and sends the first information to the first SMF. The first SMF receives the first information, determines, based on the first information, to deactivate the multicast session, and marks a status of the multicast session as deactivated.

It should be noted that a sequence of 2d and 3d to 6d is not limited. For example, 2d may be performed in parallel with 3d, 4d, 5d, or 6d. For another example, 2d, 3d, 4d, 5d, and 6d may be performed in sequence. For another example, 3d, 2d, 4d, 5d, and 6d may be performed in sequence. For another example, 3d, 4d, 2d, 5d, and 6d may be performed in sequence. This is not limited.

As shown in FIG. 13A to FIG. 13C, the event E may include: 1e. If an MB-UPF does not detect data of the multicast service for a long time, the MB-UPF sends, to the MB-SW, a message indicating that the data of the multicast service is not detected, where the message includes identification information of the multicast service whose data is not detected.

Alternatively, in step 1e, the AS/CP may send a multicast/broadcast session deactivation notification (for example, MBS session deactivation) to the MB-SMF, where the multicast/broadcast session deactivation notification may include the identification information (for example, one or more of an MBS session ID, a TMGI, or an IP multicast address) of the multicast service. It should be noted that the message that is sent by the MB-UPF to the MB-SMF and that indicates that no data of the multicast service is detected may be a PFCP session message or an N4 session message.

2e. The MB-SMF receives the message indicating that no data of the multicast service is detected or receives the multicast/broadcast session deactivation notification, and sends a response message to the MB-UPF, to notify the MB-UPF to deactivate the multicast session, buffer the data of the multicast service when the multicast service subsequently arrives again, or send a notification to the MB-SMF when the data of the multicast service arrives at the MB-UPF.

Further, the MB-SMF may determine whether to release a multicast session tunnel, and if determining to release the multicast session tunnel, may further notify the MB-UPF to release the multicast session tunnel. For example, the MB-SMF may send, to the MB-UPF, a release notification that carries identification information of a downlink tunnel. The identification information of the downlink tunnel may include information about a tunnel connected to the MB-UPF, for example, an access network tunnel identifier (AN tunnel info).

The response message sent by the MB-SMF to the MB-UPF may be a PFCP session message or an N4 session message.

3e. After receiving the message indicating that no data of the multicast service is detected or receiving the multicast/broadcast session deactivation notification sent by the AS/CP, the MB-SMF sends the first information to a second AMF, where the first information may be a multicast/ broadcast session deactivation notification (MBS Session Deactivation Notification) or MBS session deactivation, which carries the identification information of the multicast service.

Optionally, if the MB-SMF determines to release the multicast session tunnel (that is, an N3 tunnel or an N3mb tunnel between an access network device and the MB-UPF), the first information further indicates that the multicast session tunnel has been released.

Optionally, if the MB-SMF determines not to release the multicast session tunnel (that is, the N3 tunnel or the N3mb tunnel between the access network device and the MB-UPF), the first information further indicates that the multicast session tunnel has not been released/the multicast session tunnel is not released.

It should be noted that the second AMF may be an AMF that serves NAS signaling of the UE, or the second AMF may be an AMF that does not serve NAS signaling. For example, the AMF may be an AMF that specifically serves the multicast/broadcast service. The second AMF may alternatively be an AMF selected from a plurality of AMFs when the multicast session tunnel is established, and signaling may be transmitted to the MB-SMF that manages the multicast/broadcast service through the AMF. Alternatively, the second AMF may be another AMF. This is not limited herein.

4e. The second AMF receives the first information, and sends the first information to the RAN. For example, the first information may be an N2 message. After receiving the first information, the RAN releases an air interface resource corresponding to the multicast session, for example, releases a radio bearer for transmitting the data of the multicast/broadcast service, or removes/deletes a context corresponding to the multicast/broadcast service (for example, a multicast/broadcast service session context MBS session context).

Alternatively, if the RAN receives the notification indicating that the multicast session tunnel has not been released/the multicast session tunnel is not released, the RAN reserves the multicast broadcast service session context (MBS session context) corresponding to the multicast service in the RAN, and the like.

5e. The RAN sends the first information to the first AMF.

6e. The first AMF receives the first information, and sends the first information to the first SMF. The first SMF receives the first information, and marks a status of the multicast session as deactivated based on the first information.

The foregoing steps are a related procedure of deactivating the multicast session. Further, when the data of the multicast service is transmitted in a multicast manner again, to ensure transmission of the multicast service, the multicast session further needs to be activated. For a process of activating the multicast session, refer to the following content.

S1302a. The AS/CP determines to start the multicast session, that is, to start to transmit the data of the multicast service, and sends a multicast session start notification to the MB-SMF. Correspondingly, the MB-SMF receives the multicast session start notification.

S1302b. The MB-UPF detects that the data of the multicast service arrives at the MB-UPF, and sends a data arrival notification for the multicast service to the MB-SMF. Correspondingly, the MB-SMF receives the data arrival notification.

It should be noted that, either or both of S1302a and S1302b may be performed. This is not limited.

S1303. The MB-SMF sends second information to the first SMF, where the second information may include identification information of the multicast group. Correspondingly, the first SMF receives the second information.

S1304. The first SMF determines, based on the identification information of the multicast service carried in the second information, that there is a PDU session associated with the multicast session, and sends N1N2 message transfer (Namf_Communication_N1N2Message Transfer) to an AMF corresponding to the PDU session, where the N1N2 message transfer may include the identification information of the multicast group. Correspondingly, the AMF receives the N1N2 message transfer.

If the UE is in a CM connected state and the PDU session is in a deactivated state, S1305 is performed and then S1309 is performed, S1309 is first performed and then S1305 is performed, or activating the associated PDU session and adding the UE to the multicast group are performed at the same time. This is not limited. For the UE in a CM idle state, S1306 to S1308 are first performed to activate the associated PDU session, and then S1309 is performed. Alternatively, S1306 to S1308 may be first performed to return to a connected state (for example, the associated PDU session is not activated in this case), and then S1309 is performed. Alternatively, S1306 to S1308 and S1309 may be simultaneously performed. This is not limited.

S1305. If the UE is in the CM-CONNECTED state, the first SMF continues to perform a service request procedure to activate the associated PDU session.

S1306. The first AMF receives the N1N2 message transfer (Namf_Communication_N1N2Message Transfer), and the first AMF is triggered to send a paging message to a RAN in a registration area of the UE. Correspondingly, the RAN receives the paging message.

Specifically, for step S1306, refer to S911. Details are not described again.

S1307. The RAN sends a paging message to the UE based on identification information of the UE or the identification information of the multicast group. Correspondingly, the UE receives the paging message sent by the RAN.

S1308. The UE enters a CM-CONNECTED state, performs a service request procedure, to activate the PDU session associated with the multicast session.

Specifically, for step S1308, refer to S913. Details are not described again.

S1309. The first SMF adds the UE to the multicast group.

Specifically, for step S1309, refer to the description in the embodiment corresponding to FIG. 5. Details are not described again.

Based on the method shown in FIG. 13A to FIG. 13C, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

With reference to the 5G system shown in FIG. 3a, the following uses an example in which the first terminal is UE, the access network device is a RAN, the first session management function network element is a first SMF, the second session management function network element is an MB-SMF, the first user plane function network element is a UPF, the second user plane function network element is an MB-UPF, and the access and mobility management function network element is an AMF, to describe in detail a process in which the first session management function network element receives the first information from the second session management function network element, marks the status of the multicast session as the deactivated state based on the first information, maps the data of the multicast service to the PDU session, transmits the data of the multicast service in a unicast manner by using the PDU session, and re-activates/restarts the multicast session after receiving the second information in the method shown in FIG. 8.

The second information may be multicast/broadcast service session start (MBS session start), multicast/broadcast service session activation (MBS session activation), or multicast session activation.

Figures 2, 14A:
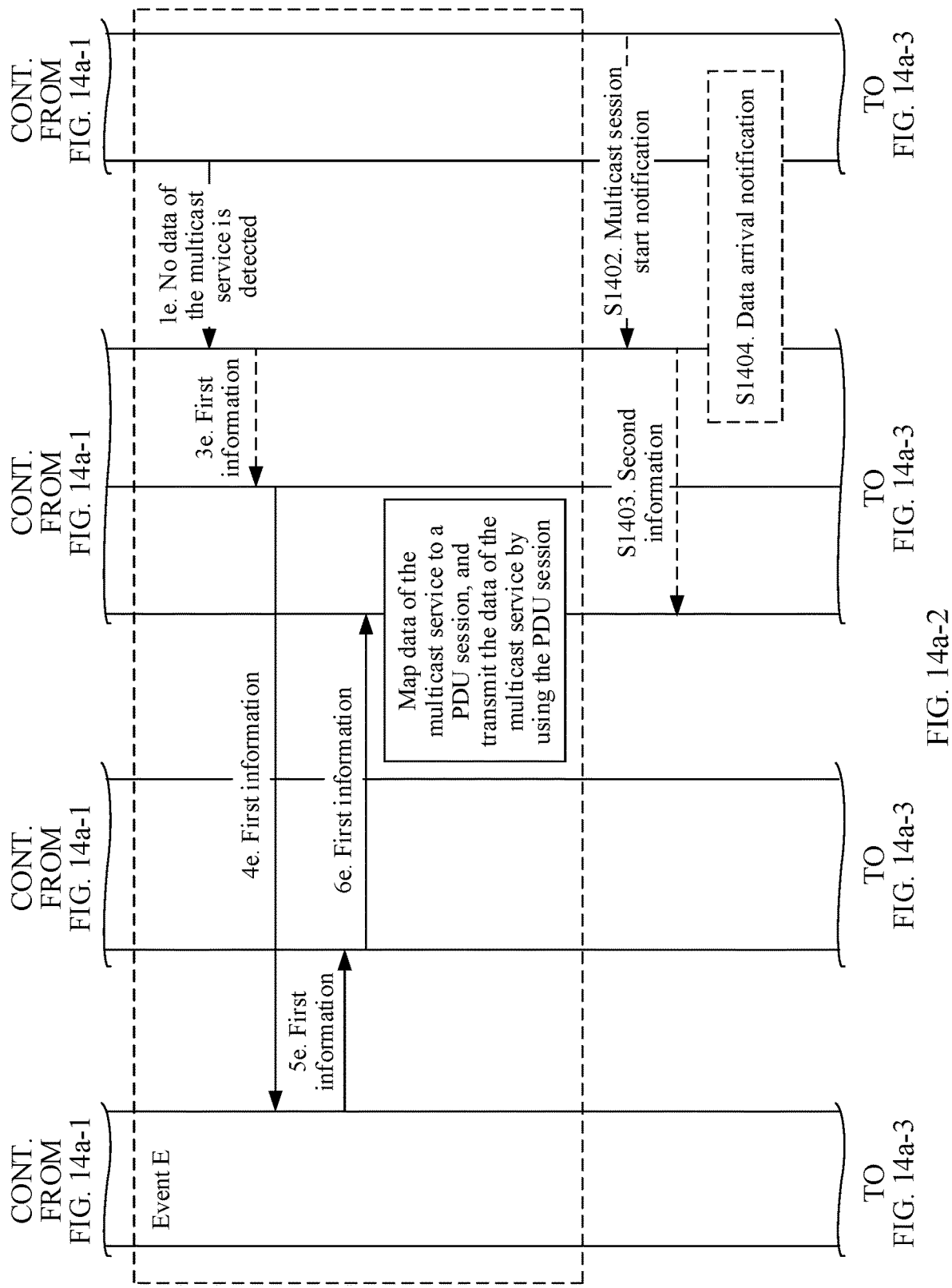
Figures 3, 14A:
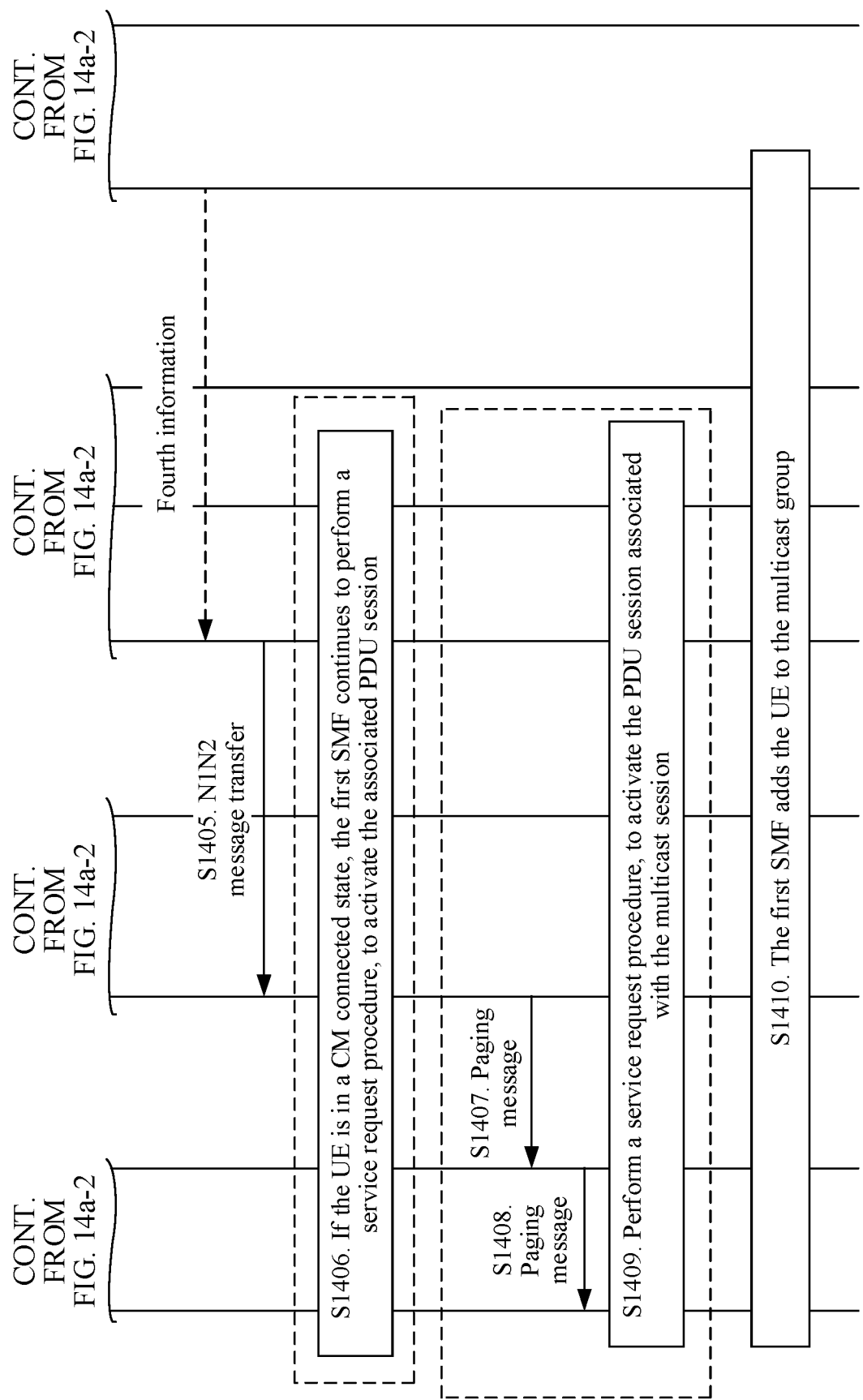

FIG. 14a-1 to FIG. 14a-3 are a flowchart of a communication method according to an embodiment of this application. As shown in FIG. 14a-1 to FIG. 14a-3, the method may include the following steps.

S1401. Set up a multicast session corresponding to a multicast service, and add UE to a multicast group corresponding to the multicast service.

For S1401, refer to S901. Details are not described again.

Next, in a possible implementation, steps 1d and 3d to 6d in the event D are performed. A first SMF receives first information from an MB-SMF through a first AMF and a RAN, determines, based on the first information, to deactivate the multicast session, and marks the multicast session as a deactivated state. In addition, after step 6d, the first SMF maps data of the multicast service to a PDU session, and transmits the data of the multicast service by using the PDU session. The PDU session may be a PDU session associated with the multicast session, or may not be a PDU session associated with the multicast session. This is not limited.

In another possible implementation, as shown in FIG. 14a-1 to FIG. 14a-3, steps 1e and 3e to 6e in the event E are performed. A first SMF receives first information from an MB-SMF through an AMF and a RAN, determines, based on the first information, to deactivate the multicast session, and marks the multicast session as a deactivated state. In addition, after step 6e, the first SMF maps data of the multicast service to a PDU session, and transmits the data of the multicast service by using the PDU session. The PDU session may be a PDU session associated with the multicast session, or may not be a PDU session associated with the multicast session. This is not limited.

Specifically, for a process in which the first SMF maps the data of the multicast service to the PDU session, refer to S1005 to S1008 in FIG. 10A and FIG. 10B. Details are not described again.

Further, the first SMF may further send third information to a UPF, where the third information indicates to monitor the data of the multicast service from the MB-SMF, and send fourth information to the first SMF when the data of the multicast service from the MB-SMF arrives at the UPF, so that the first session management function network element activates the multicast session based on the fourth information.

The third information may be sent to the UPF when the first SMF performs N4 session update with the UPF, or may be sent to the UPF before or after the first SMF performs N4 session update with the UPF. This is not limited.

The foregoing steps are related procedures of deactivating the multicast session and mapping the data of the multicast service to the PDU session. Further, when the data of the multicast service is transmitted in a multicast manner again, to ensure multicast delivery of the multicast service, the multicast session further needs to be activated. For a process of activating the multicast session, refer to the following content.

S1402. An AS/CP determines to start the multicast session, that is, to start to transmit the data of the multicast service, and sends a multicast session start notification to the MB-SMF. Correspondingly, the MB-SMF receives the multicast session start notification.

S1403. The MB-SMF sends second information to the first SMF, where the second information may include identification information of the multicast group. Correspondingly, the first SMF receives the second information.

S1404. The UPF detects that the data of the multicast service arrives at the UPF, and sends, to the first SMF, a data arrival notification for the multicast service or fourth information indicating that the data of the multicast service is detected. Correspondingly, the first SMF receives the fourth information from the UPF.

S1405. The first SMF determines, based on identification information of the multicast service carried in the second information or the fourth information, that there is a PDU session associated with the multicast session, and sends N1N2 message transfer (Namf_Communication_N1N2Message Transfer) to an AMF corresponding to the PDU session, where the N1N2 message transfer may include the identification information of the multicast group. Correspondingly, the AMF receives the N1N2 message transfer.

If the UE is in a CM connected state and the PDU session is in a deactivated state, S1406 is performed and then S1410 is performed, step 1410 is first performed and then step 1406 is performed, or step 1410 and step 1405 are simultaneously performed (activating the associated PDU session and adding the UE to the multicast group are simultaneously performed). This is not limited. For the UE in the CM idle state, S1407 to S1409 are first performed to activate the associated PDU session, and then step 1410 is performed. Alternatively, steps 1407 to 1409 may be first performed to return to a connected state (for example, the associated PDU session is not activated in this case), and then S1410 is performed. Alternatively, activating the associated PDU session and adding the UE to the multicast group may be performed at the same time. This is not limited.

S1406. If the UE is in the CM-CONNECTED state, the first SMF continues to perform a service request procedure to activate the associated PDU session.

S1407. The first AMF receives the N1N2 message transfer (Namf_Communication_N1N2Message Transfer), and the first AMF is triggered to send a paging message to a RAN in a registration area of the UE. Correspondingly, the RAN receives the paging message.

Specifically, for step S1406, refer to S911. Details are not described again.

S1408. The RAN sends a paging message to the UE based on identification information of the UE or the identification information of the multicast group. Correspondingly, the UE receives the paging message sent by the RAN.

S1409. The UE enters a CM-CONNECTED state, performs a service request procedure, to activate the PDU session associated with the multicast session.

Specifically, for step S1409, refer to S913. Details are not described again.

S1410. The first SMF adds the UE to the multicast group.

Specifically, for step S1410, refer to the description in the embodiment corresponding to FIG. 5. Details are not described again.

Based on the method shown in FIG. 14*a*-1 to FIG. 14*a*-3, the first SMF receives a multicast session deactivation message (or the first information (for example, multicast session stop)) from the MB-SMF, and marks the status of the multicast session as deactivated. After the first SMF receives the multicast session start/initiate or multicast session activation message from the MB-SMF, for the UE in the CM-CONNECTED state in the multicast group, if the associated PDU session is in the deactivated state, the first SMF activates the associated PDU session. It should be noted that, after the PDU session associated with the multicast session is activated, the first SMF may interact with the RAN and the another core network element to add the UE to the multicast group. Alternatively, the first SMF may first interact with the RAN and the another core network element to add the UE to the multicast group, and then activate the associated PDU session. Alternatively, the first SMF may interact with the RAN and the another core network element to add the UE to the multicast group and activate the associated PDU session at the same time. This is not limited. For the UE in the CM-IDLE state, a network side device may first perform group paging or paging for single UE. After receiving the paging message, the UE initiates the service request procedure to activate the PDU session associated with the multicast session. It should be noted that, after the PDU session associated with the multicast session is activated, the first SMF may interact with the RAN and the another core network element to add the UE to the multicast group; the first SMF may first interact with the RAN and the another core network element to add the UE to the multicast group, and then activate the associated PDU session; or the first SMF may interact with the RAN and the another core network element to add the UE to the multicast group and activate the associated PDU session at the same time. This is not limited.

A difference from the multicast session stop (or deactivation) procedure shown in step 1b to step 5b in FIG. 11A and FIG. 11B lies in:

The multicast session is released/deleted when a content provider starts/initiates multicast session release/delete (MBS session delete, MBS session release, session delete, or session release). During an execution process of releasing/deleting the multicast session or after the multicast session is released/deleted, information related to the multicast session is released/deleted on a terminal side and an access network side, and the information related to the multicast session is released/deleted in a first session management function network element and a second session management function network element.

Specifically, release/delete of the multicast session may be release/delete of information related to the multicast service (for example, QoS information related to the multicast service) in a terminal, release/delete of information related to the multicast service in the access network device (for example, release/delete of a context related to the multicast service (for example, a multicast/broadcast context, a multicast/broadcast session context, a multicast/broadcast group context, or a multicast/broadcast service context)), release/delete of tunnel information related to the multicast session, release/delete of an air interface resource related to the multicast session, release/delete of information related to the multicast service in a context of a terminal stored in the access network device, release/delete of a tunnel related to the multicast session, release/delete of the information related to the multicast service in the first session management function network element and/or the second session management function network element, and the like. The released/deleted multicast session cannot be restarted/re-initiated/re-activated by any one of the following procedures: a multicast session start/initiate (MBS session start or session start) procedure, a multicast broadcast service session activation (multicast broadcast service session activation, MBS session activation) procedure, and a multicast session activation procedure. The multicast session release/delete procedure may be applied to an activated multicast session or a deactivated multicast session.

The foregoing method embodiments describe the processes of activating/deactivating the multicast session and activating/deactivating the PDU session associated with the multicast session. Optionally, an embodiment of this application further provides a terminal paging solution. The terminal paging solution provided in this embodiment of this application may include: An access network device determines, based on data transmitted on a user plane, to page a terminal in a radio resource control inactive (RRC_inactive) state, or a core network device triggers an access network device to page a terminal, to be specific, trigger, by using control plane signaling, the access network device to page the terminal. Specifically, for the method, refer to the following FIG. 14*b* or FIG. 14*c*.

Figure 14B:
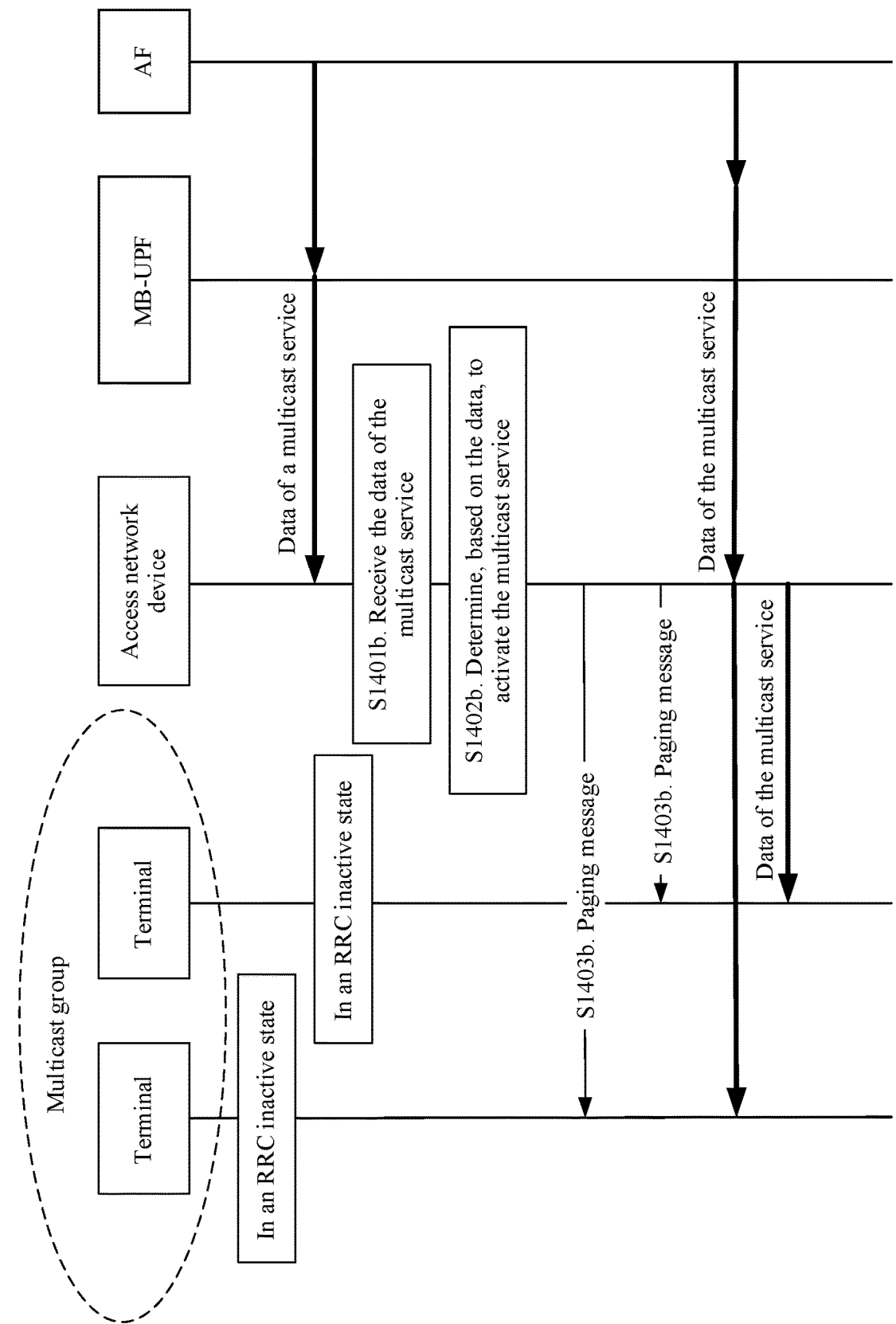
FIG. 14b is a flowchart of another communication method according to an embodiment of this application.

FIG. 14*b* is a flowchart of a multicast service communication method according to this application. As shown in FIG. 14*b*, the method may include the following steps.

S1401*b*. An access network device receives data of a multicast service.

The access network device may be the access network device in FIG. 2.

For example, the access network device may receive the data of the multicast service from an MB-UPF.

S1402*b*. The access network device determines, based on the data, to activate the multicast service.

For related descriptions of the multicast service, refer to the foregoing descriptions. Details are not described again.

It should be noted that activating the multicast service may be alternatively described as activating a multicast session corresponding to the multicast service, or activating a terminal in a multicast group corresponding to the multicast service, so that the terminal in the multicast group is in an RRC connected state, or the like.

That the access network device determines, based on the data, to activate the multicast service includes: The access network device determines that the received data corresponds to the multicast service, and the access network device determines that the multicast service is in a deactivated state, and determines to activate the multicast service. That the multicast service is in the deactivated state may include that there is a terminal in an RRC_inactive state in the multicast group corresponding to the multicast service, and the like.

For example, that the access network device determines that the received data corresponds to the multicast service may include: The access network device determines, based on information about a tunnel for data transmission and/or a correspondence between information about a tunnel and identification information of the multicast service, whether a tunnel for transmitting the data corresponds to the multicast service; and if determining that the tunnel for transmitting the data corresponds to the multicast service, determines that the received data corresponds to the multicast service; or otherwise, determines that the received data is not/does not correspond to the multicast service.

The identification information of the multicast service is for identifying the multicast service. For related descriptions of the identification information of the multicast service, refer to the foregoing descriptions. Details are not described again. In this embodiment of this application, when the data corresponds to the multicast service, the data may be referred to as multicast service data.

The information about the tunnel may be for identifying the tunnel. In this embodiment of this application, the tunnel that is between the access network device and the MB-UPF and that is for transmitting the data of the multicast service may be a tunnel (or referred to as a unicast tunnel) established in a unicast delivery manner, or may be a tunnel (or referred to as a multicast tunnel) established in a multicast delivery manner. The unicast delivery manner may mean that a downstream node (for example, the access network device) allocates tunnel information to an upstream node (for example, the MB-UPF) for the multicast service. In this way, the upstream node can know a downstream node to which the data of the multicast service is to be sent. The unicast delivery manner may also be referred to as a point-to-point transmission manner. The multicast delivery may mean that an upstream node (for example, the MB-UPF) allocates information about a public tunnel (or referred to as information about a multicast tunnel) to the data of the multicast service to one or more downstream nodes (for example, an access network device). In this way, the upstream node can send the data of the multicast service to the one or more downstream nodes based on the information about the public tunnel. All the downstream nodes can receive the data of the multicast service. The multicast delivery may also be referred to as a point-to-multipoint transmission manner.

In this embodiment of this application, tunnel information varies in different establishment manners. After the tunnel for transmitting the data of the multicast service is established between the access network device and the MB-UPF, a correspondence between the information about the tunnel for transmitting the data of the multicast service and the identification information of the multicast service may be stored in the access network device. The following describes, for different establishment manners, the process of determining that the data transmitted in the tunnel corresponds to the multicast service.

Case 1: The tunnel for transmitting the data of the multicast service is established in a unicast delivery manner.

Specifically, that the tunnel for transmitting the data of the multicast service is established between the MB-UPF and the access network device in a unicast delivery (unicast transport) manner, that is, the tunnel between the MB-UPF and the access network device is established in a point-to-point tunnel (point to point tunnel) manner may include:

The access network device sends the information about the tunnel to the MB-UPF through a core network device (for example, an SMF or an MB-SMF), for example, includes the information about the tunnel in configuration information corresponding to the multicast session and sends the configuration information to the MB-UPF. The MB-UPF receives the information about the tunnel, and correspondingly stores the correspondence between the information about the tunnel and the identification information of the multicast service, so that the MB-UPF sends the received data of the multicast service to the access network device based on the correspondence. Correspondingly, the access network device may also store the correspondence between the identification information of the multicast service and the information about the tunnel, so that the access network device learns, based on the correspondence, that the data received from the tunnel corresponding to the information about the tunnel is the data of the multicast service. In this way, establishment of the tunnel to the MB-UPF for transmitting the data of the multicast service is completed.

The tunnel may be referred to as a unidirectional general packet radio service (GPRS) tunneling protocol-user plane (GPRS tunneling protocol-user plane, GTP-U) tunnel (or a downlink tunnel). The information about the tunnel may include access network tunnel information (AN Tunnel Info) of the access network device or a tunnel endpoint identifier (TEID) of the access network device. The information about the tunnel may be for establishing a tunnel (for example, a GTP-U tunnel) that is between the access network device and the MB-UPF and that is for transmitting the data of the multicast service.

In the case 1, when the multicast session corresponding to the multicast service is activated, after the MB-UPF receives the data of the multicast service from an application server, the MB-UPF may learn, based on the correspondence between the identification information of the multicast service and the information about the tunnel, the information about the tunnel corresponding to the tunnel for transmitting the data of the multicast service, and send the data of the multicast service to the access network device through the tunnel based on the learned information about the tunnel. Correspondingly, the access network device receives the data from the tunnel, learns, based on the information about the tunnel corresponding to the tunnel and/or the correspondence between the identification information of the multicast service and the information about the tunnel, that the data transmitted in the tunnel is the data of the multicast service, and determines that the data corresponds to the multicast service.

For example, three tunnels are established between a base station and the MB-UPF: a tunnel 1, a tunnel 2, and a tunnel 3. If only the tunnel 1 is configured by default or in advance to transmit the data of the multicast service, the base station may directly determine, after receiving the data from the tunnel 1, that the data received from the tunnel 1 is the data of the multicast service. Alternatively, the base station pre-stores the following correspondences {tunnel 1, multicast service 1}, {tunnel 2, multicast service 2}, and {tunnel 3, multicast service 3}. After receiving data from the tunnel 1, the base station searches for the correspondence {tunnel 1, multicast service 1} by using tunnel information of the tunnel 1 as an index, and determines, based on the correspondence, that the received data of the multicast service is data of the multicast service 1.

Case 2: The tunnel for transmitting the data of the multicast service is established in a multicast delivery manner.

The tunnel that is established in the multicast delivery manner and that is for transmitting the data of the multicast service may be a multicast tree, and the multicast tree may correspond to/identify one or more multicast services. The information about the tunnel may be a multicast IP address, and the multicast IP address may include a common TED (Common-TEID, C-TEID), an IP address of the MB-UPF, or the like.

Specifically, that the information about the tunnel is a multicast IP address is used as an example. The establishing the tunnel between the MB-UPF and the access network device in the multicast delivery (multicast transport) manner may include: A multicast tree may be formed between the MB-UPF and one or more access network devices corresponding to the MB-UPF. The multicast tree may be for transmitting the data of the multicast service. The MB-UPF is a multicast source, and the one or more access network devices corresponding to the MB-UPF may serve as a receiving end of the multicast tree. The one or more access network devices include the access network device in S1b. The MB-SMF or the MB-UPF may allocate a multicast IP address to the multicast tree, and send the multicast IP address to the one or more access network devices. The one or more access network devices may receive the multicast IP address, and correspondingly store a correspondence between the multicast IP address and the identification information of the multicast service. In this way, the one or more access network devices join the multicast tree corresponding to the multicast IP address.

In the case 2, when the multicast session corresponding to the multicast service is activated, after the MB-UPF receives the data of the multicast service from an application server, the MB-UPF may encapsulate the multicast IP address and the data of the multicast service into a data packet, and send the data packet to the one or more access network devices by using the multicast tree. After receiving the data packet, the access network device may obtain the multicast IP address from the data packet, and determine, based on a correspondence between the multicast IP address and the identification information of the multicast service, that the received data corresponds to the multicast service, and is the data of the multicast service.

S1403b. The access network device sends a paging message to a terminal in an RRC_inactive state in the multicast group corresponding to the multicast service.

For example, that the access network device sends a paging message to a terminal in an RRC_inactive state in the multicast group corresponding to the multicast service may include: The access network device determines the terminal in the RRC inactive state in the multicast group corresponding to the multicast service, and sends the paging message to the terminal in the RRC_inactive state.

There may be one or more terminals in the RRC_inactive state. That the access network device determines the terminal in the RRC_inactive state in the multicast group corresponding to the multicast service may include: The access network device queries, by using the identification information of the multicast service as an index, a context of the terminal stored in the access network device, and finds the context of the terminal that stores the identification information of the multicast service. If the found context of the terminal includes an inactive radio network temporary identifier (I-RNTI), it is determined that the terminal is in the RRC-inactive state, and then the terminal in the RRC-inactive state is paged.

In this embodiment of this application, the paging message may be for paging the terminal in the RRC-inactive state.

In a possible design, the paging message may be a paging message for a single terminal, that is, a paging message at a granularity of per UE. One paging message is for paging only one terminal. In this case, the paging message may carry identification information of the terminal. For example, it is assumed that the terminal in the RRC_inactive state includes a first terminal and a second terminal. The access network device may send a first paging message in a radio access network-based notification area (RAN-based Notification Area, RNA) of the first terminal. The first paging message includes identification information of the first terminal. After the first terminal detects, on a paging channel, the paging message that carries the identification information of the first terminal, the first terminal may switch from the RRC_inactive state (switch to) to an RRC connected state. Similarly, the access network device may send a second paging message on an RNA of the second terminal, where the second paging message includes identification information of the second terminal. After the second terminal detects, on a paging channel, the paging message that carries the identification information of the second terminal, the second terminal may switch from the RRC_inactive state to (switch to) an RRC connected state.

In this embodiment of this application, an RNA of each terminal may be configured by the access network device, and pre-allocated to the terminal. The RNA of each terminal may include one or more cells, and the RNA of the terminal may include a signal coverage area of one or more access network devices. For example, an RNA of UE 1 may include signal coverage areas of base stations 1, 2, and 3.

In another possible design, the paging message may alternatively be a group paging message for a plurality of terminals, that is, a paging message at a granularity of a plurality of UEs. In this case, the paging message may be referred to as a group paging message, to reduce a quantity of times of sending the paging message and reduce signaling overheads. The group paging message may carry the identification information of the multicast service. If the terminal detects the identification information of the multicast service on a paging channel, the terminal may switch from the RRC_inactive state to (switch to) an RRC connected state. For example, it is assumed that the terminal in the RRC_inactive state includes a first terminal and a second terminal. The access network device may send a paging message in an RNA of the first terminal and an RNA of the second terminal, where the paging message includes the identification information of the multicast service.

Optionally, to reduce signaling overheads, that the access network device sends a paging message in an RNA of the first terminal and an RNA of the second terminal includes: In one paging cycle, the access network device sends the paging message once in an overlapping area between the RNA of the first terminal and the RNA of the second terminal. To be specific, if RNAs of different terminals overlap, the access network device sends a group paging message only once in an overlapping area. In this way, paging signaling overheads can be reduced.

The paging cycle may refer to a time interval for sending a paging message. The paging cycle may be set as required, and is not limited.

For example, an RNA is pre-allocated to each of UE 1 and UE 2 in the RRC-inactive state. For example, the RNA of the UE 1 includes signal coverage areas of base stations 1, 2, and 3, and the RNA of the UE 2 includes signal coverage areas of base stations 2, 3, and 4. It is assumed that a paging message is sent at a granularity of per UE. In this case, the base stations 1, 2, and 3 separately send, in the RNA of the UE 1, paging messages that carry identification information of the UE 1. There are three paging messages sent in total. The base stations 2, 3, and 4 send, in the RNA of the UE 2, three paging messages that carry identification information of the UE 2. If group paging is performed at a granularity of a plurality of UEs, and a paging message is sent once in an overlapping area. The signal coverage areas of the base stations 2 and 3 in the RNA of the UE 1 overlap the signal coverage areas of the base stations 2 and 3 in the RNA of the UE 2, and there is no overlapping area between the signal coverage area of base station 1 in the RNA of the UE 1 and the RNA of the UE 2, there is no overlapping area between the signal coverage area of the base station 4 in the RNA of the UE 2 and the RNA of the UE 1. In this case, in one paging cycle, paging messages carrying the identification information (for example, an MBS session ID) of the multicast service may be separately sent to the signal coverage area of the base station 1, the signal coverage areas of the base stations 2 and 3, and the signal coverage area of the base station 4, that is, only four paging messages need to be sent. Compared with paging at a granularity of per UE, two fewer paging messages are sent, and therefore paging signaling overheads are reduced.

Based on the method shown in FIG. 14b, when the access network device determines that data received from a user plane is the data of the multicast service, the access network device is triggered to page the terminal in the RRC_inactive state in the multicast group corresponding to the multicast service, to ensure that the terminal in the multicast group normally receives the data of the multicast service.

Figure 14C:
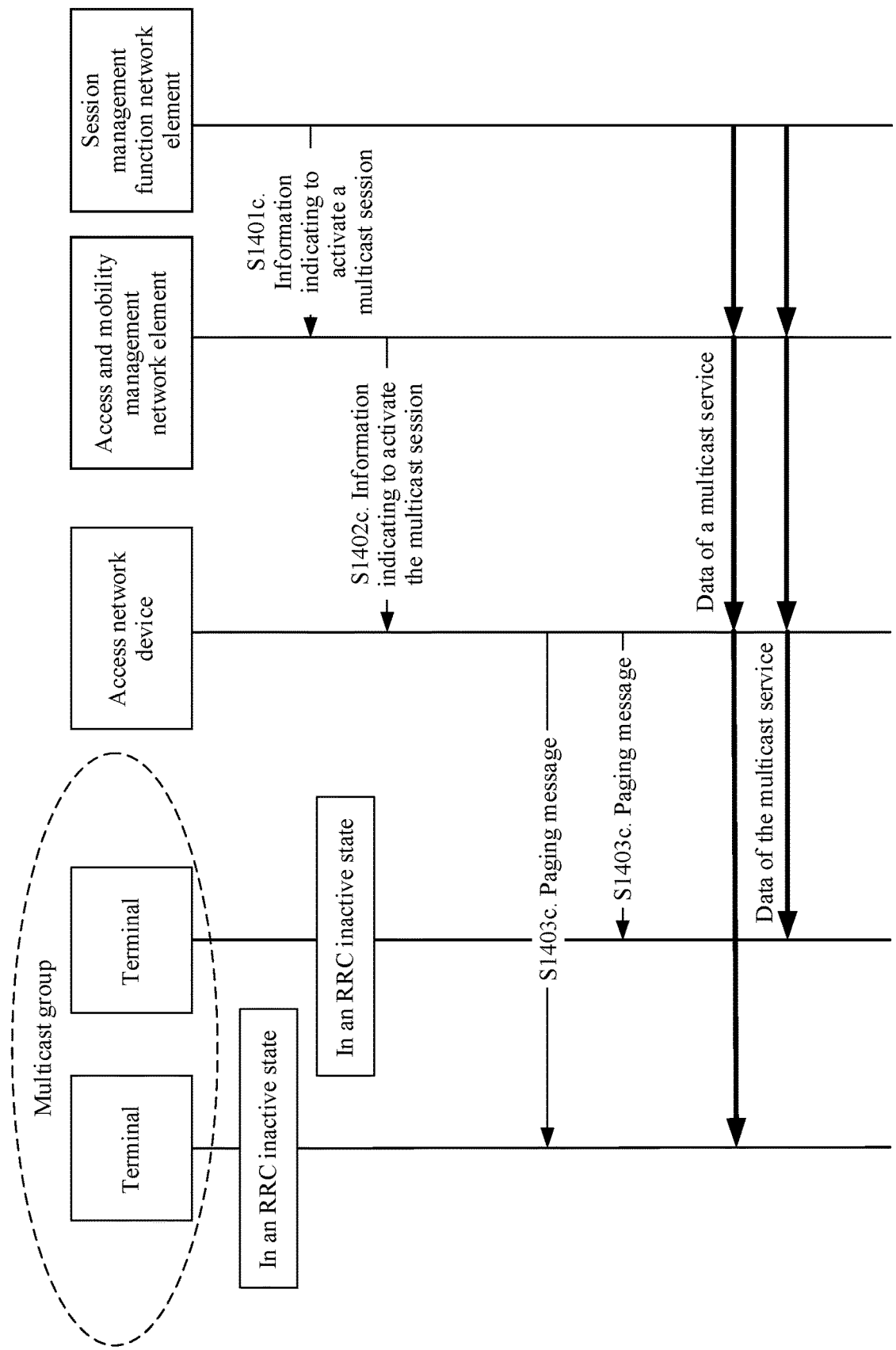
FIG. 14c is a flowchart of another communication method according to an embodiment of this application.

FIG. 14c shows a multicast service communication method according to this application. As shown in FIG. 14c, the method may include the following steps.

S1401c. A session management function network element determines to activate a multicast session corresponding to a multicast service, and sends, to an access and mobility management function network element, information indicating to activate the multicast session corresponding to the multicast service. Correspondingly, the access and mobility management function network element receives the information.

The session management function network element may be the MB-SMF described above, the information indicating to activate the multicast session may be the second information described above, and the information may carry identification information of the multicast service. Specifically, for a related description of the information, refer to the related description of the second information in S801. For determining to activate the multicast session by the session management function network element, refer to the method in the embodiment corresponding to FIG. 8. For the identification information of the multicast service, refer to the foregoing description. Details are not described again.

It should be noted that the access and mobility management function network element in S1401c may be the second access and mobility management function network element, or may be an AMF that can provide a NAS signaling service for any terminal in a multicast group corresponding to the multicast service. This is not limited in this application. For example, the session management function network element is an MB-SMF. The access and mobility management function network element may be selected by an NRF and indicated to the MB-SMF, that is, the access and mobility management function network element may be an AMF selected by the MB-SMF from the NRF. For example, the MB-SMF may send, to the NRF, a query request that carries the identification information of the multicast service. The query request requests to query an AMF that can provide a NAS signaling service for a terminal in the multicast group. After receiving the query request, the NRF selects the access and mobility management function network element from a plurality of AMFs based on the identification information of the multicast service, and indicates the access and mobility management function network element to the MB-SMF.

S1402c. The access and mobility management function network element sends, to an access network device, the information indicating to activate the multicast session corresponding to the multicast service. Correspondingly, the access network device receives the information.

The access and mobility management function network element may include the information in an N2 message and send the N2 message to the access network device.

S1403c. The access network device sends, based on the information indicating to activate the multicast session, a paging message to a terminal in an RRC inactive state in the multicast group corresponding to the multicast service.

For example, that the access network device sends, based on the information indicating to activate the multicast session corresponding to the multicast service, a paging message to a terminal in an RRC inactive state in the multicast group corresponding to the multicast service may include: The access network device determines, based on the information indicating to activate the multicast session corresponding to the multicast service, to activate the multicast session/activate the multicast service, and the access network device determines the terminal in the RRC inactive state in the multicast group corresponding to the multicast service, and sends the paging message to the terminal in the RRC inactive state.

For a process in which the access network device determines the terminal in the RRC_inactive state in the multicast group corresponding to the multicast service and sends the paging message to the terminal in the RRC_inactive state, refer to the description in S1403b. Details are not described again.

Based on the method shown in FIG. 14c, the access network device may learn, from a core network, of activating the multicast session corresponding to the multicast service, to trigger the access network device to page the terminal in the RRC_inactive state in the multicast group corresponding to the multicast service, to ensure that the terminal in the multicast group normally receives data of the multicast service.

The foregoing mainly describes the solutions provided in embodiments of this application from a perspective of interaction between nodes. It may be understood that, to implement the foregoing functions, the nodes such as the first session management function network element, the access network device, and the first terminal include corresponding hardware structures and/or software modules for performing the functions. A person of ordinary skill in the art should easily be aware that, in combination with algorithms and steps in the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the first session management function network element, the access network device, and the first terminal may be divided into functional modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 15:
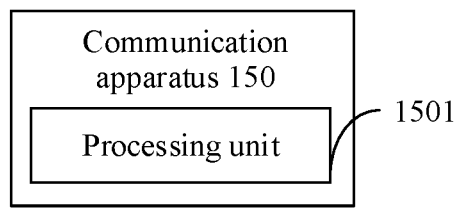
FIG. 15 is a schematic diagram of composition of a communication apparatus 150 according to an embodiment of this application.

FIG. 15 is a schematic composition diagram of a communication apparatus 150 according to an embodiment of this application. The communication apparatus 150 may be a first session management function network element, or a chip or a system-on-a-chip in the first session management function network element, or the communication apparatus may be an access network device, or a chip or a system-on-a-chip in the access network device. In a possible design, as shown in FIG. 15, the communication apparatus 150 may include a processing unit 1501.

The processing unit 1501 is configured to: determine whether a to-be-deactivated PDU session is associated with a multicast session corresponding to a multicast service; determine whether the multicast session is in an active state; and if the PDU session is associated with the multicast session, and the multicast session is in the active state, keep a status of the PDU session as an active state; or if the PDU session is associated with the multicast session, and the multicast session is in a deactivated state, deactivate the PDU session. For example, the processing unit 1501 may support the communication apparatus 150 in performing S501 to S504.

Specifically, in the possible design, all related content of the steps performed by the first session management function network element in the foregoing method embodiments in FIG. 5 and FIG. 7 may be cited in function descriptions of the corresponding function modules. Details are not described herein again. The communication apparatus 150 in the possible design is configured to perform the functions of the first session management function network element in the communication methods shown in FIG. 5 to FIG. 7. Therefore, an effect the same as that of the foregoing communication methods can be achieved.

It should be noted that, in another possible implementation, the communication apparatus 150 shown in FIG. 15 may include a processing module and a communication module. The processing module may integrate a function of the processing unit 1501. The processing module is configured to control and manage an action of the communication apparatus 150. For example, the processing module is configured to support the communication apparatus 150 in performing S501 to S504, and another process of the technology described in this specification. The communication module is configured to support the communication apparatus 150 in performing step 501, step 504, step 607, and the like, and communicating with another network entity. Further, the communication apparatus 150 shown in FIG. 15 may further include a storage module, configured to store program code and data of the communication apparatus 150.

The processing module may be a processor or a controller. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. The communication module may be a transceiver circuit, a communication interface, or the like. The storage module may be a memory. When the processing module is the processor, the communication module is the communication interface, and the storage module is the memory, the communication apparatus 150 shown in FIG. 15 may be the communication apparatus 400 shown in FIG. 4.

Figure 16:
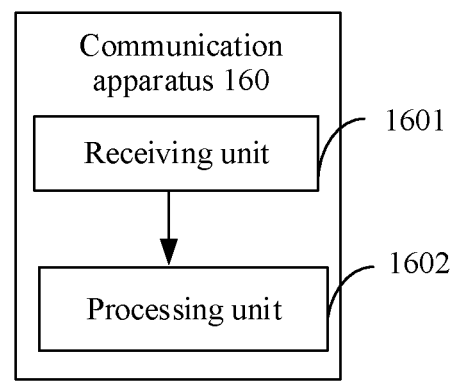
FIG. 16 is a schematic diagram of composition of a communication apparatus 160 according to an embodiment of this application.

FIG. 16 is a schematic composition diagram of a communication apparatus 160 according to an embodiment of this application. The communication apparatus 160 may be a first session management function network element, or a chip or a system-on-a-chip in the first session management function network element. As shown in FIG. 16, the communication apparatus 160 may include a receiving unit 1601 and a processing unit 1602.

The receiving unit 1601 is configured to receive, from a second session management function network element, second information indicating that a multicast session is to be activated. For example, the receiving unit 1601 may support the communication apparatus 160 in performing S802.

The processing unit 1602 is configured to notify an access network device to add a first terminal to a multicast group corresponding to the multicast session, where the first session management function network element corresponds to the first terminal, and the second session management function network element corresponds to the multicast group. For example, the processing unit 1602 may support the communication apparatus 160 in performing S802.

Specifically, in the possible design, all related content of the steps performed by the first session management function network element in the foregoing method embodiments in FIG. 8 to FIG. 14a-3 may be cited in function descriptions of the corresponding function modules. Details are not described herein again. The communication apparatus 160 in the possible design is configured to perform the functions of the first session management function network element in the communication methods shown in FIG. 8 to FIG. 14a-3. Therefore, an effect the same as that of the foregoing communication methods can be achieved.

It should be noted that, in another possible implementation, the communication apparatus 160 shown in FIG. 16 may include a processing module and a communication module. The communication module may integrate a function of the receiving unit 1601. The processing module may integrate a function of the processing unit 1602. The processing module is configured to control and manage an action of the communication apparatus 160. For example, the processing module is configured to support the communication apparatus 160 in performing S802, and another process of the technology described in this specification. The communication module is configured to support the communication apparatus 160 in communicating with another network entity. Further, the communication apparatus 160 shown in FIG. 16 may further include a storage module, configured to store program code and data of the communication apparatus 160. When the processing module is the processor, the communication module is the communication interface, and the storage module is the memory, the communication apparatus 160 shown in FIG. 16 may be the communication apparatus 400 shown in FIG. 4.

Figure 17:
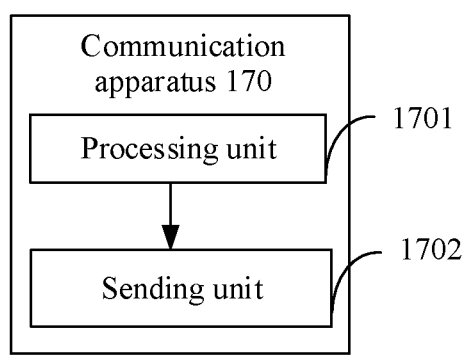
FIG. 17 is a schematic diagram of composition of a communication apparatus 170 according to an embodiment of this application.

FIG. 17 is a schematic composition diagram of a communication apparatus 170 according to an embodiment of this application. The communication apparatus 170 may be an access network device, or a chip or a system-on-a-chip in the access network device. As shown in FIG. 17, the communication apparatus 170 may include a processing unit 1701 and a sending unit 1702.

The processing unit 1701 is configured to determine to deactivate a multicast session corresponding to a multicast service. For example, the processing unit 1701 may support the communication apparatus 170 in performing S902b and S1102b.

The sending unit 1702 is configured to send eighth information to a first access and mobility management function network element or a second access and mobility management function network element, where the eighth information indicates to deactivate the multicast session, the first access and mobility management function network element corresponds to a terminal in a multicast group corresponding to the multicast service, and the second access and mobility management function network element corresponds to the multicast group corresponding to the multicast service. For example, the sending unit 1702 may support the communication apparatus 170 in performing S902b, S902c, S1102b, S1102c, and the like.

Specifically, in the possible design, All related content of the steps in the foregoing method embodiments in FIG. 9A and FIG. 9B and FIG. 11A and FIG. 11B may be cited in function descriptions of the corresponding function modules. Details are not described herein again. The communication apparatus 170 in the possible design is configured to perform the functions in the communication method shown in FIG. 9A and FIG. 9B and FIG. 11A and FIG. 11B. Therefore, an effect the same as that of the foregoing communication method can be achieved.

It should be noted that, in another possible implementation, the communication apparatus 170 shown in FIG. 17 may include a processing module and a communication module. The communication module may integrate a function of the sending unit 1702. The processing module may integrate a function of the processing unit 1701. The processing module is configured to control and manage an action of the communication apparatus 170. For example, the processing module is configured to support the communication apparatus 170 in performing S902b and S1102b, and another process of the technology described in this specification. The communication module is configured to support the communication apparatus 170 in performing S902b, S902c, S1102b, and S1102c in communicating with another network entity. Further, the communication apparatus 170 shown in FIG. 17 may further include a storage module, configured to store program code and data of the communication apparatus 170. When the processing module is the processor, the communication module is the communication interface, and the storage module is the memory, the communication apparatus 170 shown in FIG. 17 may be the communication apparatus 400 shown in FIG. 4.

Figure 18:
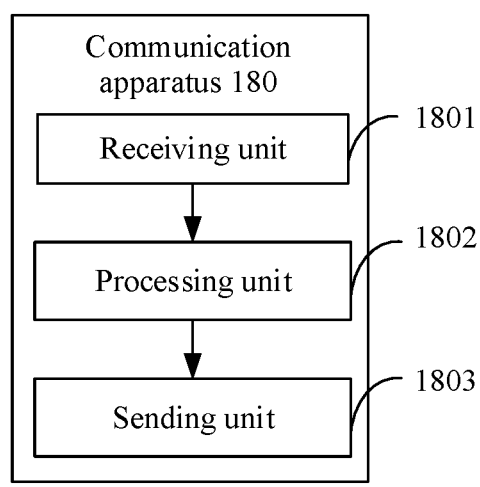
FIG. 18 is a schematic diagram of composition of a communication apparatus 180 according to an embodiment of this application.

FIG. 18 is a schematic composition diagram of a communication apparatus 180 according to an embodiment of this application. The communication apparatus 180 may be a first terminal, or a chip or a system-on-a-chip in the first terminal. As shown in FIG. 18, the communication apparatus 180 may include a receiving unit 1801, a processing unit 1802, and a sending unit 1803.

The receiving unit 1801 is configured to receive a paging message.

The processing unit 1802 is configured to determine that a PDU session associated with a multicast session is in a deactivated state.

The sending unit 1803 is configured to send a first message (for example, a service request) to an access network device, where the first message is for activating the PDU session associated with the multicast session.

Specifically, in the possible design, all related content of the steps performed by the first terminal in the foregoing method embodiments in FIG. 5 to FIG. 14a-3 may be cited in function descriptions of the corresponding function modules. Details are not described herein again. The communication apparatus 180 in the possible design is configured to perform the functions of the first terminal in the communication methods shown in FIG. 5 to FIG. 14a-3. Therefore, an effect the same as that of the foregoing communication methods can be achieved.

It should be noted that, in another possible implementation, the communication apparatus 180 shown in FIG. 18 may include a processing module and a communication module. The processing module may integrate a function of the processing unit 1802, and the communication module may integrate functions of the receiving unit 1801 and the sending unit 1803. The processing module is configured to support the communication apparatus 180 in controlling and managing an action of the communication apparatus 180, and the communication module is configured to support the communication apparatus 180 in communicating with another network entity. Further, the communication apparatus 180 shown in FIG. 18 may further include a storage module, configured to store program code and data of the communication apparatus 180. When the processing module is the processor, the communication module is the communication interface, and the storage module is the memory, the communication apparatus 180 shown in FIG. 18 is the communication apparatus 400 shown in FIG. 4.

Figure 19:
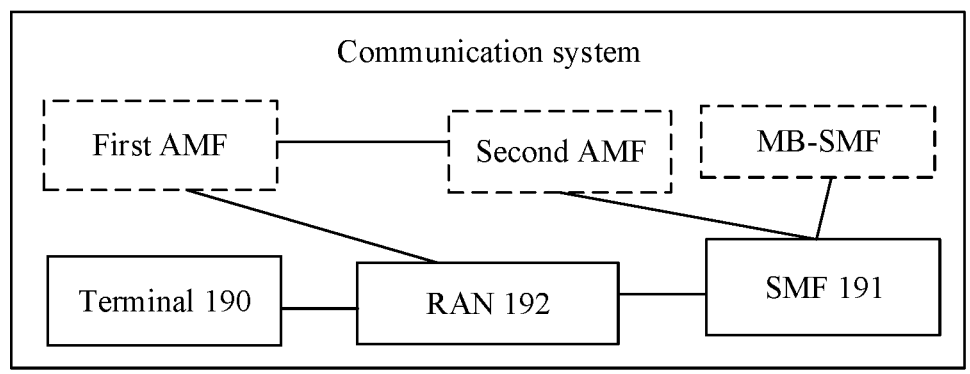
FIG. 19 is a schematic diagram of composition of a communication system according to an embodiment of this application.

FIG. 19 is a schematic diagram of composition of a communication system according to an embodiment of this application. As shown in FIG. 19, the communication system may include a terminal 190, an SMF 191, and a RAN 192. The system may further include a first AMF, a second AMF, and an MB-SMF. The SMF 191 corresponds to the terminal 190, and the MB-SMF corresponds to a multicast group.

A function of the terminal 190 is the same as a function of the communication apparatus 180, and a function of the SMF 191 is the same as a function of the communication apparatus 150 or the communication apparatus 160. A function of the RAN 192 is the same as a function of the communication apparatus 150 or the communication apparatus 170.

In an example, the SMF 191 or the RAN 192 is configured to: determine whether a to-be-deactivated protocol data unit PDU session is associated with a multicast session corresponding to a multicast service; determine whether the multicast session is in an active state; and if the PDU session is associated with the multicast session, and the multicast session is in the active state, keep a status of the PDU session as an active state; or if the PDU session is associated with the multicast session, and the multicast session is in a deactivated state, deactivate the PDU session.

In another example, the SMF 191 is configured to: receive second information indicating that a multicast session is to be activated from the MB-SMF, and notify the RAN 192 to add the first terminal to a multicast group corresponding to the multicast session.

In still another example, the RAN 192 is configured to: determine to deactivate a multicast session corresponding to a multicast service, and send, to the first AMF or the second AMF, eighth information indicating that the multicast session is to be deactivated, where the first AMF corresponds to a terminal in a multicast group corresponding to the multicast service, and the second AMF corresponds to the multicast group corresponding to the multicast service.

The terminal 190 is configured to: receive a paging message from the RAN 192, determine that a PDU session associated with a multicast session is in a deactivated state, and send a first message (for example, a service request) to the RAN 192, where the first message is for activating the PDU session associated with the multicast session.

Specifically, for an execution process of each network element in FIG. 19, refer to the execution steps of the corresponding network element in the foregoing methods in FIG. 5 to FIG. 14*a*-3. Details are not described herein.

Embodiments of this application further provide a computer-readable storage medium. All or some of the processes in the foregoing method embodiments may be implemented by a computer program instructing related hardware. The program may be stored in the computer-readable storage medium. When the program is executed, the processes of the foregoing method embodiments may be included. The computer-readable storage medium may be an internal storage unit of the terminal apparatus according to any one of the foregoing embodiments, for example, including a data transmitting end and/or a data receiving end. For example, the computer-readable storage medium may be a hard disk or a memory of the terminal apparatus. Alternatively, the computer-readable storage medium may be an external storage device of the terminal apparatus, for example, a plug-in hard disk, a smart media card (SMC), a secure digital (SD) card, or a flash card that is configured on the terminal apparatus. Further, the computer-readable storage medium may include both an internal storage unit and an external storage device of the terminal apparatus. The computer-readable storage medium is configured to store the computer program and other programs and data that are required by the terminal apparatus. The computer-readable storage medium may be further configured to temporarily store data that has been output or is to be output.

Embodiments of this application further provide computer instructions. All or some of the procedures in the foregoing method embodiments may be implemented by the computer instructions instructing related hardware (such as a computer, a processor, a network device, and a terminal). A program may be stored in the foregoing computer-readable storage medium.

It should be understood that in embodiments of this application, "B corresponding to A" indicates that B is associated with A. For example, B may be determined based on A. It should be further understood that determining B based on A does not mean that B is determined based only on A. B may alternatively be determined based on A and/or other information. In addition, in embodiments of this application, "connection" means various connection manners such as a direct connection or an indirect connection, for implementing communication between devices. This is not limited in embodiments of this application.

In embodiments of this application, unless otherwise specified, "transmission" (transmit/transmission) refers to bidirectional transmission, and includes a sending action and/or a receiving action. Specifically, "transmission" in embodiments of this application includes data sending, data receiving, or data sending and data receiving. In other words, data transmission herein includes uplink data transmission and/or downlink data transmission. Data may include a channel and/or a signal. The uplink data transmission is uplink channel transmission and/or uplink signal transmission, and the downlink data transmission is downlink channel transmission and/or downlink signal transmission. In embodiments of this application, a "network" and a "system" express a same concept, and a communication system is a communication network.

In the descriptions of this application, "/" represents an "or" relationship between associated objects unless otherwise specified. For example, AB may represent A or B. A term "and/or" in this application represents only an association relationship between associated objects and represents that three relationships may exist. For example, A and/or B may represent the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, in embodiments of this application, a word such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner for ease of understanding.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate. Parts displayed as units may be one or more physical units, to be specific, may be located in one place, or may be distributed at a plurality of different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the current technology, or all or some of the technical solutions may be implemented in a form of a software product. The software product is stored in a storage medium and includes several instructions for instructing a device, where for example, the device may be a single-chip microcomputer or a chip, or a processor to perform all or some of the steps of the methods in embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for communication, comprising:
   receiving, by an access network device from an access and mobility management function network element, information indicating to activate a multicast session corresponding to a multicast service;
   sending, by the access network device based on the information,
   a paging message to a terminal in a radio resource control_inactive (RRC_inactive) state in the multicast session corresponding to the multicast service;
   receiving, by the access network device,
   ninth information from the access and mobility management function network element,
   wherein the ninth information indicates or notifies deactivation of the multicast session corresponding to the multicast service; and
   deactivating, by the access network device based on the ninth information, the multicast session.

2. The method according to claim 1, wherein the information comprises: multicast broadcast service (MBS) session activation.

3. The method according to claim 1, wherein the information comprises: identification information of the multicast service.

4. The method according to claim 1, wherein the sending, by the access network device, a paging message to a terminal in a RRC_inactive state in the multicast session corresponding to the multicast service comprises:
   determining, by the access network device, the terminal in the RRC_inactive state from a terminal in the multicast session; and
   sending, by the access network device, the paging message to the terminal in the RRC_inactive state.

5. The method according to claim 4, wherein the terminal in the RRC_inactive state comprises a first terminal and a second terminal; and
   the sending, by the access network device, a paging message to a terminal in an RRC_inactive state in the multicast session corresponding to the multicast service comprises:
   sending, by the access network device, a paging message in a radio access network-based notification area (RNA) of the first terminal and an RNA of the second terminal, wherein the paging message comprises identification information of the multicast service.

6. The method according to claim 3, wherein the identification information of the multicast service comprises: an MBS session identifier, a temporary mobile group identifier (TMGI) of the multicast session, or an internet protocol (IP) multicast address.

7. The method according to claim 1, wherein the ninth information is MBS session deactivation.

8. A system for communication, comprising:
   a session management function network element, configured to: determine to activate a multicast session corresponding to a multicast service, and
   send, to an access and mobility management function network element, information indicating to activate the multicast session;
   the access and mobility management function network element, configured to receive the information and send the information to an access network device; and
   the access network device, configured to:
   receive the information, and send, based on the information,
   a paging message to a terminal in a radio resource control_inactive (RRC_inactive) state in the multicast session corresponding to the multicast service,
   wherein the access and mobility management function network element is configured to send ninth information to the access network device,
   wherein the ninth information indicates or notifies deactivation of the multicast session corresponding to the multicast service; and
   wherein the access network device is further configured to:
   receive the ninth information; and
   deactivate the multicast session based on the ninth information.

9. The system according to claim 8, wherein the information comprises: multicast broadcast service (MBS) session activation.

10. The system according to claim 8, wherein the information comprises: identification information of the multicast service.

11. The system according to claim 8, wherein the access network device is further configured to:
    determine the terminal in a RRC_inactive state from a terminal in the multicast session; and
    send the paging message to the terminal in the RRC_inactive state.

12. The system according to claim 11, wherein the terminal in the RRC_inactive state comprises a first terminal and a second terminal; and
    the access network device is further configured to: send a paging message in a radio access network-based notification area (RNA) of the first terminal and an RNA of the second terminal, wherein the paging message comprises identification information of the multicast service.

13. The system according to claim 10, wherein the identification information of the multicast service comprises: an MBS session identifier, a temporary mobile group identifier (TMGI) of the multicast session, or an internet protocol (IP) multicast address.

14. The system according to claim 8, wherein the ninth information is MBS session deactivation.

15. An apparatus for communication, comprising:
at least one processor; and
one or more memories coupled to the at least one processor and storing programming instructions for execution by the at least one processor to cause the apparatus to:
receive, from an access and mobility management function network element, information indicating to activate a multicast session corresponding to a multicast service;
send, based on the information,
a paging message to a terminal in a radio resource control_inactive (RRC_inactive) state in the multicast session corresponding to the multicast service;
receive ninth information from the access and
mobility management function network element,
wherein the ninth information indicates or notifies deactivation of the multicast session corresponding to the multicast service; and
deactivate the multicast session based on the ninth information.

16. The apparatus according to claim 15, wherein the programming instructions are for execution by the at least one processor to cause the apparatus to:
determine the terminal in a RRC_inactive state from a terminal in the multicast session; and
send the paging message to the terminal in the RRC_inactive state.

17. The apparatus according to claim 16, wherein the terminal in the RRC_inactive state comprises a first terminal and a second terminal; and
the programming instructions are for execution by the at least one processor to cause the apparatus to: send a paging message in a radio access network-based notification area (RNA) of the first terminal and an RNA of the second terminal, wherein the paging message comprises identification information of the multicast service.

* * * * *